(12) United States Patent
Bloom et al.

(10) Patent No.: US 9,613,049 B2
(45) Date of Patent: *Apr. 4, 2017

(54) DOCUMENT INTEGRATION AND DISTRIBUTION SYSTEM, METHOD AND DEVICE

(71) Applicant: APPLIED SYSTEMS, INC., University Park, IL (US)

(72) Inventors: Sven-Eric M. Bloom, Orland Park, IL (US); Robert E. Gorczowiski, Frankfort, IL (US); Philip J. Smith, Beecher, IL (US); Nurdin Premji, Brampton (CA); Meredith A. Williams, Manteno, IL (US); Michael B. Cronin, New Lenox, IL (US); Tracy E. Ustinov, Park Forest, IL (US); Matthew R. Beal, Lansing, IL (US); Charles O. Mahaffey, Portage, IN (US)

(73) Assignee: Applied Systems, Inc., University Park, IL (US)

( * ) Notice: Subject to any disclaimer, the term of this patent is extended or adjusted under 35 U.S.C. 154(b) by 71 days.

This patent is subject to a terminal disclaimer.

(21) Appl. No.: 13/871,998

(22) Filed: Apr. 26, 2013

(65) Prior Publication Data

US 2013/0238678 A1 Sep. 12, 2013

Related U.S. Application Data

(63) Continuation-in-part of application No. 12/207,449, filed on Sep. 9, 2008, now Pat. No. 8,688,744.

(51) Int. Cl.
G06F 17/30 (2006.01)
G06F 7/00 (2006.01)
G06Q 10/10 (2012.01)

(52) U.S. Cl.
CPC .. *G06F 17/30203* (2013.01); *G06F 17/30011* (2013.01); *G06Q 10/10* (2013.01)

(58) Field of Classification Search
USPC .......................................................... 707/802
See application file for complete search history.

(56) References Cited

U.S. PATENT DOCUMENTS 4,879,718 A 11/1989 Sanner
5,265,252 A 11/1993 Rawson
(Continued)

FOREIGN PATENT DOCUMENTS

EP 1482436 12/2004

OTHER PUBLICATIONS

Oracle Customers Online Concepts and Procedures, Release 11i (11.5.7.02), Part No. A96178-02, Copyright © 2002, Oracle Corporation, (hereafter "OraCRMOnLine").*

(Continued)

*Primary Examiner* — Kuen Lu
(74) *Attorney, Agent, or Firm* — FisherBroyles LLP; Richard M Lehrer

(57) ABSTRACT

A system is configured to receive a data file from an electronic device. The system, in one embodiment, is operable to receive a user's selection of a party together with information input by the user. The system is operable to send the data file to the selected party. The system stores, in association with the selected party, the input information and data related to the sending of the data file.

20 Claims, 46 Drawing Sheets

(56) References Cited

U.S. PATENT DOCUMENTS

| | | | |
|---|---|---|---|
| 6,003,093 A | 12/1999 | Kester | |
| 6,425,001 B2 | 7/2002 | Lo | |
| 6,714,998 B2 | 3/2004 | Hara | |
| 6,795,846 B1 | 9/2004 | Merriam | |
| 7,293,114 B2 | 11/2007 | Yashiki | |
| 7,310,162 B2 | 12/2007 | Morris-Jones | |
| 7,318,083 B2 | 1/2008 | Senda | |
| 7,389,516 B2 | 6/2008 | Rosenbloom | |
| 2001/0011281 A1 | 8/2001 | Fry | |
| 2001/0043369 A1* | 11/2001 | Melen | H04N 1/32042 358/468 |
| 2002/0029158 A1* | 3/2002 | Wolff | G06Q 30/06 705/4 |
| 2003/0101289 A1 | 5/2003 | Alikberov | |
| 2003/0200234 A1* | 10/2003 | Koppich | G06F 17/30011 |
| 2004/0078337 A1 | 4/2004 | King | |
| 2004/0215510 A1 | 10/2004 | Wilkie | |
| 2005/0134935 A1* | 6/2005 | Schmidtler | G06K 9/00442 358/448 |
| 2007/0078853 A1* | 4/2007 | Shutt | G06F 17/30011 |
| 2007/0110276 A1 | 5/2007 | OConnell | |
| 2007/0177824 A1 | 8/2007 | Cattrone | |
| 2008/0040151 A1* | 2/2008 | Moore | G06F 19/322 705/2 |
| 2008/0101597 A1 | 5/2008 | Nolan | |
| 2008/0104615 A1 | 5/2008 | Nolan | |
| 2008/0134216 A1 | 6/2008 | Shoji | |
| 2008/0148370 A1 | 6/2008 | Allwright | |
| 2010/0138422 A1* | 6/2010 | Mattiuzzi | G06F 19/321 707/740 |

OTHER PUBLICATIONS

Oracle® Customers Online Concepts and Procedures Release 11 i Part No. A96178-03 Apr. 2003.*

Code 128 Symbology, Copyright 2006 BarCodeIsland.com, Inc., [retrieved from the Internet] URL: <http://www.barcodeisland.com/code128phtml on May 15, 2009>.

Acquiring Images through VChannel, updated May 12, 2005 [retrieved from the Internet] URL: <http://asi-intranet/intranet/division/tech/department/datacenteroperations/documentation/vc . . . on May 15, 2009>.

International Search Report dated Oct. 26, 2009 issued in PCT/US2009/056375.

International Preliminary Report on Patentability issued Mar. 15, 2011 in PCT/US2009/056375.

* cited by examiner

DOCUMENT INTEGRATION AND DISTRIBUTION SYSTEM, METHOD AND DEVICE

PRIORITY CLAIM

This application is a continuation-in-part of, and claims the benefit and priority of, U.S. patent application Ser. No. 12/207,449, filed on Sep. 9, 2008, and the entire contents of such application are hereby incorporated by reference.

CROSS REFERENCE TO RELATED APPLICATIONS

This application is related to the following commonly-owned, co-pending patent applications: U.S. patent application Ser. No. 12/207,425, filed on Sep. 9, 2008; U.S. patent application Ser. No. 12/207,448, filed on Sep. 9, 2008; U.S. patent application Ser. No. 12/207,442, filed on Sep. 9, 2008; U.S. patent application Ser. No. 13/536,593, filed on Jun. 28, 2012; U.S. patent application Ser. No. 13/612,117, filed on Sep. 12, 2012; and U.S. patent application Ser. No. 13/857,686, filed on Apr. 5, 2013.

COPYRIGHT NOTICE

A portion of the disclosure of this patent document contains or may contain material which is subject to copyright protection. The copyright owner has no objection to the photocopy reproduction by anyone of the entire patent document in exactly the form it appears in the Patent and Trademark Office patent file or records, but otherwise reserves all copyrights whatsoever.

BACKGROUND

Document management is typically an integral part of running a business, particularly when a business has remotely located business locations. Many businesses receive hundreds or thousands of documents every day from outside sources at various locations. These documents typically need to be filed and/or forwarded correctly for proper operation of a business. Received documents are typically routed to the appropriate person, department, or file location via hand delivery, email, or other delivery services to the appropriate offices or file rooms. The number of received documents often requires substantial efforts and costs in determining the appropriate location for each document and delivering each document to its appropriate location.

Many companies use business software systems, such as customer relationship management (CRM) systems, to manage communications and transactions with their customers. When employees send or receive documents, the known business software systems do not provide a relatively simple and easy to use method for storing the documents in association with the applicable customer account. The known software systems do not provide a relatively simple and easy to use method for combining multiple documents for forwarding to a customer or vendor. Also, the known software systems do not provide a relatively simple and easy to use method for setting tasks to contact the recipient at a future date to confirm receipt of the document and answer any questions. Consequently, employees can encounter a loss in work flow efficiency, a decrease in productivity and a decrease in customer service quality.

Therefore, there is a need to overcome, or otherwise lessen the effects of, these disadvantages and shortcomings.

SUMMARY

The present disclosure provides a new and innovative method, system, and apparatus for scanning and importing documents. Specifically, the disclosed system provides a device for scanning documents and importing and forwarding scanned documents based on document identifiers. Documents are received and reviewed for entry into the document management system. An identifier is associated with each document based on the level of available information about the document. Then an identifier is assigned to each document, and documents and identifiers are scanned. Documents are then imported into the document management system or forwarded to a recipient for additional review. Separator identifiers may be used to increase efficiency. Further, certain users may have access to reporting functions to access information about the document management system. The disclosed system provides an efficient and improved system for remotely managing documents.

The business management system or system, in one embodiment, enables users to generate and manage accounts of customers, vendors and other parties related to the users' business, including, but not limited to, an insurance agency management business. The system also enables users to generate and manage documents, invoices, transactions, records, data and activities related to the accounts. The system, in one embodiment, incorporates customer relationship management (CRM) functionality and structure.

In one embodiment, the system includes a data storage device configured to store party data or data related to a plurality of different parties, including, but not limited to, insured clients, insurance providers or carriers, vendors and other parties. The data storage device is accessible, over a network, by a processor and at least one network access device or electronic device.

The system has a plurality of instructions stored within the data storage device. The instructions are executable by the processor to: (a) receive a data file from the electronic device; (b) receive a user's selection of one of the parties; (c) receive activity management data, input by the user, related to the data file; (d) send the data file to the selected party; and (e) store the data file and the activity management data within the data storage device. The data file and the activity management data are stored in association with the selected party.

In one embodiment, the data includes account data related to a plurality of accounts of the parties. The account data includes at least an identifier of each one of the parties. In one embodiment, the activity management data includes follow-up management data related to following-up with the selected party regarding the data file sent to the selected party.

In one embodiment, a plurality of the instructions are executable by the processor to: (a) receive an input after the data file is sent; and (b) cause a display of an account interface. The account interface displays: (i) a data file list section including a description of the sent data file; and (ii) at least part of the activity management data.

In one embodiment, a plurality of the instructions are executable by the processor to receive the user's selection of one of a plurality of different distribution methods. The system sends the data file according to the selected distribution method.

In one embodiment, the data storage device is configured to store at least one other data file in association with the selected party. A plurality of the instructions are executable by the processor to: (a) receive a selection of the other data file; and (b) send to the selected party, the other data file along with the data file.

In one embodiment, the data storage device is configured to store an instruction set. A plurality of the instructions are executable by the processor to: (a) enable the electronic device to install a copy of the instruction set onto the electronic device, wherein the electronic device is operable to generate the data file; (b) receive a message from the electronic device after the electronic device has generated the data file; and (c) cause a display of a file integration interface in response to the message. The file integration interface has: (i) a data file list section which displays a description of the data file; (ii) a party selection section; (iii) a distribution method selection section; and (iv) an activity management data input section.

In one embodiment, the system includes a data storage device configured to store a plurality of accounts related to a plurality of different parties. Each of the accounts is relatable to a plurality of data files. The data storage device is accessible, over a network, by a processor and at least one network access device or electronic device. The system also includes a file conversion instruction set stored within the data storage device. The system has a plurality of instructions stored within the data storage device. The instructions are executable by the processor to enable the electronic device to install a copy of the file conversion instruction set onto the electronic device. The electronic device is operable to execute the file conversion instruction set to convert a data file from an initial format to a portable format. The instructions are also executable by the processor to: (a) receive the converted data file; (b) combine the converted data file with another one of the data files in response to a combine request, wherein this results in a combination data file; (c) receive a user's selection of one of the accounts; (d) receive from the user, activity management data related to the combination data file and the selected account; (e) store the combination data file and the activity management data within the data storage device, wherein the combination data file and the activity management data are associated with the selected account; and (f) send the combination data file to an electronic destination associated with the selected account.

Additional features and advantages of the present invention are described in, and will be apparent from, the following Brief Description of the Figures and Detailed Description.

BRIEF DESCRIPTION OF THE FIGURES

FIG. 10 is a view of one example of one embodiment of the account locate interface of the system.

FIG. 11 is a view of one example of one embodiment of the account detail interface of the system.

FIG. 15 is a view of one example of one embodiment of the transactions interface of the system.

FIG. 16 is a view of one example of one embodiment of the attachments interface of the system.

FIG. 17 is a view of one example of one embodiment of the claims interface of the system.

FIG. 25 is a view of another example of one embodiment of the file integration interface of the system, illustrating a data file moved into the file builder section.

FIG. 33 is a view of one example of one embodiment of the attachments interface of the system, illustrating the activity management data associated with attached data files.

FIG. 34 is a view of one example of one embodiment of the editable activity interface of the system.

DETAILED DESCRIPTION

Business Management System

Figure 1:
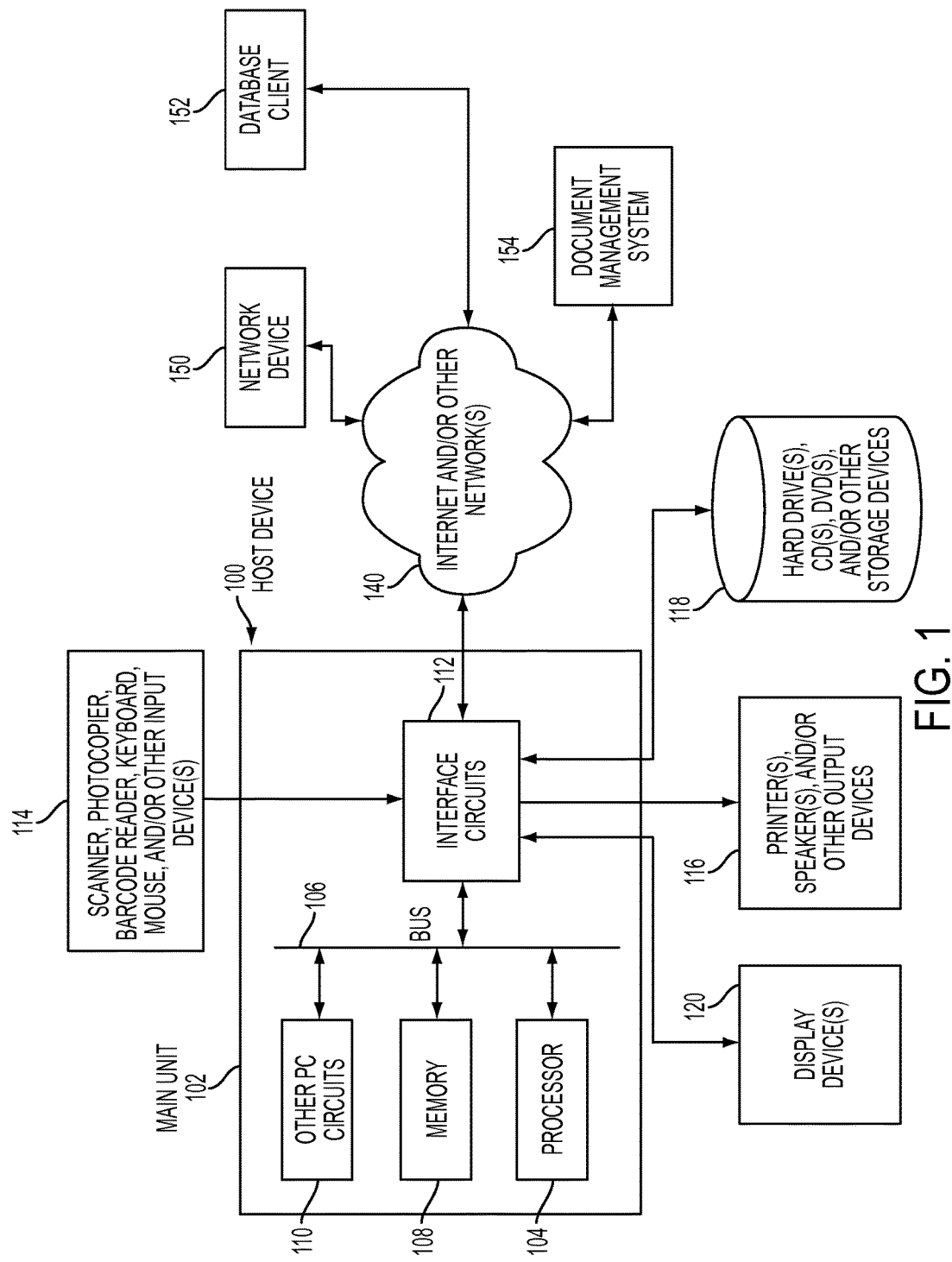
FIG. 1 is a block diagram of the electrical systems of an example architecture for a host device for implementing a scanning and importing document management system.

FIG. 1 is a block diagram of the electrical systems of an example architecture for a host device 100 for implementing the document scanning and importing system disclosed herein. In the example architecture, the host device 100 includes a main unit 102 which preferably includes one or more processors 104 electrically coupled by an address/data bus 106 to one or more memory devices 108, other computer circuitry 110, and one or more interface circuits 112. The processor 104 may be any suitable processor. The memory 108 preferably includes volatile memory and non-volatile memory. Preferably, the memory 108 stores a software program that interacts with the other devices in the system as described below. This program may be executed by the processor 104 in any suitable manner. The memory 108 may also store digital data indicative of documents, files, programs, web pages, etc. retrieved from processor 104, storage device 118, network device 150, database client 152, document management system 154, and/or loaded via an input device 114.

The interface circuit 112 may be implemented using any suitable interface standard, such as an Ethernet interface and/or a Universal Serial Bus (USB) interface. One or more input devices 114 may be connected to the interface circuit 112 for entering data and commands into the main unit 102. For example, the input device 114 may be a scanner, photocopier, barcode reader, keyboard, mouse, touch screen, track pad, track ball, isopoint, and/or a voice recognition system. In an example described in more detail below, an input device 114 may be used to scan documents and document identifiers for importing the documents into a document management system 154. Data scanned from an input device 114 may be stored on any directory accessible to the host device 100.

One or more displays 120 or printers, speakers, and/or other output devices 116 may also be connected to the main unit 102 via the interface circuit 112. The display 120 may be a cathode ray tube (CRT), liquid crystal display (LCD), or any other type of display. The display 120 generates visual displays of data generated during operation of the host device 100. The visual displays may include prompts for human input, run time statistics, calculated values, data, etc.

One or more storage devices 118 may also be connected to the main unit 102 via the interface circuit 112. For example, a hard drive, CD drive, DVD drive, and/or other storage devices may be connected to the main unit 102. The storage devices 118 may store any type of data used by the host device 100. For example, the storage device 118 may store scanned documents, scanned document identifiers, and archived document identifiers.

The host device 100 may also exchange data with a network device 150, a remote database client 152, and/or a document management system 154 using a connection to network 140. For example, a remotely located host device 100 may connect to a network device 150, database client 152, and/or document management system 154 via a remote desktop protocol connection. Storage devices 118 may be exposed to the network devices 150, database client 152, and/or document management system 154 via the network 140. The network connection 140 may be any suitable network connection, such as an Ethernet connection, digital subscriber line (DSL), telephone line, coaxial cable, etc. Access to a host device 100 may be controlled by appropriate security software or security measures. An individual user's access can be defined by the host device 100 and limited to certain data and/or actions. For example, certain users may be allowed transmit scanned document data to a document management system 154 which may operate with network device 150 and/or database client 152. Additionally, certain users may also have the ability to view reports regarding document management system 154 and associated data flow. Accordingly, users of the system may be required to register with a host device 100. The data exchanged between the host device 100 and the network device 150, database client 152, and/or document management system 154 may include document data (i.e., scanned document identifiers and documents from an input device 114), forms and associated data (i.e., a web page for data entry and inputs from an input device 114), screen files (i.e., image data for display at the database client 152), trapped events at the database client 152, and raw data including data stored on the storage device 118 and manipulable at the network device 150, database client 152, and/or document management system 154.

Figure 2:
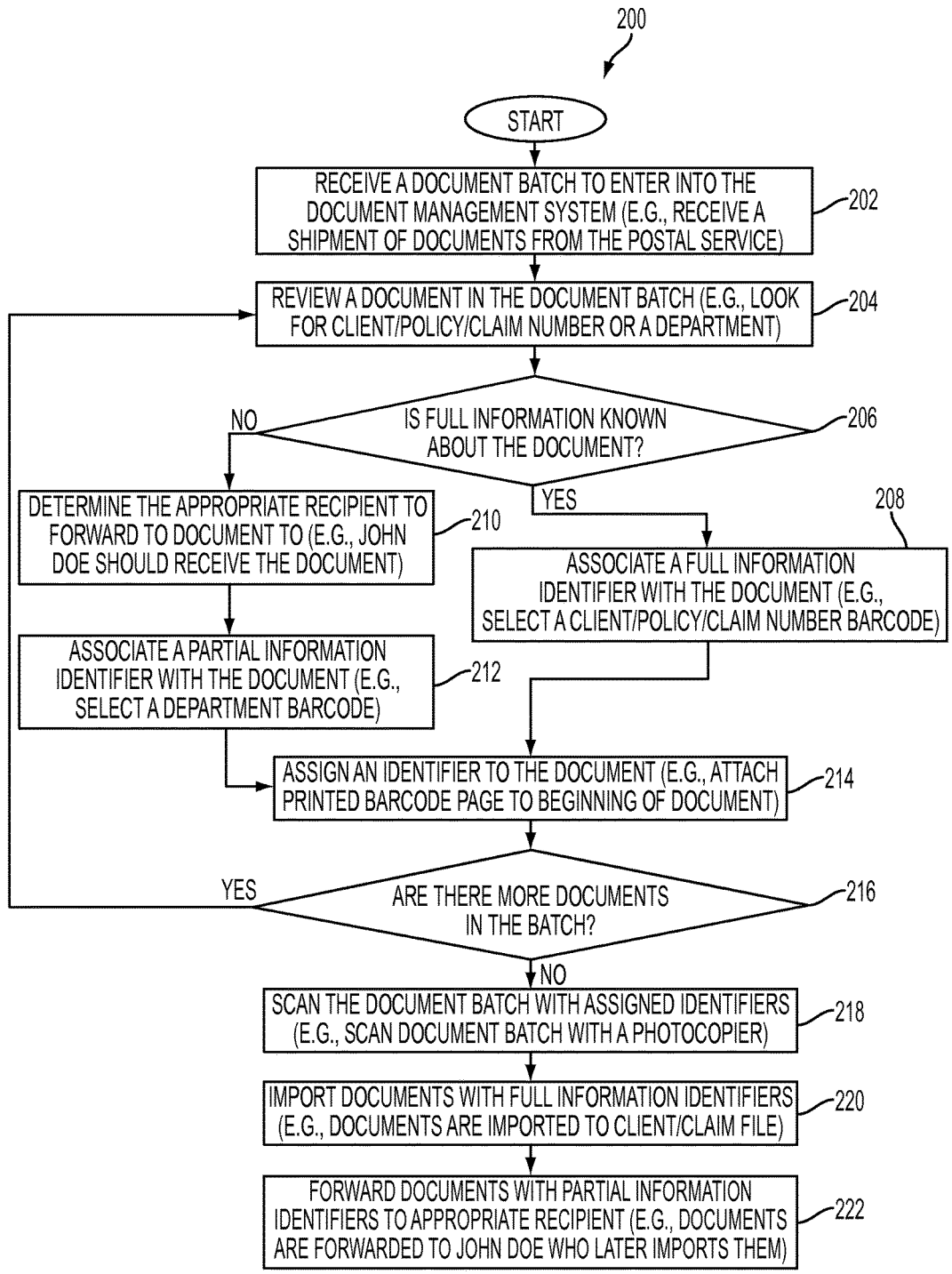
FIG. 2 is a flow chart of an example document scanning and importing process.

FIG. 2 is a flowchart of an example document scanning and importing process 200. In general, documents are received and reviewed for entry into the document management system 154. An identifier is associated with each document based on the level of available information about the document. Then an identifier is assigned to each document, and documents and identifiers are scanned. Documents are then imported into the document management system or forwarded to a recipient for additional review. Although the document scanning and importing process 200 is described with reference to the flowchart illustrated in FIG. 2, it will be appreciated that many other methods of performing the acts associated with the example document scanning and importing process 200 may be used. For example, the order of many of the blocks may be changed, and many of the blocks described are optional.

The example document scanning and importing process 200 begins by receiving a batch of documents to enter into the document management system (block 202). For example, a business receives a daily shipment of documents from the postal service. Documents may be received from multiple sources to form a document batch, including delivery service, facsimile, telegram, etc. For example, the employee may prepare some documents, receive some documents from other employees, and receive documents from outside the company. An employee may receive a document in an electronic format that is not supported by the document management system 154, which may be printed as a hard copy with an output device 116. A batch may be broken into several smaller batches, and in some cases, a batch may include only one document.

Once a batch of documents has been received, review a document in the batch (block 204). For example, an employee of an insurance company may look at the first document of the batch checking for a client/policy/claim number or a department that should review the document. The employee may not have much information about documents that are not generated by the employee.

After reviewing a document, determine if full information is known about the document (block 206). For example, in a document management system where files are organized by client, then policy, then claim, if each of these variables is known, an employee may know exactly which file the document should be stored in. However, if only a client and policy is known, the document cannot simply be imported into the document management system because additional information is required to properly file the document.

If full information is known about the document, associate a full information identifier with the document (block 208). For example, an employee selects a client/policy/claim number barcode. An employee may select a barcode or other identifier in a variety of ways. For example, a barcode may be selected from binder, stack, folder, or other location in an employee's office. If an employee commonly receives documents for a certain client/policy/claim, the employee may keep barcode identifiers readily available for quick and easy access. Alternatively, if a document is received that is uncommon for an employee, a barcode identifier may be pulled up from a storage device 118 and printed with an output device 116. Accordingly, an employee is not required to keep hundreds or thousands of identifiers accessible for use with host device 100. Further, the act of associating an identifier does not necessarily require any physical act. For example, as described in more detail below, an employee may associate an identifier by determining the client/policy/claim number of a document without actually obtaining the client/policy/claim number physical identifier for that document.

An identifier may include any optical indicator such as a conventional 1D barcode, a 2d data matrix barcode, an alphanumeric string recognizable via optical character recognition, punch card, etc. Preferably, the identifier may be scanned in the same manner as the document. For example, the identifier is a barcode on a printed piece of paper that is the same size as the document. It should be appreciated that identifiers may come in a variety of forms. Identifiers may be reusable and/or disposable. For example, a high volume identifier may be printed on heavy stock and reused many times or may be printed on normal paper and disposed of after use.

If full information is not known about the document, determine the appropriate recipient to forward the document to (block 210). For example, a manager John Doe should receive the document. A recipient may be any person, (i.e., employee, manager, contractor), department (i.e., accounting, marketing), any physical location (i.e., Chicago office), electronic storage (i.e., database, junk mail filtering server, project folder), etc. As will be described in more detail below, a recipient will receive the document, and may have additional information such as a client/policy/claim number. A recipient may also be a folder for documents that are reviewed but provide no information to determine a recipient. Documents of this unknown nature may be made available in a daily email for a certain group of employees, where an employee in the group may be able to provide information.

Once the appropriate recipient has been determined, associate a partial information identifier with the document (block 212). For example, an employee selects department barcode. Preferably, all possible recipients would have an identifier that may be associated with a document. The identifier may be preset, or may be generated once the identifier is required. For example, a new employee may not have a preset barcode until a document must be sent to that new employee, at which time it is automatically generated.

Once a full information identifier or a partial information identifier has been associated with a document, assign an identifier to the document (block 214). For example, an employee attaches an identifier to the front of a document. The identifier attached will typically be the same identifier which was associated with the document. However, an identifier that is assigned to a document may be different from the associated identifier. For example, as described in more detail below, a separator identifier may be assigned to a document. Preferably, a standard method of assigning identifiers to documents is used. For example, an identifier barcode may always be attached as the first page of a document to be scanned by an input device 114.

Once an identifier has been assigned to a document, determine if there are more documents in the batch (block 216). If there are additional documents, review each additional document according to the above described document scanning and importing process 200.

If there are no more documents in the batch, scan the document batch with the assigned identifiers (block 218). For example, an employee may scan a document batch with a photocopier. The document batch may include three documents each with an assigned identifier (i.e., full information barcode A, document A, partial information barcode B, document B, full information barcode C, document C).

Once the document batch has been scanned, import documents with full information identifiers assigned to them (block 220). For example, documents are imported to the appropriate client/policy/claim file location within the document management system 154. The document management system 154 may process the documents in a variety of ways for importation. Preferably, the scanned batch of documents will be imported into the document management system 154 with the identifiers stripped out so the documents will be imported in their original clean format. It will be appreciated that document data may be manipulated and compressed in a variety of ways. Further, the history of each document may be tracked by the document management system 154, the host device 100, network devices 150, and/or the database client 152.

Once documents with full information identifiers assigned to them are imported, forward documents with partial information identifiers assigned to them (block 222). For example, documents are forwarded to the appropriate recipient. The documents may be forwarded in a variety of ways. For example, the documents may be converted into a standard email message with attachments to the recipients email inbox. Accordingly, the recipient may import the document into management system 154, save the document locally, recycle the document, and/or forward the document to a more appropriate recipient. Further, the history for each document including all messages may be tracked by the document management system 154, the host device 100, network devices 150, and/or the database client 152. Additionally, certain users may have access to reporting capabilities. For example, an inbox administrator may view reports on the inbox statistics of each recipient. The reports may include information such as how many documents are in each recipient's inbox, the average amount of time it takes each recipient to take action on items within their inbox, and how long documents have remained in a recipient's inbox. Accordingly, the inbox administrator may ensure efficient use of the example document scanning and importing process 200 by ensuring that documents that are associated with partial information identifiers are handled by the recipients with appropriate dispatch.

Figure 3:
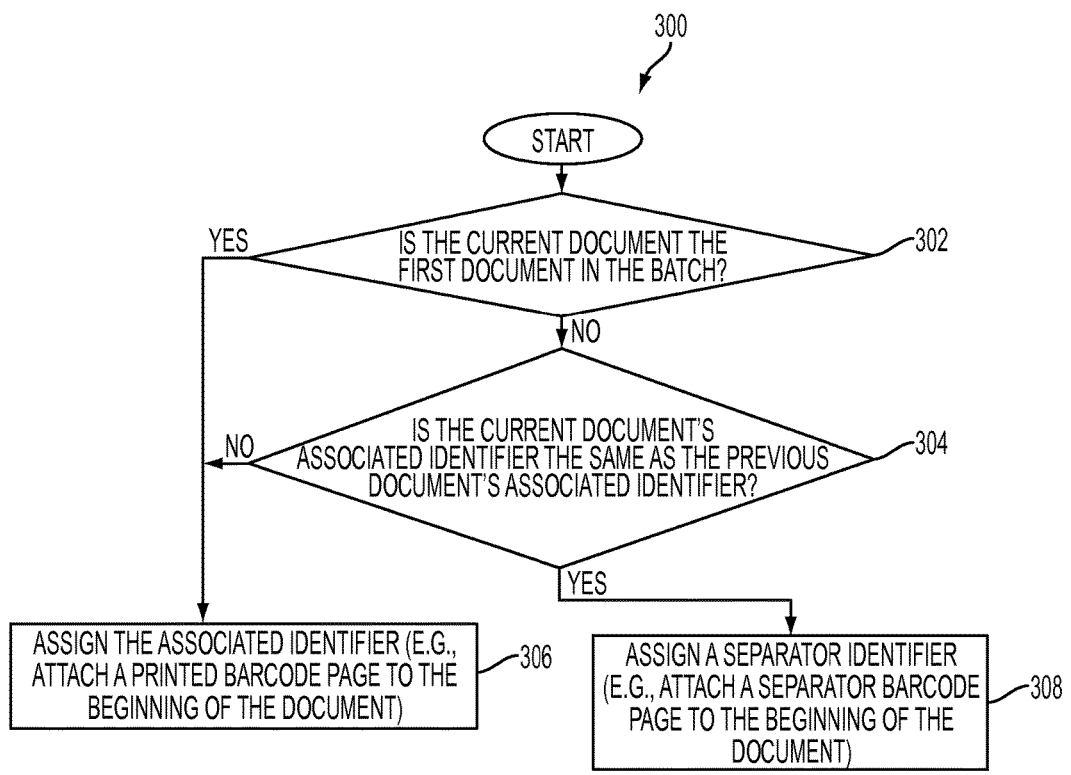
FIG. 3 is a flow chart of an example identifier assignment process.

FIG. 3 is a flowchart of an example identifier assignment process 300. Although the example identifier assignment process 300 is described with reference to the flowchart illustrated in FIG. 3, it will be appreciated that many other methods of performing the acts associated with example identifier assignment process 300 may be used. For example, the order of many of the blocks may be changed, and many of the blocks described are optional.

The example identifier assignment process 300 begins by determining if the current document is the first document in the batch (block 302). If the document is the first document in the batch, assign the associated identifier to the document (block 306). For example, an employee may attach a printed barcode page to the beginning of the first document in the batch.

If the document is not the first document in the batch, determine if the current document's associated identifier is the same as the previous document's associated identifier (block 304). If the identifier associated with the present document is not the same as the identifier associated with the previous document, then assign the associated identifier to the document (block 306). For example, an employee may attach a printed barcode page to the beginning of the third document in the batch.

If the identifier associated with the present document is the same as the identifier associated with the previous document, then assign a separator identifier to the document (block 308). For example, an employee may attach a separator barcode page to the beginning of the fifth document in the batch. A separator identifier indicates that a document should be imported or forwarded in the same manner as the previous document. It should be appreciated that an employee may associate a client/policy/claim number barcode with a document but not take any action on that association, and may assign a separator barcode instead. Such a technique of not, for example, printing an associated barcode may save considerable time. It should be appreciated that the example document scanning and importing process may be optimized by making appropriate use of separator identifiers.

If five documents are to be forwarded to a recipient, using one partial information identifier and four separator identifiers may save time. For example, an employee may have an easily accessible stock of separator identifiers, whereas each partial information identifier may have to be printed via an output device 116. Similarly, if ten documents are to be imported for the client/policy/claim number into the document management system 154, using one full information identifier and nine separator identifiers may save time. For example, an employee may have a stack of separator identifiers sitting next to the scanner, and may need to print each full information identifier using an output device 116.

It should be appreciated that a person reviewing a document batch, such as an employee, may organize the document batch to make the scanning and importing process 200 more efficient. For example, if a document batch is received with several documents for each of two recipients, with the documents in alternating fashion, the documents could be rearranged so that the recipients documents are segregated from each other. Accordingly, separator identifiers could be used to save time. However, for large batches of documents, it may be inefficient to attempt to rearrange the documents to use separator identifiers.

Figure 4:
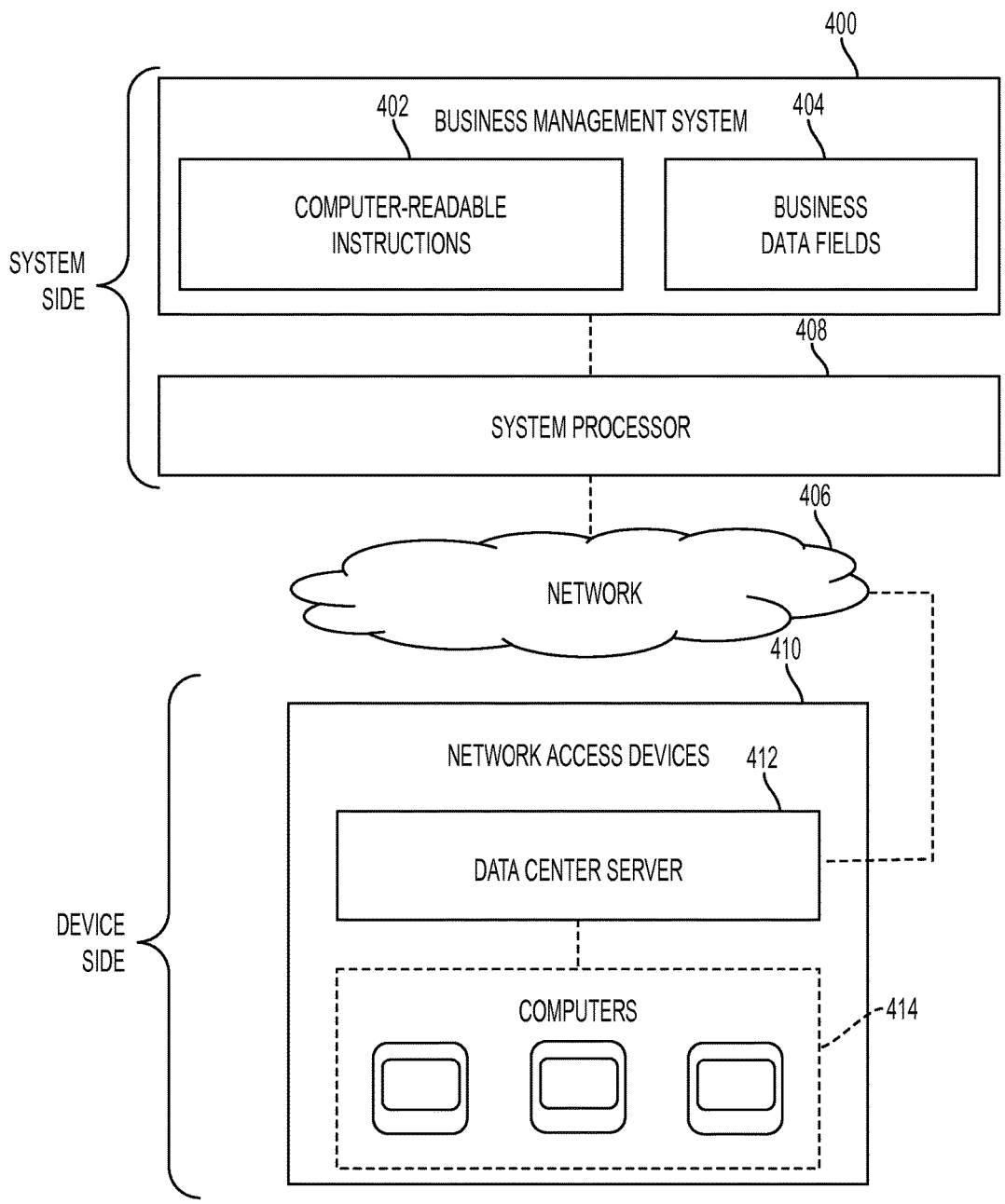
FIG. 4 is a schematic block diagram illustrating one embodiment of the system coupled to a network accessible to electronic network access devices or electronic devices.

In one embodiment illustrated in FIG. 4, the business management system 400 or system 400 includes a plurality of computer-readable instructions 402 and business data fields 404. The business data fields 404 are fillable with business data, including, but not limited to, customer data, customer relationship data, vendor or supplier data, and data related to the products or services provided to the customers. The system 400 is accessible, over network 406, by the processor 408 or system processor 408. The system 400 is also accessible, over network 406, by one or more electronic network access devices or electronic devices 410. In the example illustrated in FIG. 4, the user is an insurance agency management company with a central data center. The company's data center has a server 412 accessible by a plurality of computers 414. The server 412 is coupled to the system 400 through the network 406.

Figure 5:
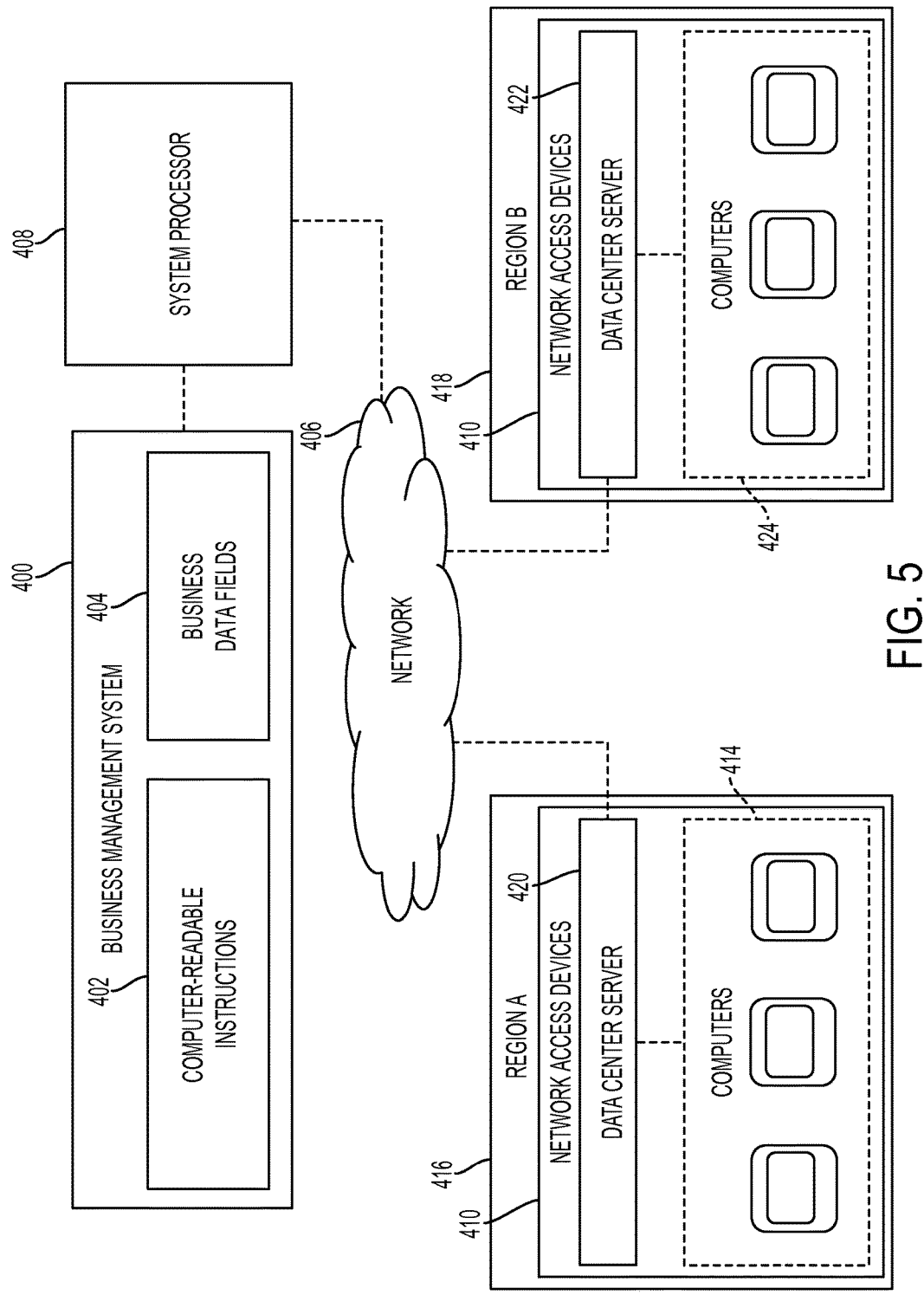
FIG. 5 is a schematic block diagram illustrating one embodiment of the system coupled to a network accessible to electronic network access devices or electronic devices within region A and electronic network access devices or electronic devices within region B.

In the example illustrated in FIG. 5, the user is an insurance agency management company with a data center 416 in region A, such as the West Coast of the USA. The insurance agency management company also has a data center 418 in region B, such as the East Coast of the USA. The company's region A data center has a region A server 420 accessible by a plurality of computers 414. The region A server 420 is coupled to the business management system 400 through the network 406. The company's region B data center has a region B server 422 accessible by a plurality of computers 424. The region B server 422 is coupled to the business management system 400 through the network 406.

Figure 6:
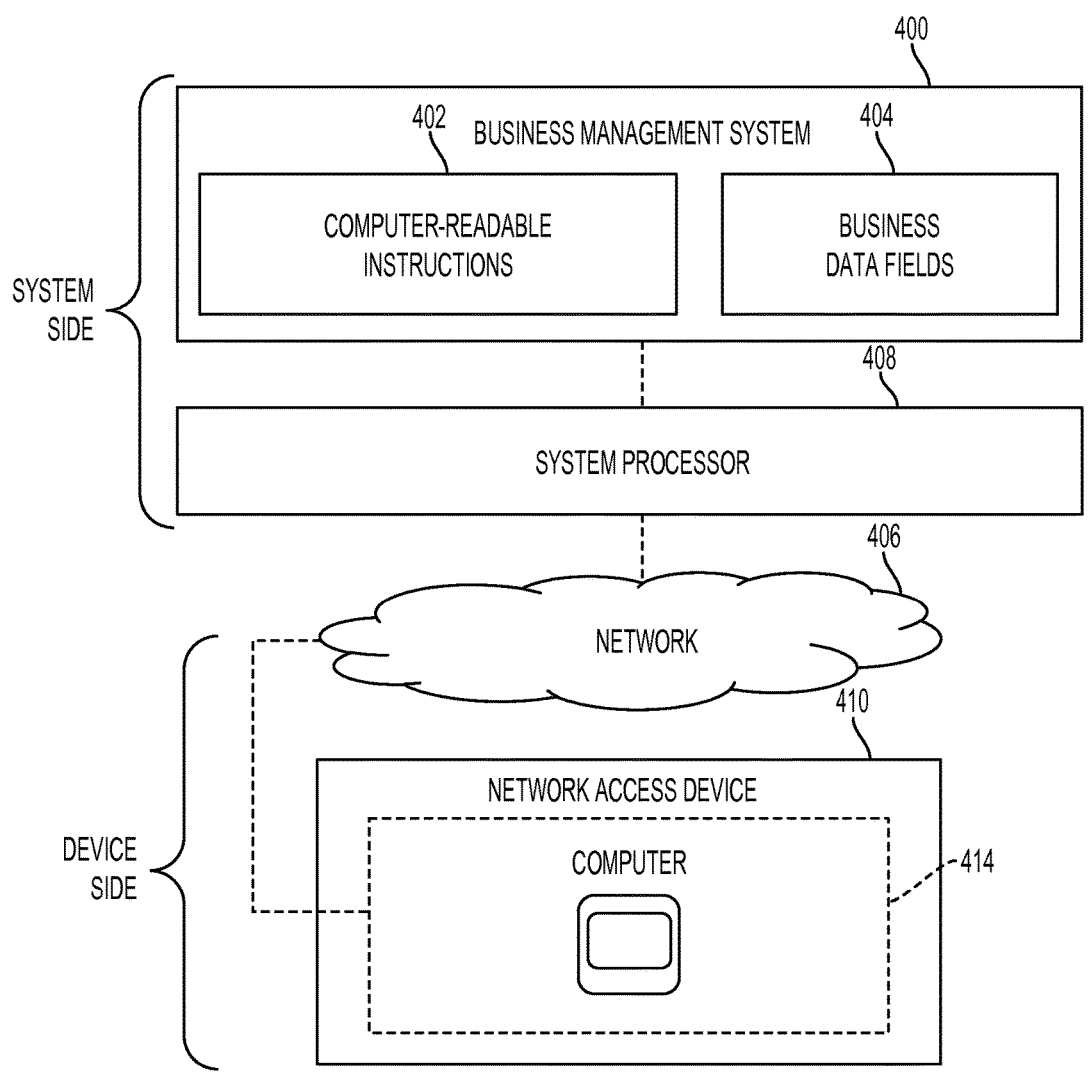
FIG. 6 is a schematic block diagram illustrating one embodiment of the system coupled to a network accessible to a single electronic network access device or electronic device.

In the example illustrated in FIG. 6, the user is an insurance agent. The agent's computer 414 is coupled to the business management system 400 through the network 406.

Figure 7:
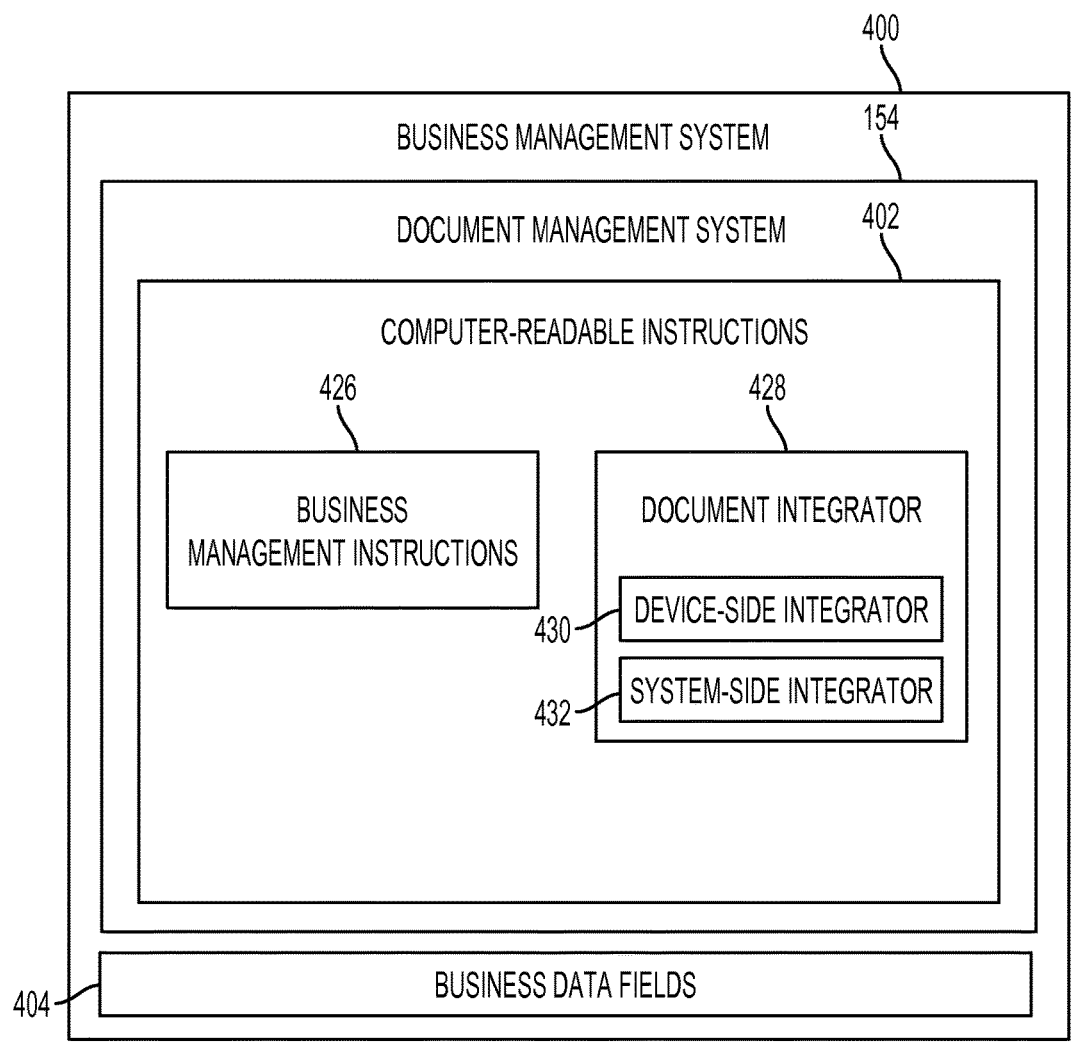
FIG. 7 is a schematic block diagram illustrating one embodiment of the system including the document management system, business management instructions, document integrator and business data fields.

In one embodiment illustrated in FIG. 7, the business management system 400 includes the document management system 154 described above, including all of the logic, structure, elements and functionality of the document management system 154. In one embodiment, the document management system 154 includes the computer-readable instructions 402 which, in turn, include the business management instructions 426 and the document integrator 428.

The document integrator 428, in one embodiment, includes the device-side instruction set or device-side integrator 430 and the system-side instruction set or system-side integrator 432. The data storage device of the system 400 stores a downloadable copy of the device-side integrator 430. The device-side integrator 430, described in detail below, is installable or loadable into the memory or data storage device of one or more network access devices 410. Using client-server terminology, the devices 410 have the roles of clients, and the device-side integrator 430 is installable on the client-side. The system-side integrator 432, described in detail below, resides in the data storage device of the system 400. Using client-server terminology, the system processor 408 has the role of the server, and the system-side integrator 432 is installable on the server-side.

The device-side integrator 430 includes an output generator, file conversion instruction set or data format converter. In one embodiment, the data format converter of the device-side integrator 430 includes a virtual printer driver. The virtual printer driver includes a set of computer-readable instructions executable to convert data from one format to another. The instructions are executable by the network access device 410 to produce or generate a converted format of an electronic document. In one embodiment, the converted format is a portable format, the Portable Document Format (PDF) or another format suitable for representing documents in a manner independent of application software, hardware and operating systems.

In operation of one example, a user has an electronic document or data file, such as a document in Microsoft® Word format, stored on the user's network access device 410. When viewing the document, the user selects a print button. The network access device 410 displays a list of printers, including a virtual printer associated with the system 400. The user selects the virtual printer followed by a print command. The network access device 410 virtually prints a copy of the document by converting it from the initial Microsoft® Word format to a portable format, such as a PDF.

The system-side integrator 432, in one embodiment, includes a channel model or connection module. The connection module includes a set of computer-readable instructions executable by the system processor 408 to extract, pull or otherwise receive data files from the virtual printer of the network access device 410.

When the device-side integrator 430 is installed on a device 410, it is executable to interact with the system-side integrator 432. The interaction enables the system processor 408 to receive converted data files from the device 410 as long as the user is logged-in to, or otherwise connected to, the system 400. In one embodiment, the integrators 430 and 432 are associated with a channel or data port. Based on the instructions of the integrators 430 and 432, the processor of the network access device sends, pushes or otherwise feeds the converted data file through the data port to the system 400.

In one embodiment, the network access device processor or device processor sends a launch command or launch message to the system processor 408 after the device processor generates the converted data file. In response, the system processor 408, as instructed by the system-side integrator 432, displays a graphical file integration interface 536 as described below.

In an alternative embodiment, the system processor 408 virtually prints and generates the converted format of the document as opposed to the network access device 410 generating the converted format. In such embodiment, the system processor 408 cooperates with the network access device processor to convert documents stored on the network access device from their initial formats to converted formats.

Figure 8:
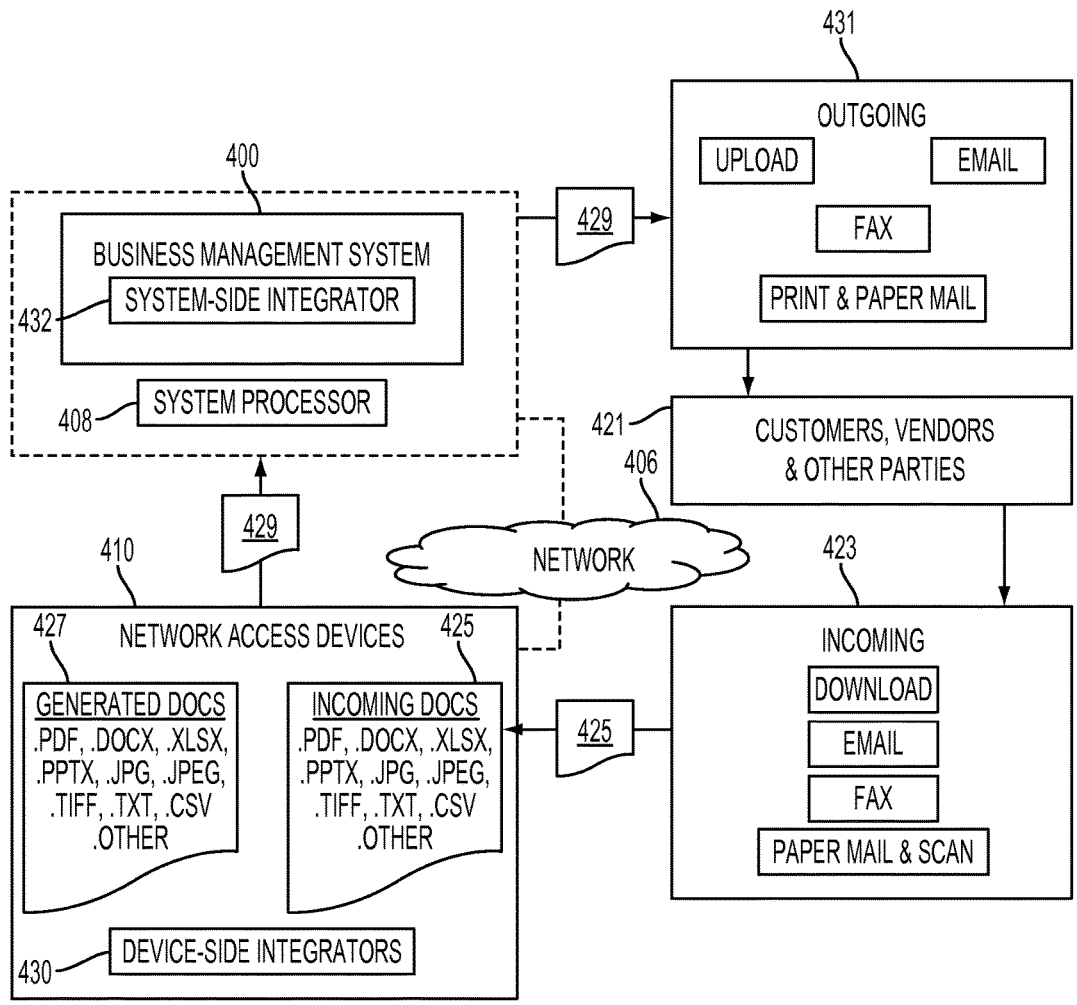
FIG. 8 is a schematic block diagram illustrating the flow of data files as controlled by one embodiment of the system.

In one embodiment illustrated in FIG. 8, the system 400 is an insurance agency management system accessible over the network 406. The insurance agency management system 400 provides data structures, data fields, graphical user interfaces and modules for use by insurance agents or insurance agency firms or companies. The insurance agency management system 400 has modules and data fields to facilitate the management of communications, correspondence, documents, information flow, work flow, financial data, insurance-related transactions and activities involving the broker or agent, the agent's clients or customers, insurance policies, insurance claims, insurance carriers and other vendors. The parties involved in these communications and transfers of information can include, but are not limited to, agents, brokers, insured parties including clients or customers, insurance carriers or insurance providers, insurance underwriters, attorneys, accountants, vendors or suppliers, and appraisers. The parties can send or exchange a variety of documents related to insurance, including, but not limited to, marketing literature, insurance proposals, insurance quotes, insurance applications, medical records, invoices for insurance premiums, certificates of insurance, declarations of insurance, submissions of claims or claim submissions, claim evidence (including, but not limited, to photographs, written notes, records and slips) and settlements of claims.

In one embodiment illustrated in FIG. 8, parties 421 deliver or provide documents to their insurance agents. As illustrated in the incoming block 423, a party 421 could have stored a document on a webserver or site available for download by the agent through File Transfer Protocol (FTP) transfer or another download method. Also, a party 421 could email or fax a document to the agent. If a party 421 mails a paper form document to the agent through a carrier service, the agent can scan the paper document, converting it to an electronic form.

At this point, the network access device 410 of the agent or agency firm stores a copy of the incoming data file 425 corresponding to the received documents. Also, an insurance agent can create or generate a document using the word processing software or office software of the network access device 410. The network access device 410 then stores a copy of the generated data file 427 corresponding to the generated documents. The incoming data files 425 and generated data files 427 can have any suitable format, including, but not limited to: (a) .DOCX, .XLSX, and .PPTX associated with the Microsoft® Office software; and (b) .PDF, .JPG, .JPEG, .TIFF, .TXT, and .CSV.

If the agent is logged-in to the system 400, the agent may then virtually print one of the data files 425 and 427 using the device-side integrator 430 installed on the network access device 410. As described above, the device processor generates the converted data file 429. Then, the system processor 408 automatically launches the file integration interface 536 described below. When the agent or user completes the file attachment process, the system processor 408 automatically receives a copy of the converted data file 429, as illustrated in FIG. 8.

As illustrated in the outgoing block 431, the system 400 enables the agent to: (a) associate a converted data file 429 with the account of a particular party; (b) combine a converted data file 429 with another data file stored within the system 400; and (c) associate other information with a planned distribution of the data file 429, including, but not limited to, activity management or follow-up data. The system 400 enables the agent to send the converted data file 429 or data file combination to a party 421 by means of: (i) emailing or faxing the data file 429 or data file combination; or (ii) printing and mailing paper copies of the data file 429 or data file combination to the receiving party. In one embodiment, the system 400 enables the agent to send the converted data file 429 or data file combination to a party 421 by means of uploading or storing the data file 429 or data file combination on a webserver or site available for download by the receiving party through FTP transfer or another download method.

Figure 9:
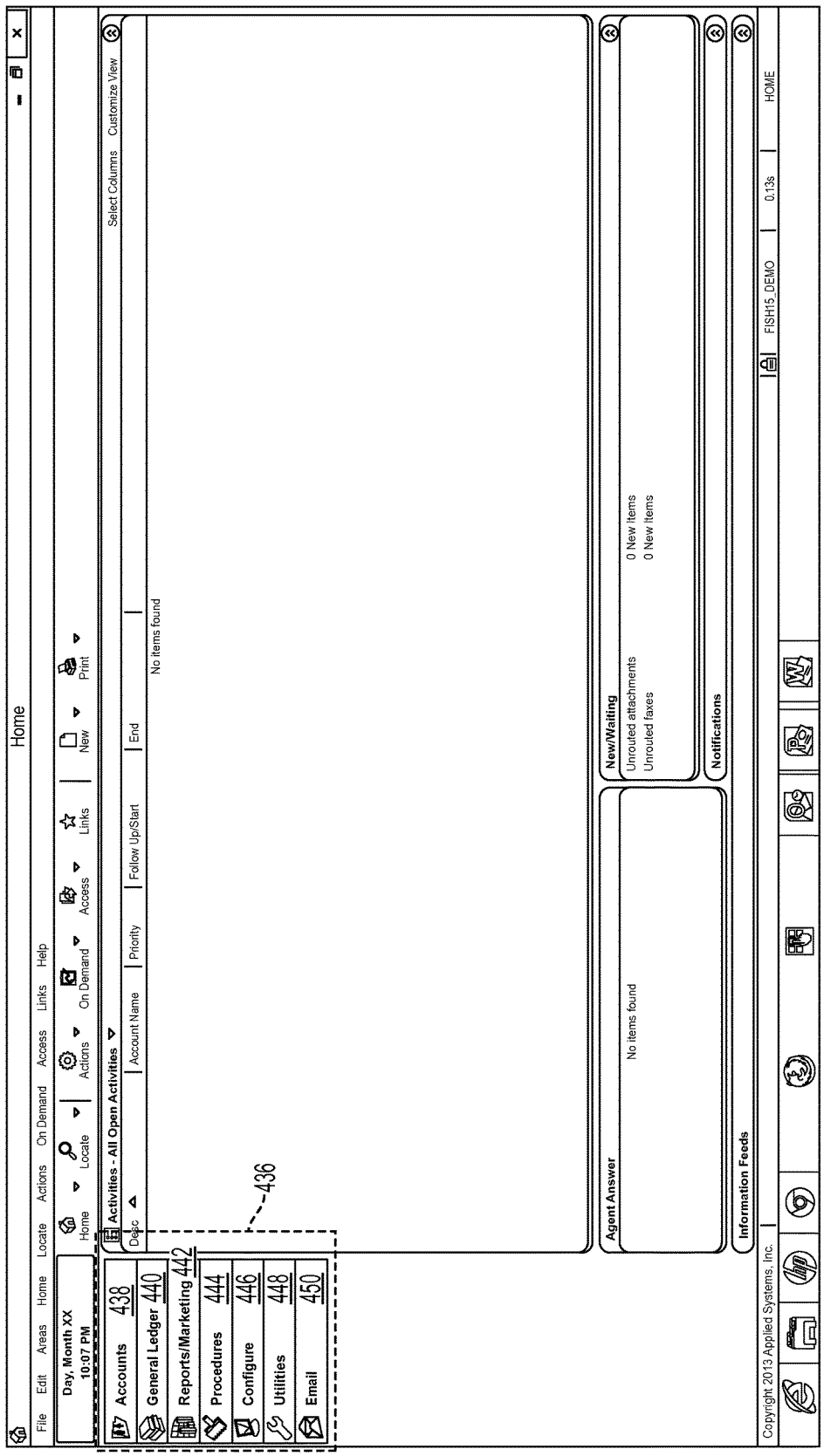
FIG. 9 is a view of one example of one embodiment of the home interface of the system.

In one embodiment illustrated in FIG. 9, the system 400 is operable by the system processor 408 to generate a plurality of graphical user interfaces accessible by one or more electronic devices 410 used by insurance agents. The example home interface 434, shown in FIG. 9, displays a vertical menu 436 of insurance management modules, including the accounts module 438, general ledger module 440, reports/marketing module 442, procedures module 444, configure module 446, utilities module 448 and email module 450. Each of these modules has a plurality of business data fields 404 associated with the purpose of the module. The accounts module 438 enables the agent to view, edit and enter data related to the agent's client accounts. The general ledger module 440 enables the agent to view, edit and enter financial data, including, but not limited to, accounting data related to the agent's insurance agency business. The reports/marketing module 442 enables the agent to view reports related to the agent's insurance agency business. The procedures module 444 enables the agent to view, edit and enter operating procedures related to the agent's insurance agency business. The configure module 446 enables the agent to customize features, settings and options of the system 400. The utilities module 448 enables the agent to use designated utilities, and the email module 450 enables the agent to send and receive emails for communications with clients, insurance carriers and other parties. The example home interface 434 also displays horizontal menus of the following modules: File, Edit, Areas, Home, Locate, Actions, On Demand, Access, Links, Help, New, and Print. In one embodiment, all of the system's module names or module headings function as hyperlinks, linking each one to a related graphical interface.

Figure 10:
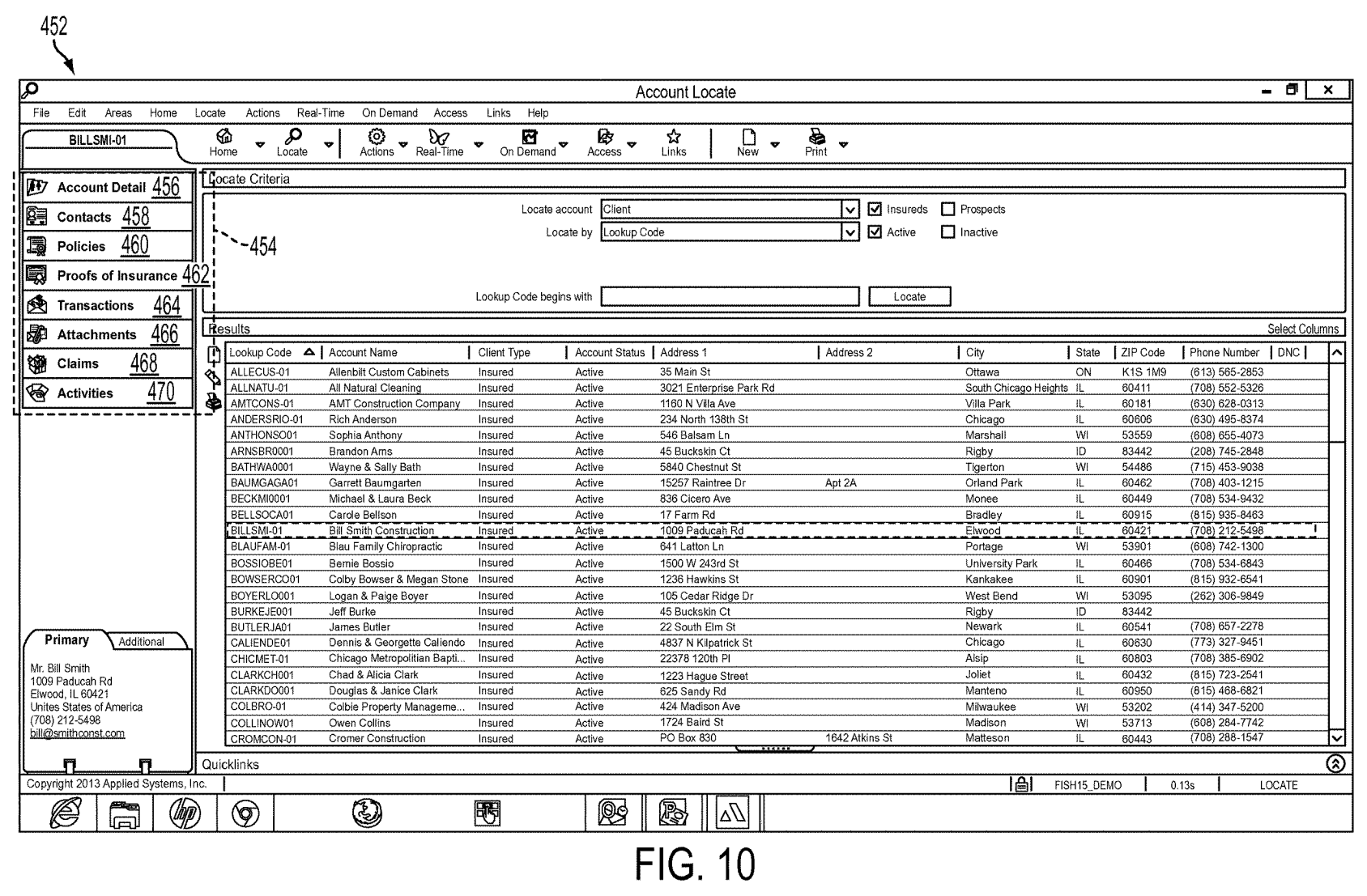

In one embodiment illustrated in FIG. 10, the system 400 displays an account locate interface 452 when the user clicks the accounts module 438. The account locate interface 452 displays a vertical menu 454 which, in turn, displays a list of the following modules: account detail 456, contacts 458, policies 460, proofs of insurance 462, transactions 464, attachments 466, claims 468 and activities 470.

Figure 11:
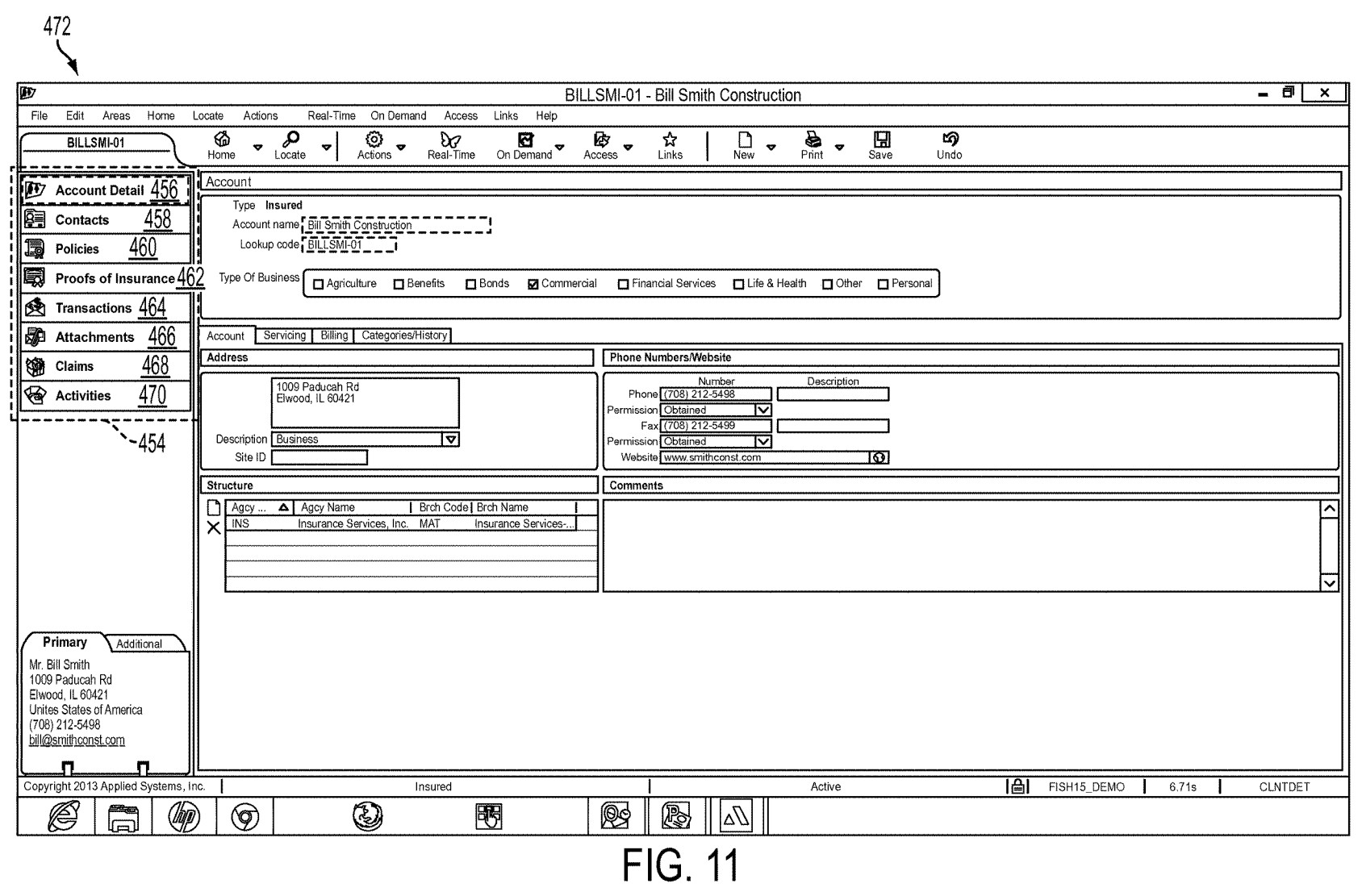

In one example illustrated in FIG. 11, the system 400 displays the account detail interface 472 when the user clicks the account detail 456 within the account of Bill Smith Construction, an insured party. As shown, the account detail interface 472 displays a plurality of fillable data fields related to the type of account, account name, account code, type of business, servicing, billing, history, address, agency information and comments.

Figure 12:
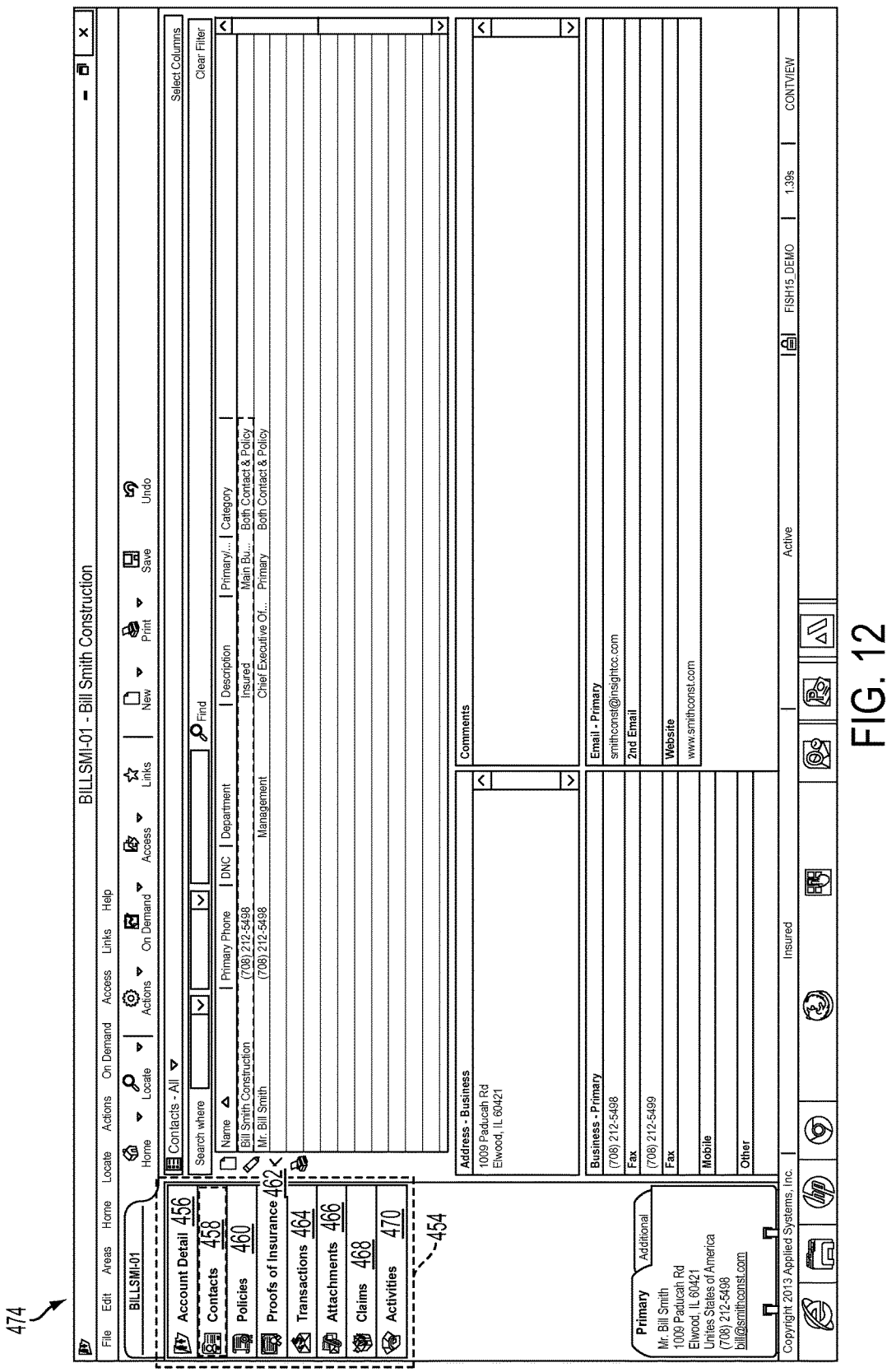
FIG. 12 is a view of one example of one embodiment of the contacts interface of the system.

In one example illustrated in FIG. 12, the system 400 displays the contacts interface 474 when the user clicks the contacts 458 within the account of Bill Smith Construction, an insured party. As shown, the contacts interface 474 displays a plurality of fillable data fields related to name, phone number, department, description, contact type, contact category and address.

Figure 13:
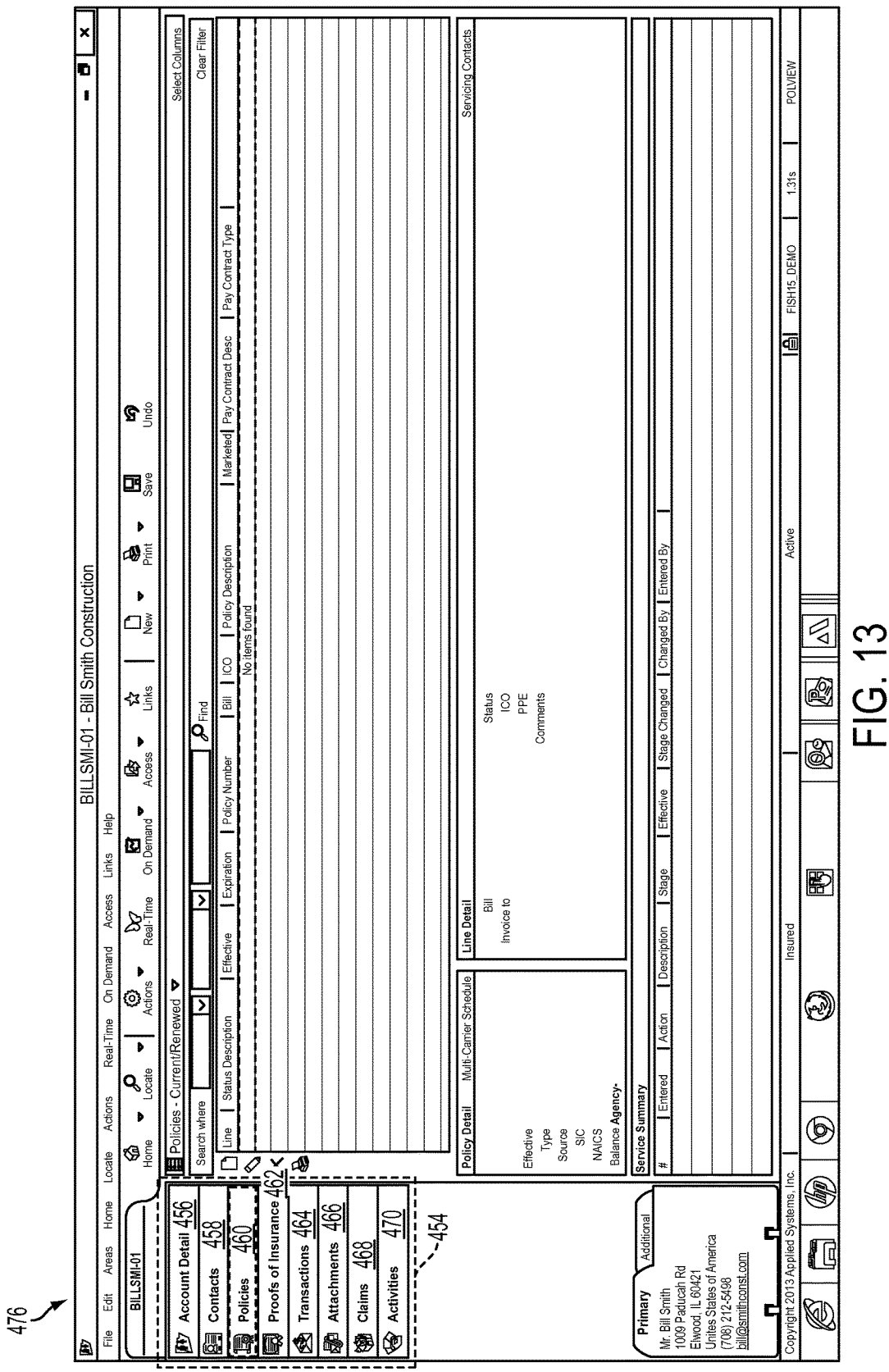
FIG. 13 is a view of one example of one embodiment of the insurance policies interface of the system.

In one example illustrated in FIG. 13, the system 400 displays the insurance policies interface 476 when the user clicks the policies module 460 within the account of Bill Smith Construction, an insured party. As shown, the insurance policies interface 476 displays a plurality of fillable data fields related to insurance line, status description, effective date, expiration date, policy number, policy description, policy detail, multi-carrier schedule, insurance line detail, service summary and a plurality of service fields, including code, entered date, action, description, stage, effective date, stage changed, changed by, and entered by.

Figure 14:
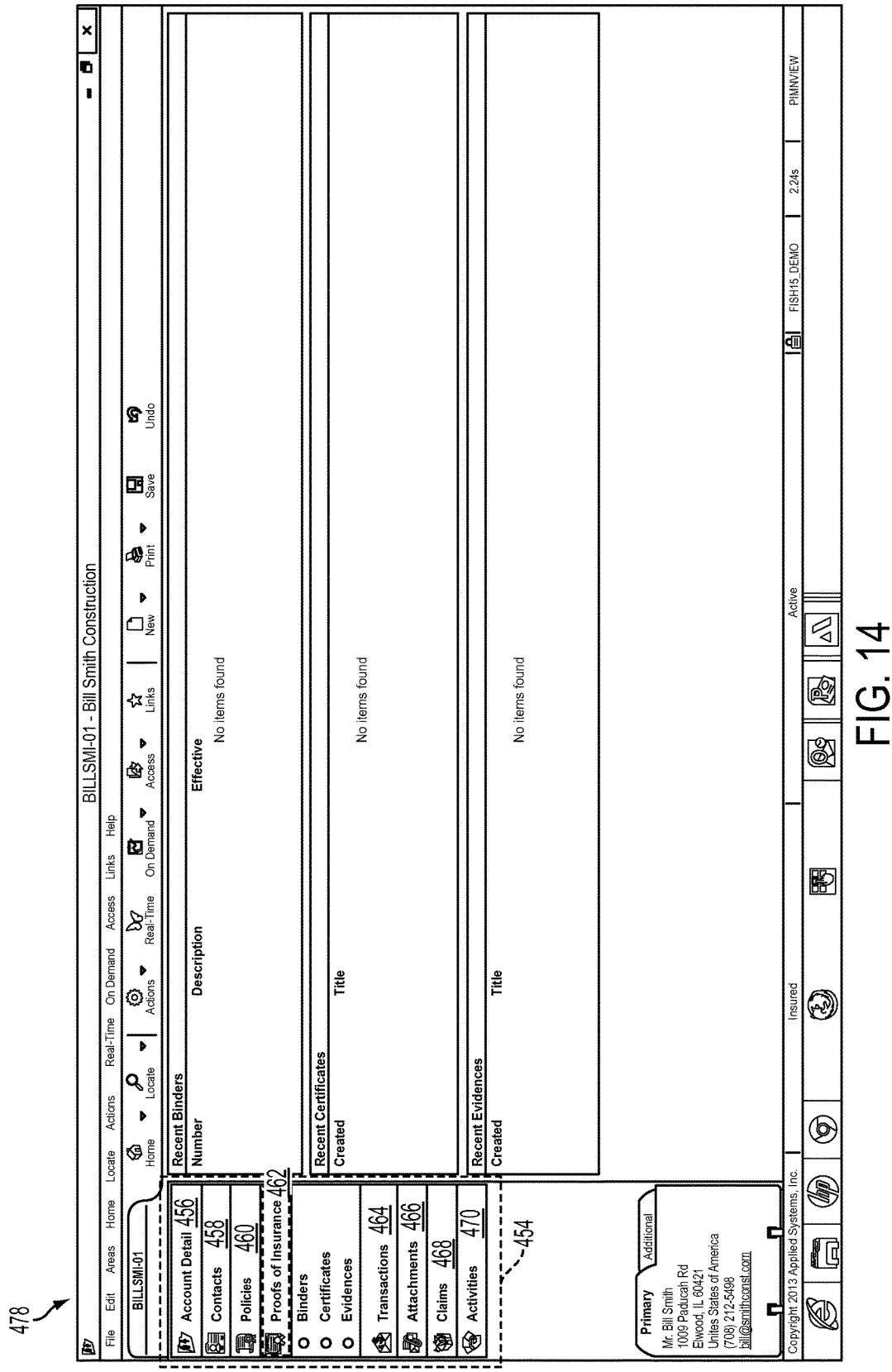
FIG. 14 is a view of one example of one embodiment of the proofs of insurance interface of the system.

In one example illustrated in FIG. 14, the system 400 displays the proofs of insurance interface 478 when the user clicks the proofs of insurance module 462 within the account of Bill Smith Construction, an insured party. As shown, the proofs of insurance interface 478 displays a plurality of fillable data fields related to recent insurance binders, recent insurance certificates and recent evidence.

Figure 15:
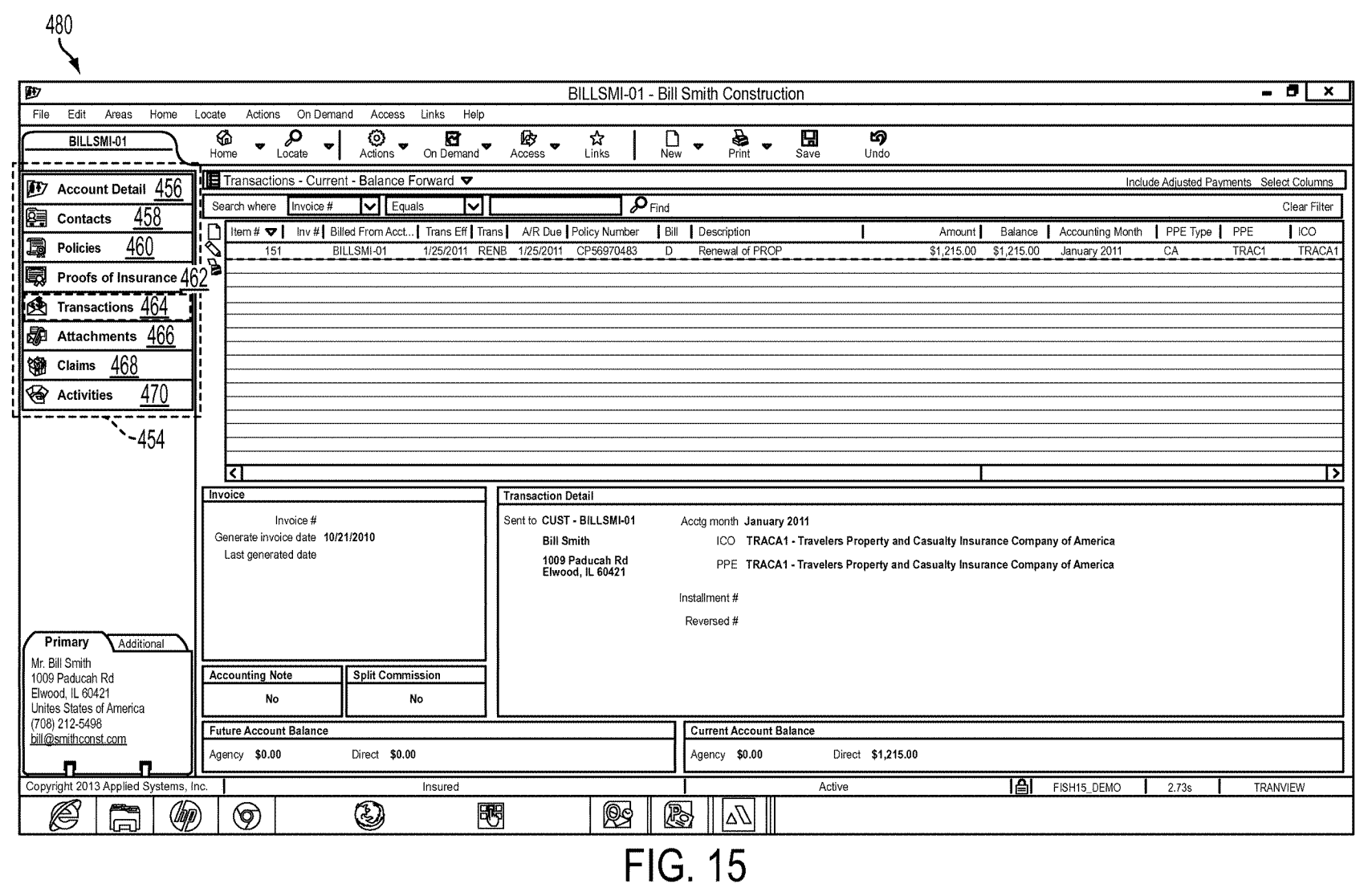

In one example illustrated in FIG. 15, the system 400 displays the transactions interface 480 when the user clicks the transactions module 464 within the account of Bill Smith Construction, an insured party. As shown, the transactions interface 480 displays a plurality of fillable data fields related to invoice number, billed from account, transaction name, accounts receivable due, policy number, bill status, description, accounting note, split commission, future account balance and current account balance.

Figure 16:
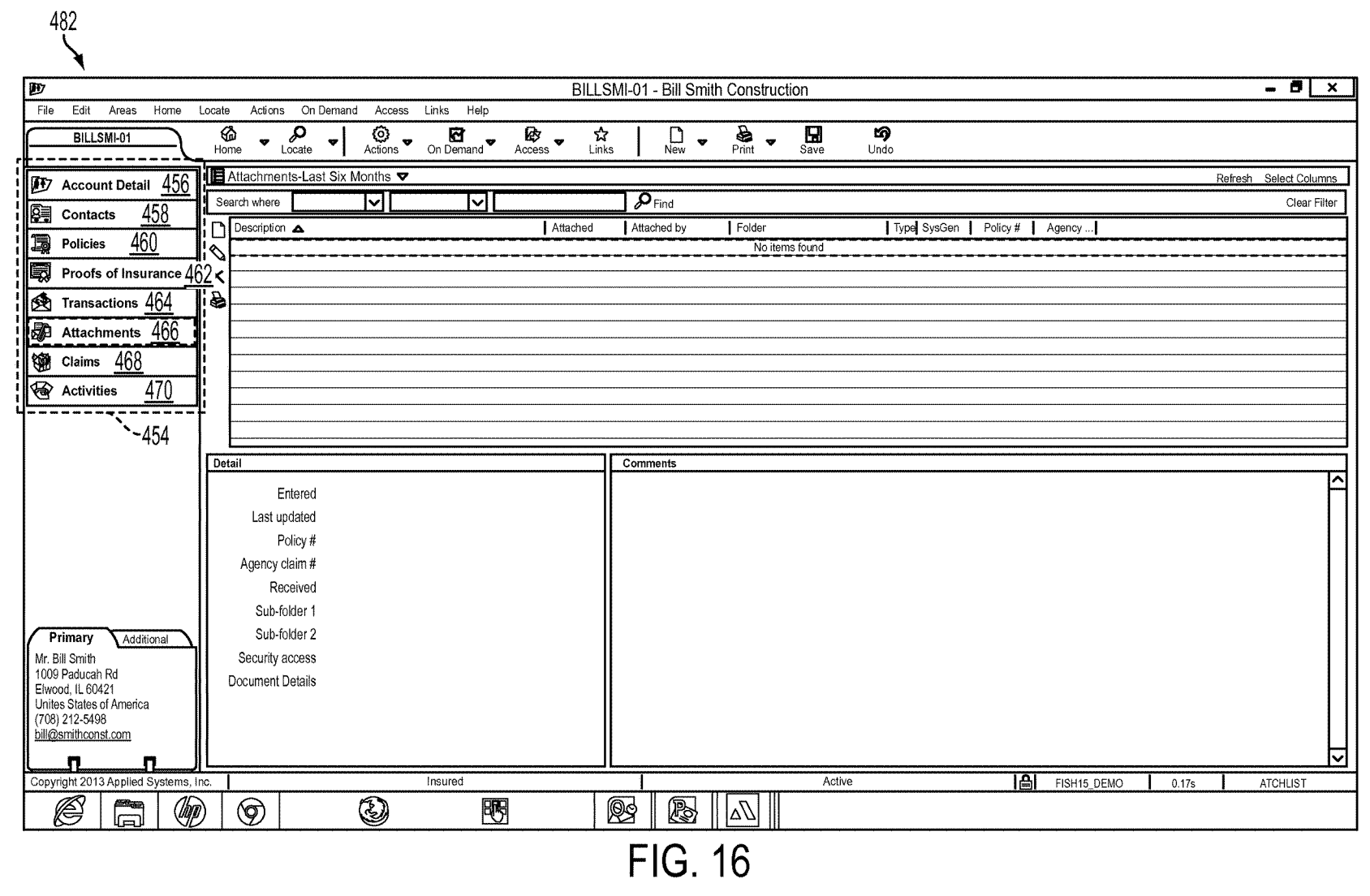

In one example illustrated in FIG. 16, the system 400 displays the attachments interface 482 when the user clicks the attachments module 466 within the account of Bill Smith Construction, an insured party. As shown, the attachments interface 466 displays a plurality of fillable data fields related to the attachments, electronic documents and data files stored by the system 400 in association with the account of Bill Smith Construction. As described in detail below, the attachments interface 466 displays the list of converted data files derived from the network access devices 410. For each listed data file, the interface 466 displays fillable data fields related to document description or document name, attached date, attached by, folder location, entered date, last updated date, policy number, agency claim number, received status, security access information and document details.

Figure 17:
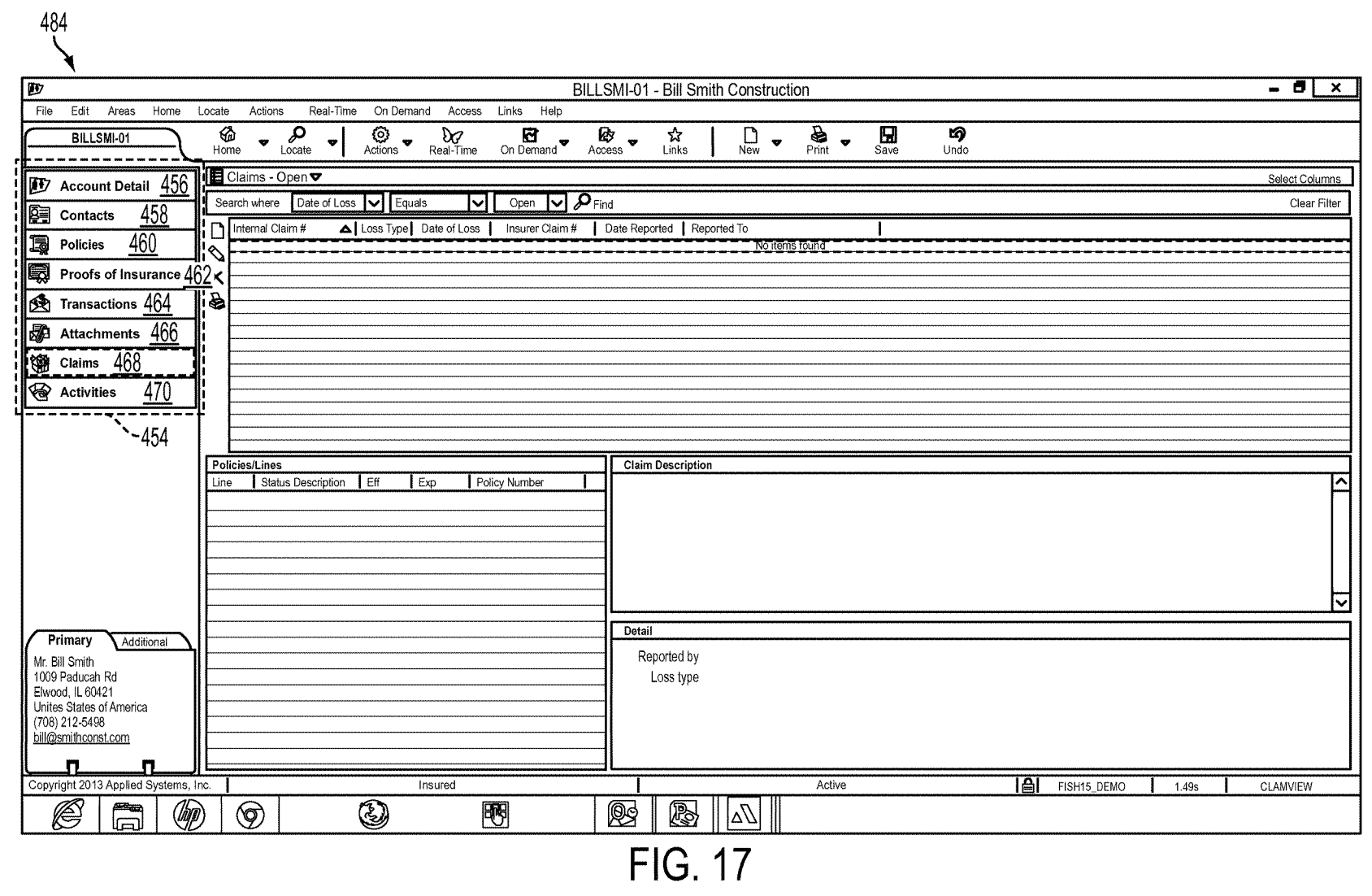

In one example illustrated in FIG. 17, the system 400 displays the claims interface 484 when the user clicks the claims module 468 within the account of Bill Smith Construction, an insured party. As shown, the claims interface 484 displays a plurality of fillable data fields related to internal claim number, loss type, date of loss, insurer claim number, date reported, reported to, insurance line, insurance status, effective date of insurance, expiration date of insurance, insurance policy number, claim description, reported by, and loss type.

Figure 18:
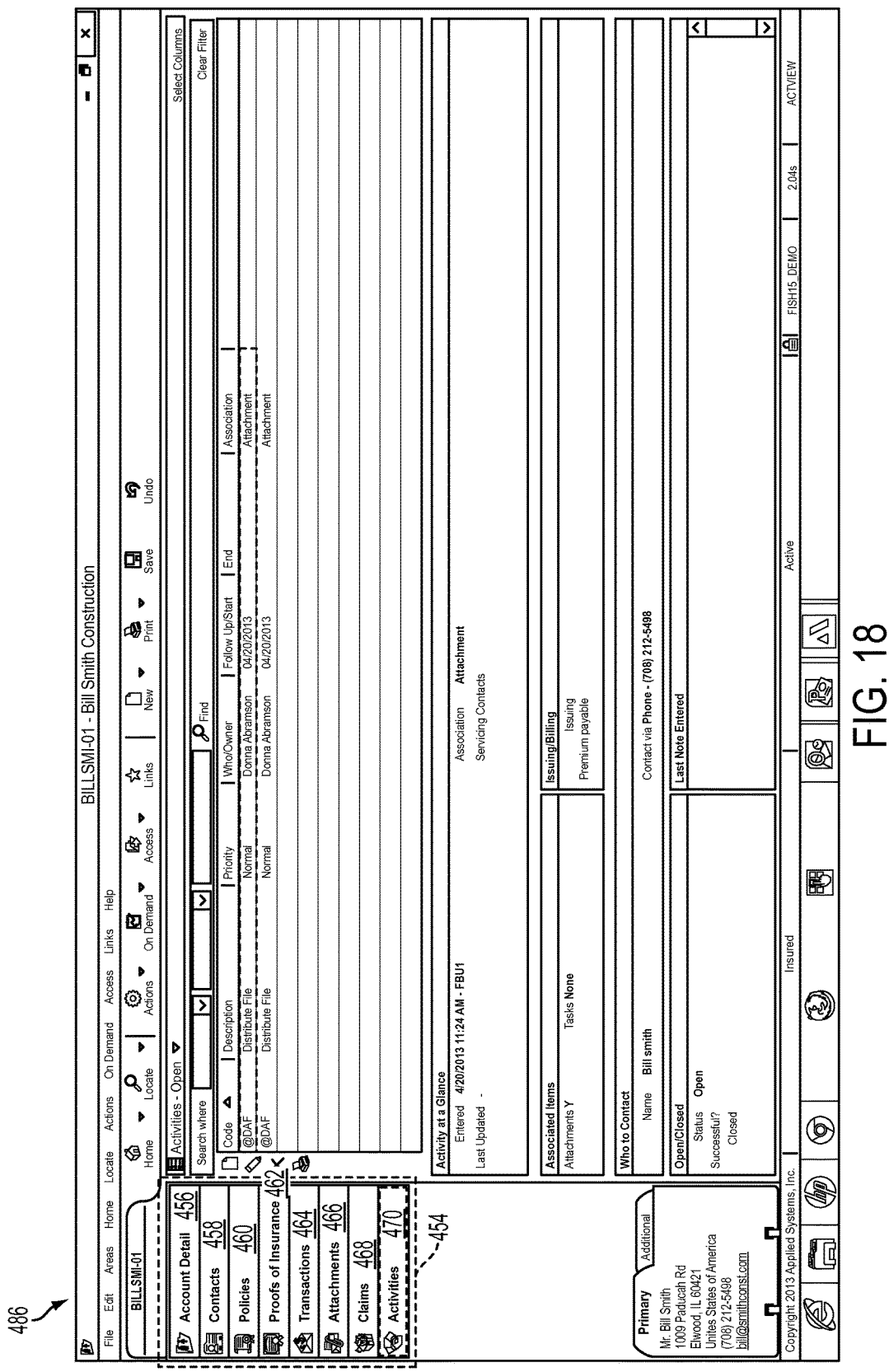
FIG. 18 is a view of one example of one embodiment of the activities interface of the system.

In one example illustrated in FIG. 18, the system 400 displays the activities interface 486 when the user clicks the activities module 486 within the account of Bill Smith Construction, an insured party. As shown, the interface 486 displays a plurality of fillable data fields related to task management or activity management. In the example illustrated, the activity management data fields relate to data activity code, description of distributed file, priority level, who/owner (the identity of the responsible agent or employee), follow-up date (the date set to follow-up with a party), end date, file association information, issuing/billing, who to contact, contact method, open/closed status and note.

Figure 19:
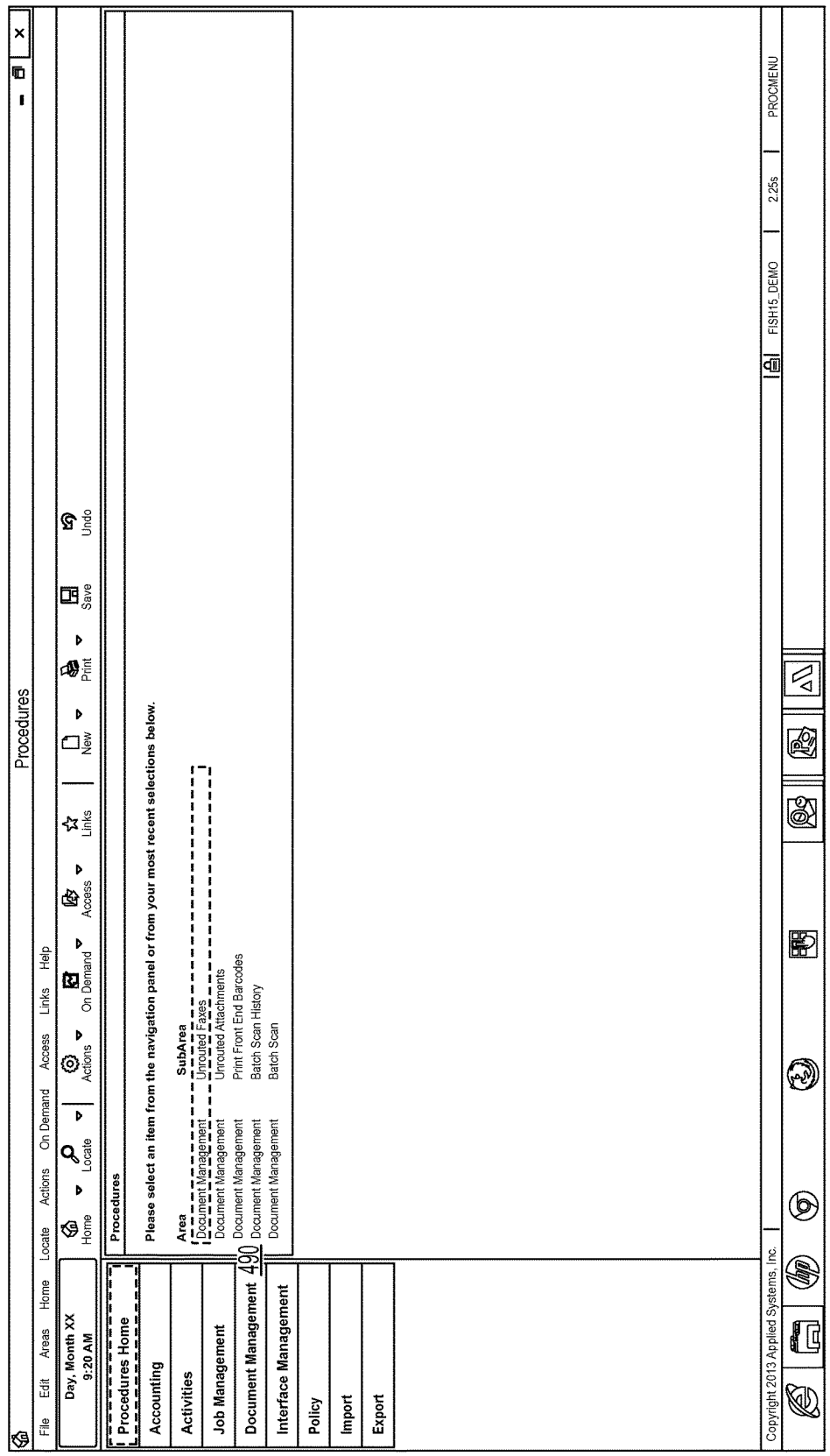
FIG. 19 is a view of one example of one embodiment of the procedures interface of the system.
Figure 20:
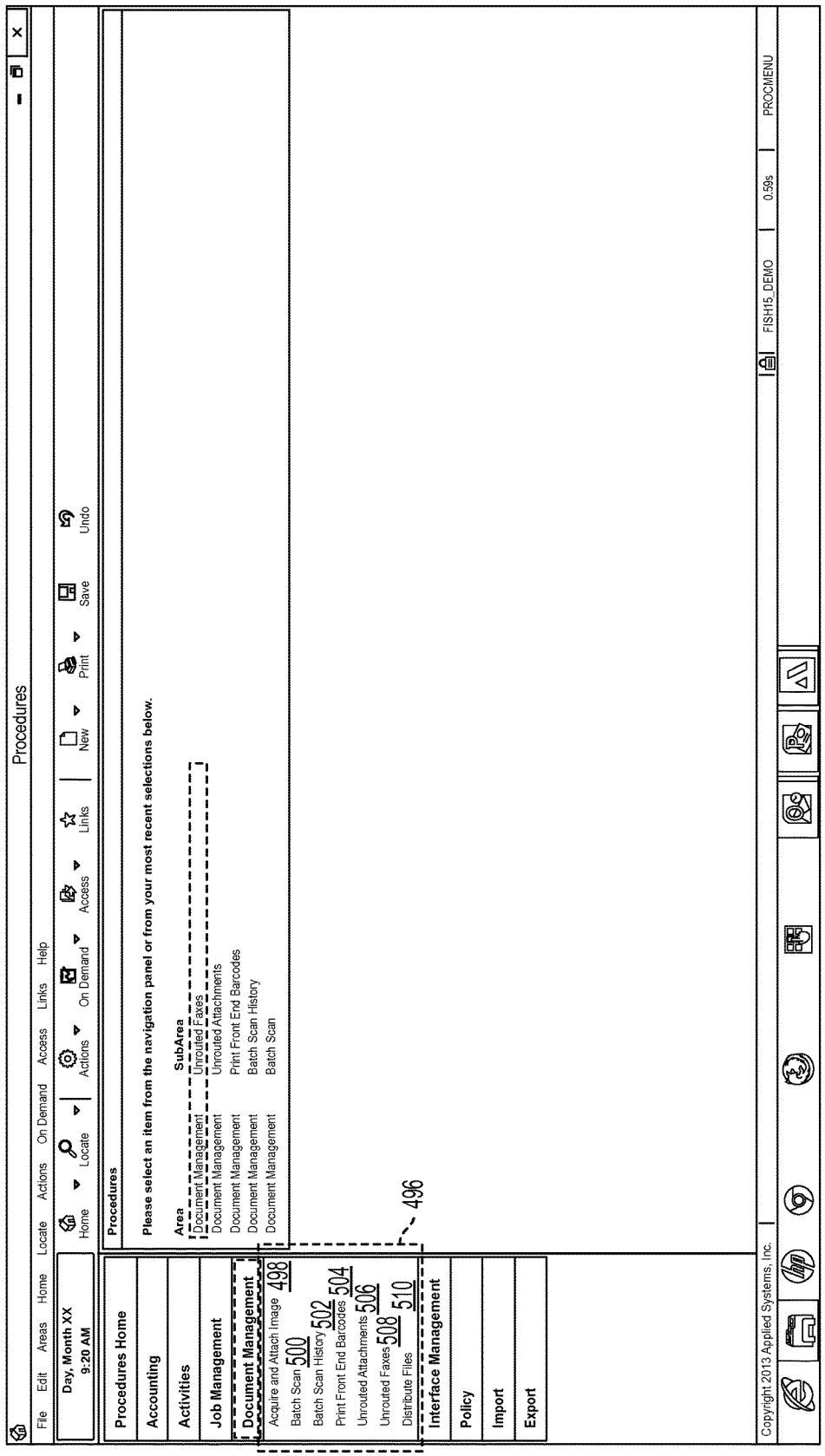
FIG. 20 is a view of one example of one embodiment of the document management interface of the system.

In one example illustrated in FIG. 19, the system 400 displays the procedures interface 488 when the user clicks the procedures module 444 within the home interface 434 shown in FIG. 9. The procedures interface 488 displays a plurality of modules, including a document management module 490. Referring to FIG. 20, the system 400 displays the document management interface 494 when the user clicks the document management module 490. The document management interface 494 displays a document management submenu 496. The document management submenu 496 displays a list of the following modules: acquire and attach image module 498, batch scan module 500, batch scan history module 502, print front end barcodes module 504, unrouted attachments module 506, unrouted faxes module 508 and distribute files module 510. The distribute files module 510 enables the user to manage the distribution or handling of converted data files received from network access devices 410.

Figure 21:
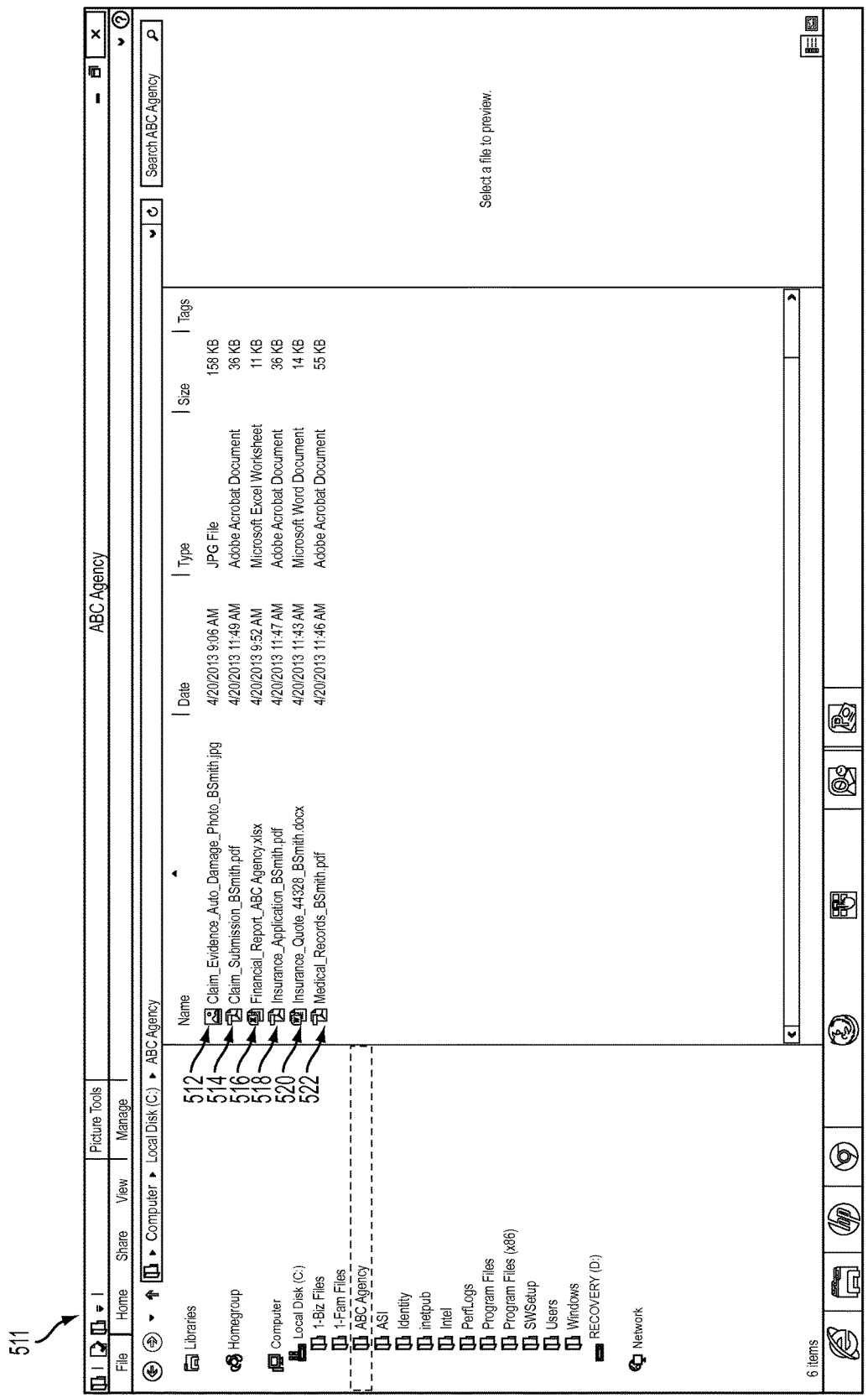
FIG. 21 is a view of one example of one embodiment of the file directory interface of the network access device or electronic device.

In one example, referring to FIGS. 8 and 21, the network access device 410 is a computer, such as a laptop or tablet, used by an insurance agent. Over a period of time, the agent receives and generates several documents related to the parties 421. The agent's computer displays a file directory interface 511 of the computer's hard drive. In this example, the incoming data files 426 include the following:

(a) a claim evidence JPG file 512 (Claim_Evidence_Auto_Damage_BSmith.jpg);
(b) a claim submission PDF file 514 (Claim_Submission_BSmith.pdf);
(c) a health insurance application PDF file 516 (Insurance_Application_BSmith.pdf); and
(d) a faxed medical records PDF file 518 (Medical_Records_BSmith.pdf).

Also, in this example, the generated data files 427 include the following:

(a) a financial report XLSX file 520 (Financial_Report_ABC_Agency.xlsx); and
(b) an insurance quote DOCX file 522 (Insurance_Quote_44328_BSmith_docx).

Figure 22:
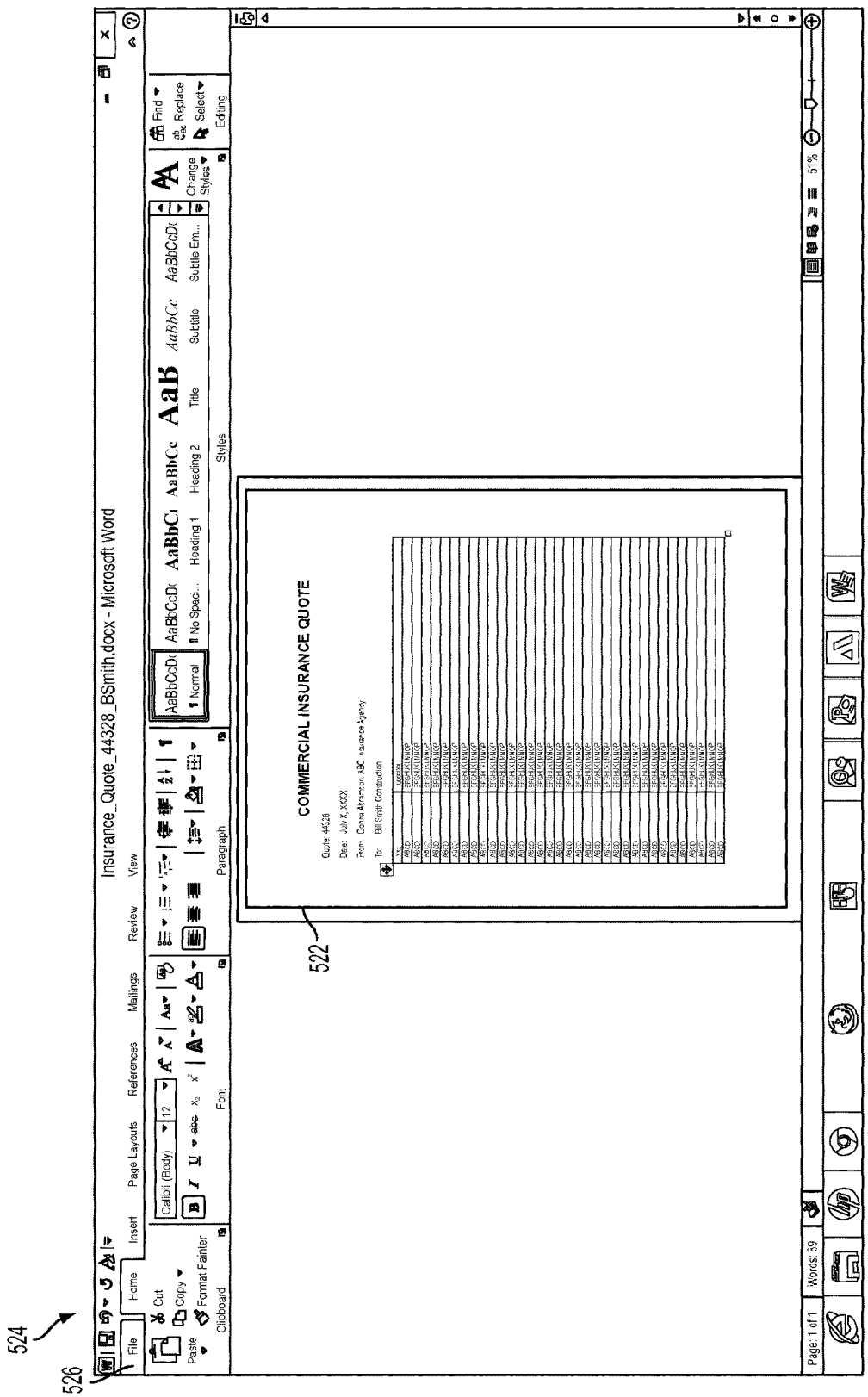
FIG. 22 is a view of one example of one embodiment of the word processing interface of the network access device or electronic device.

In one example illustrated in FIG. 22, the agent creates the insurance quote file 522 for a potential customer, Bill Smith Construction. The agent is Donna Abramson of ABC Insurance Agency. As illustrated in FIG. 22, the agent uses her Microsoft® Word software interface 524 to write and create the document file 522. At this time, the agent is already logged-in to the system 400. While viewing the document 522 on the agent's computer, the agent selects the print button (not shown) under the File menu 526.

Figure 23:
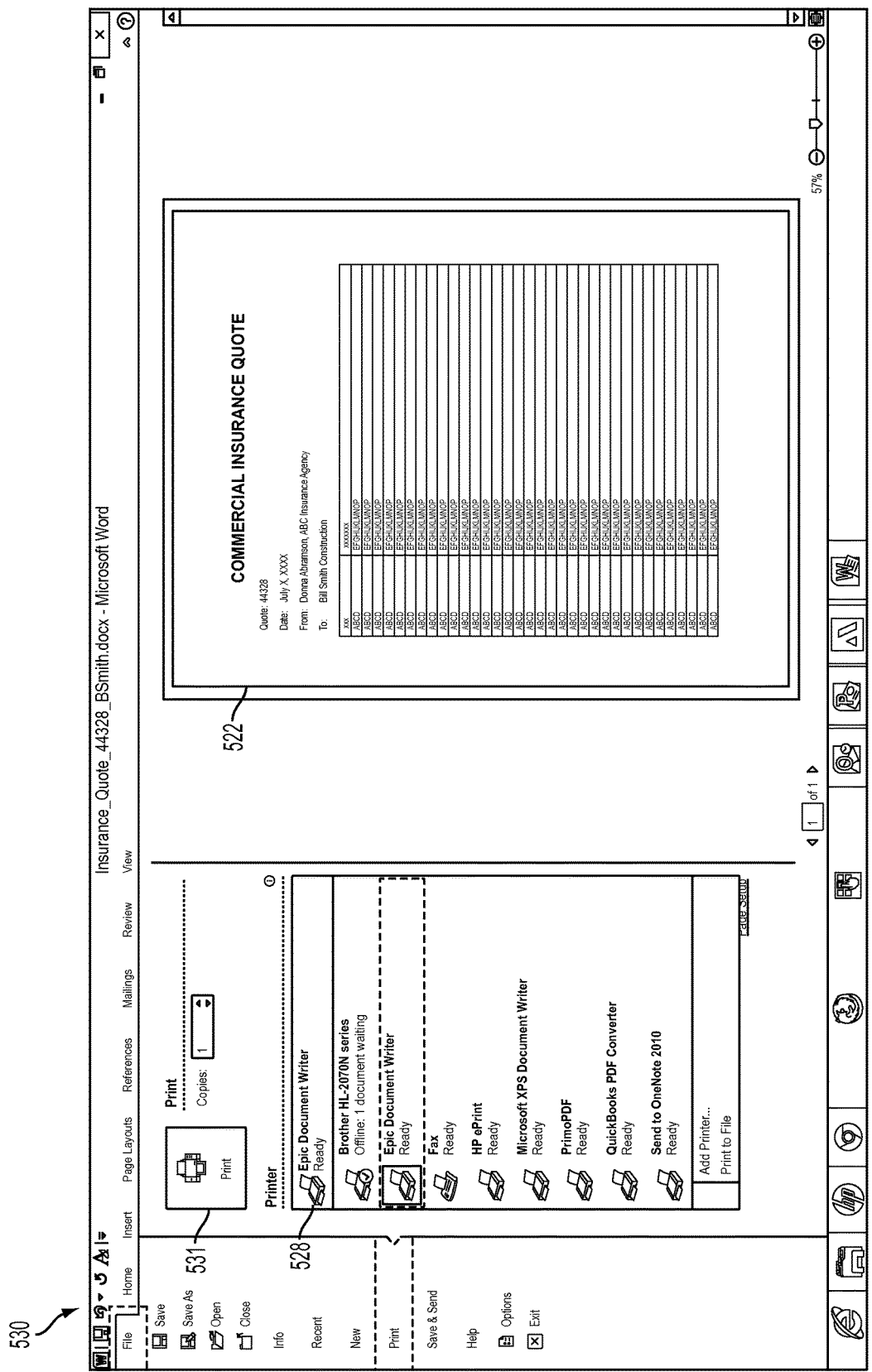
FIG. 23 is a view of one example of one embodiment of the print control interface of the network access device or electronic device.

When the agent logged-in to the system 400, the computer processor executed the device-side integrator 430 to add a virtual printer driver button 528 as illustrated in FIG. 23. The computer displays the virtual printer driver button 528 within the computer print control interface 530. The user than selects the virtual printer driver button 528. Next, the user clicks the Print button 531.

Figure 24:
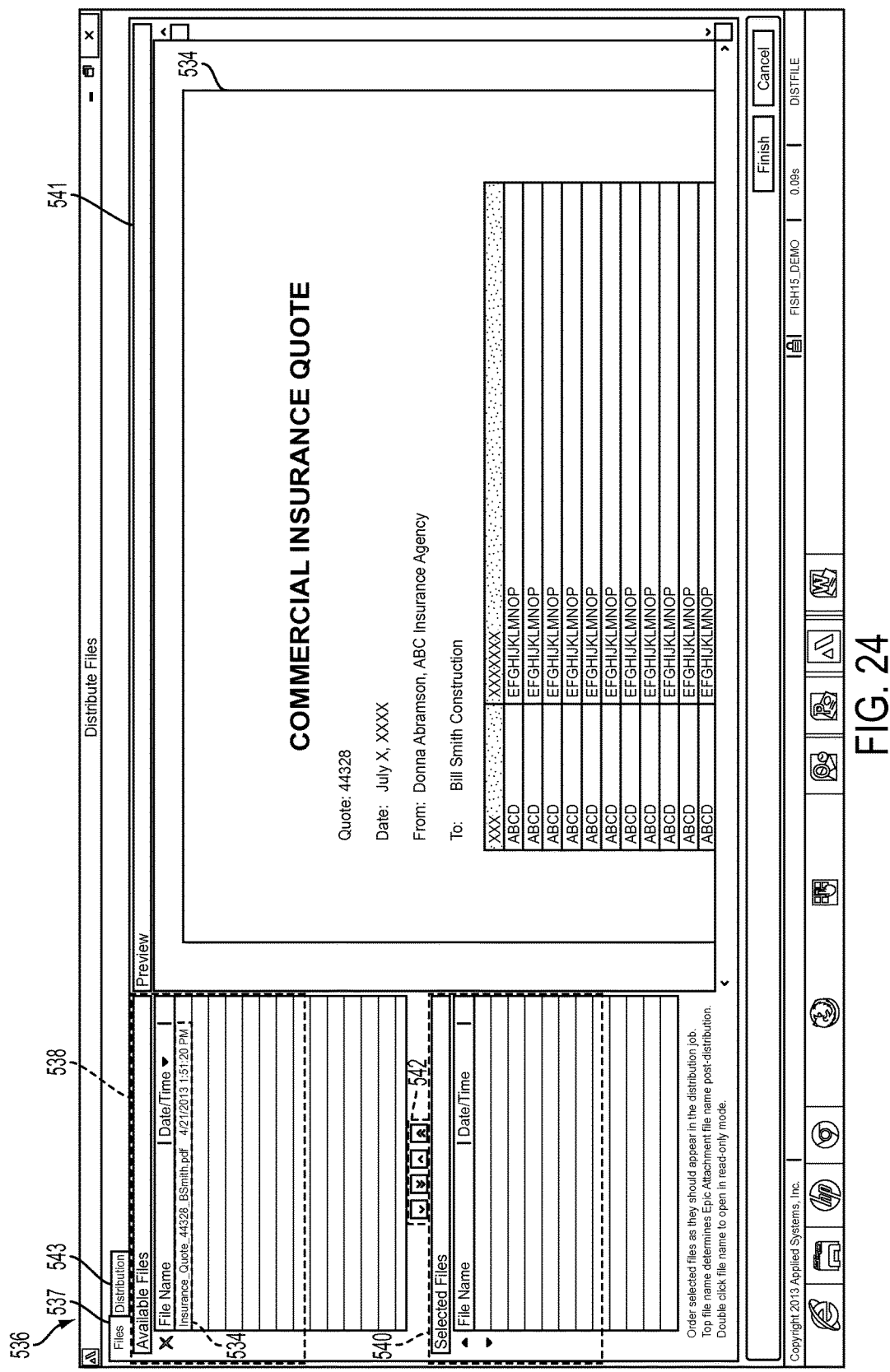
FIG. 24 is a view of one example of one embodiment of the file integration interface of the system.

Referring to FIG. 24, the computer processor then generates a converted data file 534. In this example, the computer processor converts the insurance quote DOCX file 522 from Microsoft® Word format to converted the data file 534 in PDF format. At the same time, or moments later, the computer processor sends a launch command or launch message to the system processor 408.

In response, the system processor 408 displays the file management interface or file integration interface 536 associated with the file tabs 537 and 543. The file integration interface 536 displays an attached file listing section 538, a file builder section 540 and a preview section 541. The listing section 538 automatically displays the name of the converted data file 534, and the preview section 541 displays a preview of an image of the converted data file 534.

Figure 25:
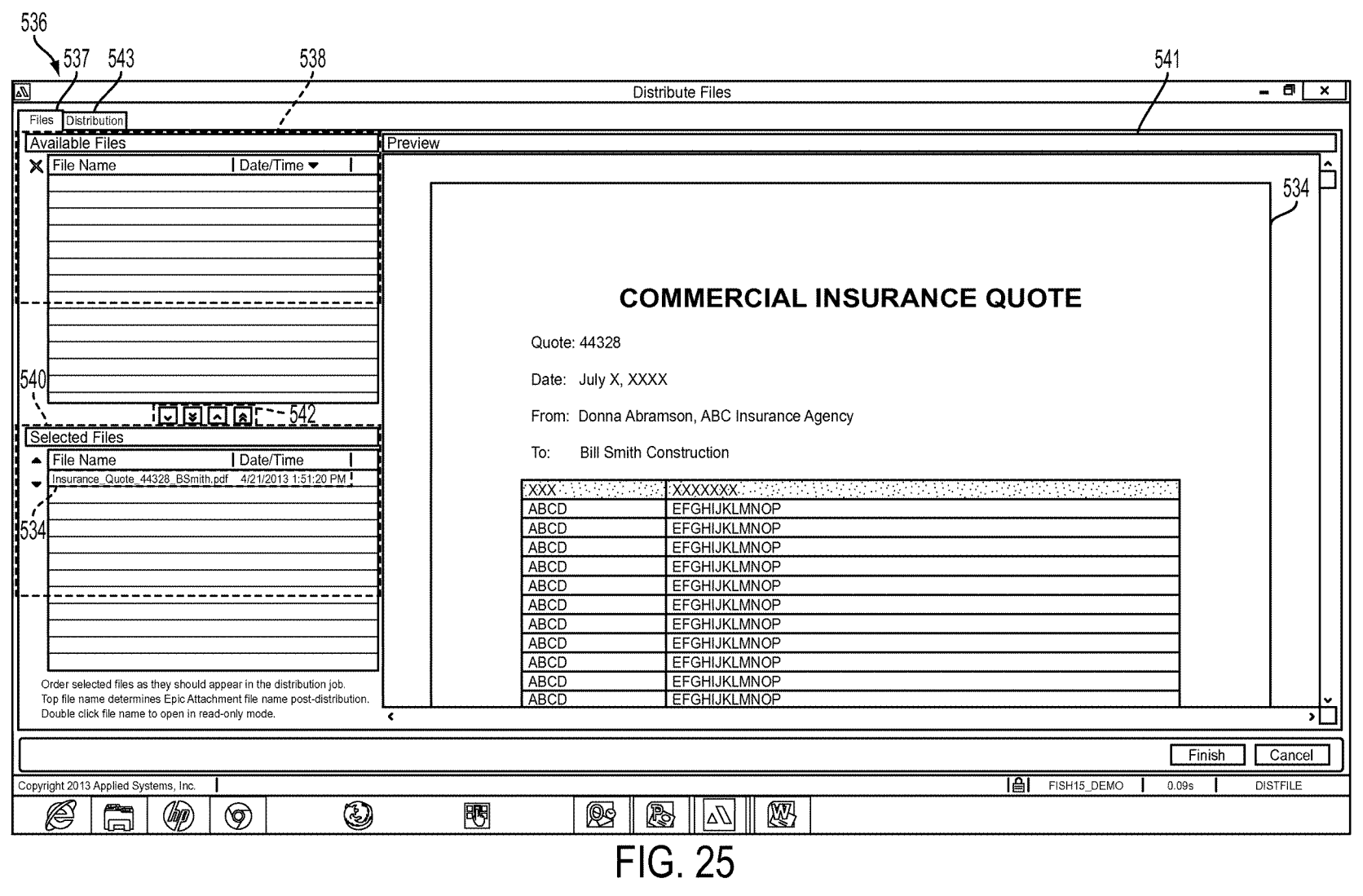

Also, the interface 536 has a plurality of file move buttons 542, including: (a) down and up buttons which move files between the listing section 537 and the builder section 540; and (b) reordering down and up buttons which change the order of a file within a file list shown in the builder section 540. To start the process of associating the converted data file 534 with an account of a party, the user highlights the file 534 and clicks the single arrow move down button of the buttons 542, causing the file to move into the file builder section 540 as illustrated in FIG. 25. If all of the listed files are to be included, the user clicks the double arrow move down button of the buttons 542.

Figure 26:
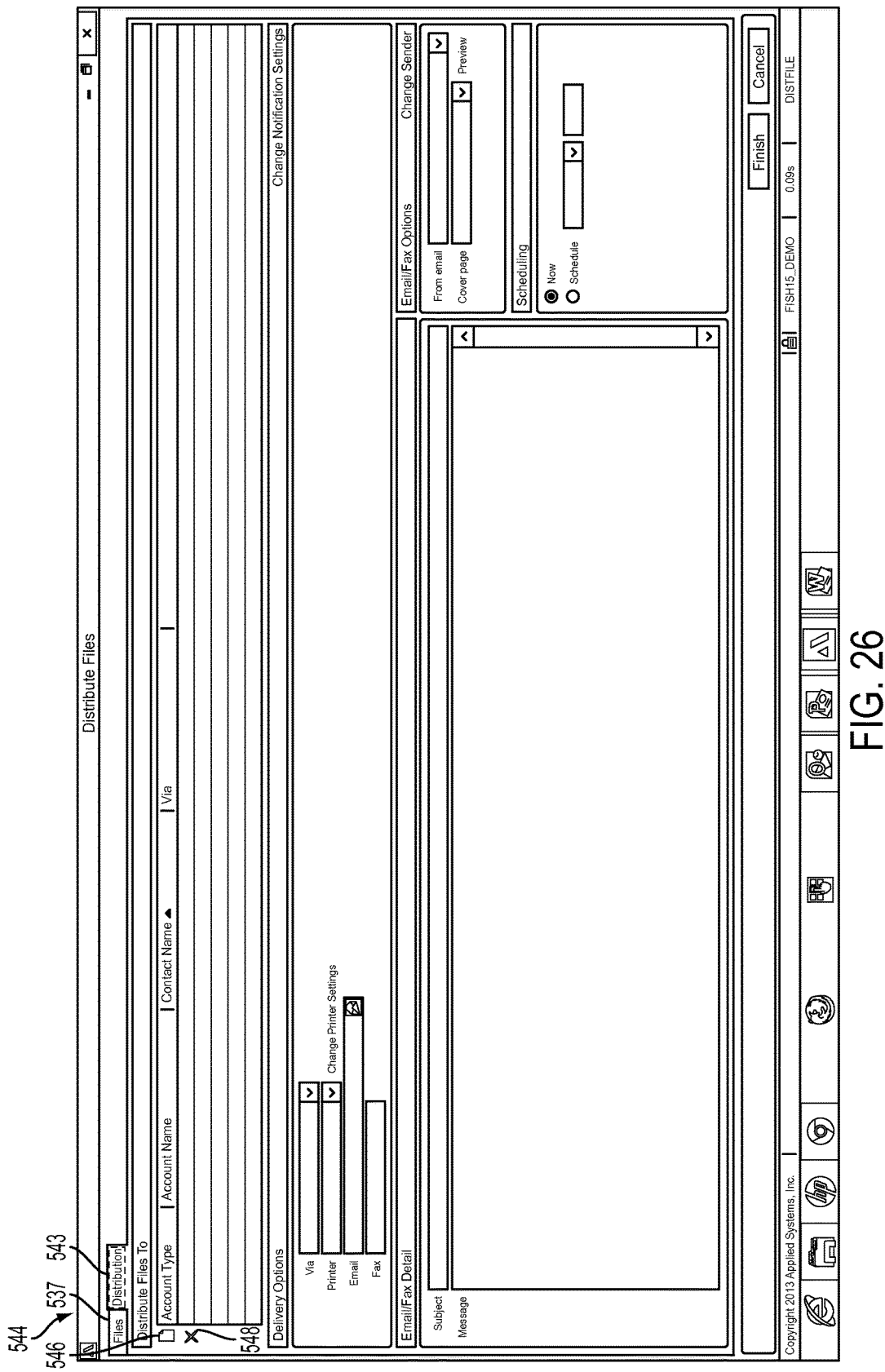
FIG. 26 is a view of one example of one embodiment of the distribution interface of the system.

Next, the user clicks the distribution tab 543. In response, the system 400 displays the distribution interface 544 as illustrated in FIG. 26. To associate a party's account with the converted data file 534, the user clicks the account addition link 546.

Figure 27:
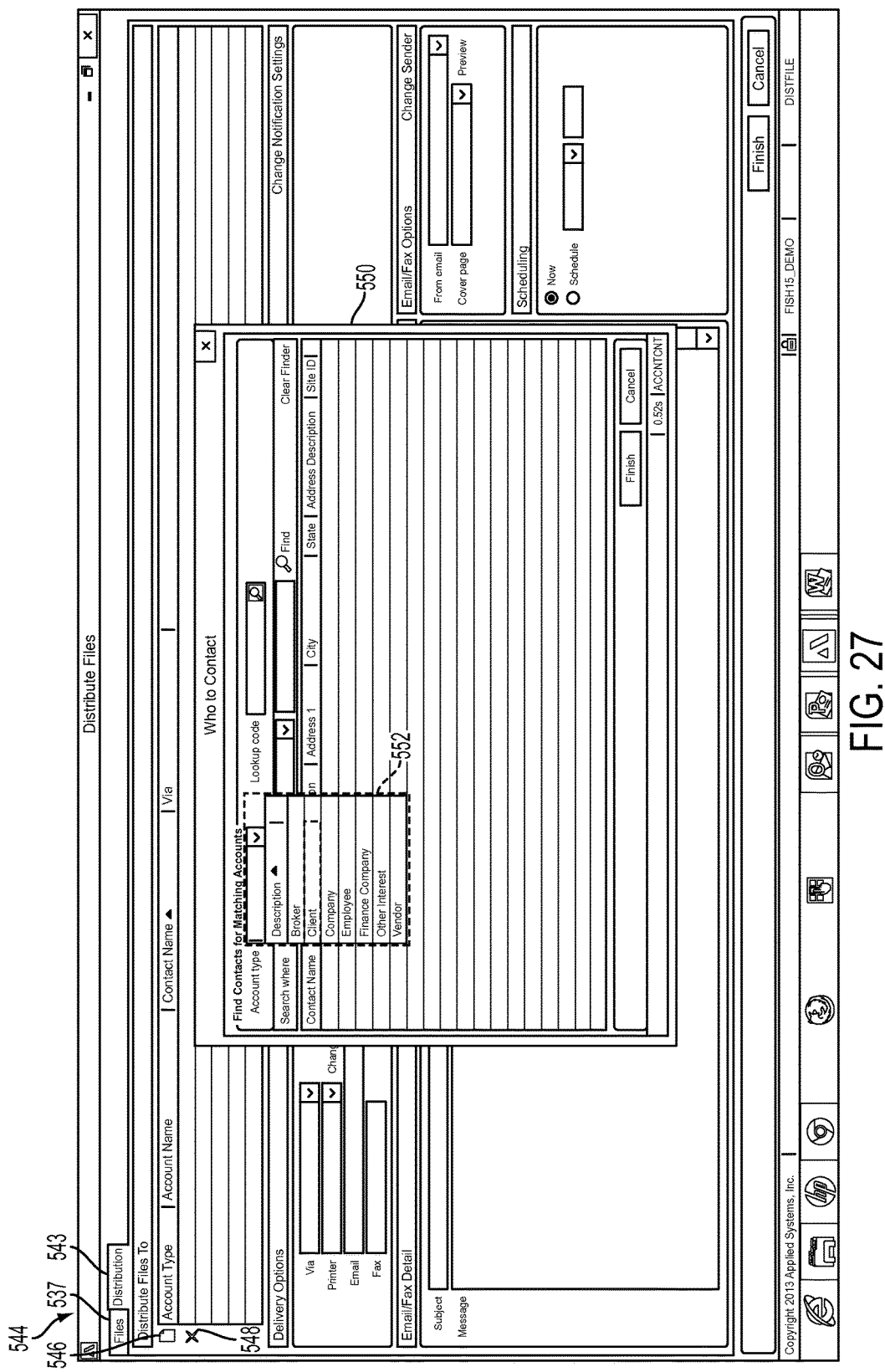
FIG. 27 is a view of another example of one embodiment of the distribution interface of the system, illustrating the popup of the account selection interface.
Figure 28:
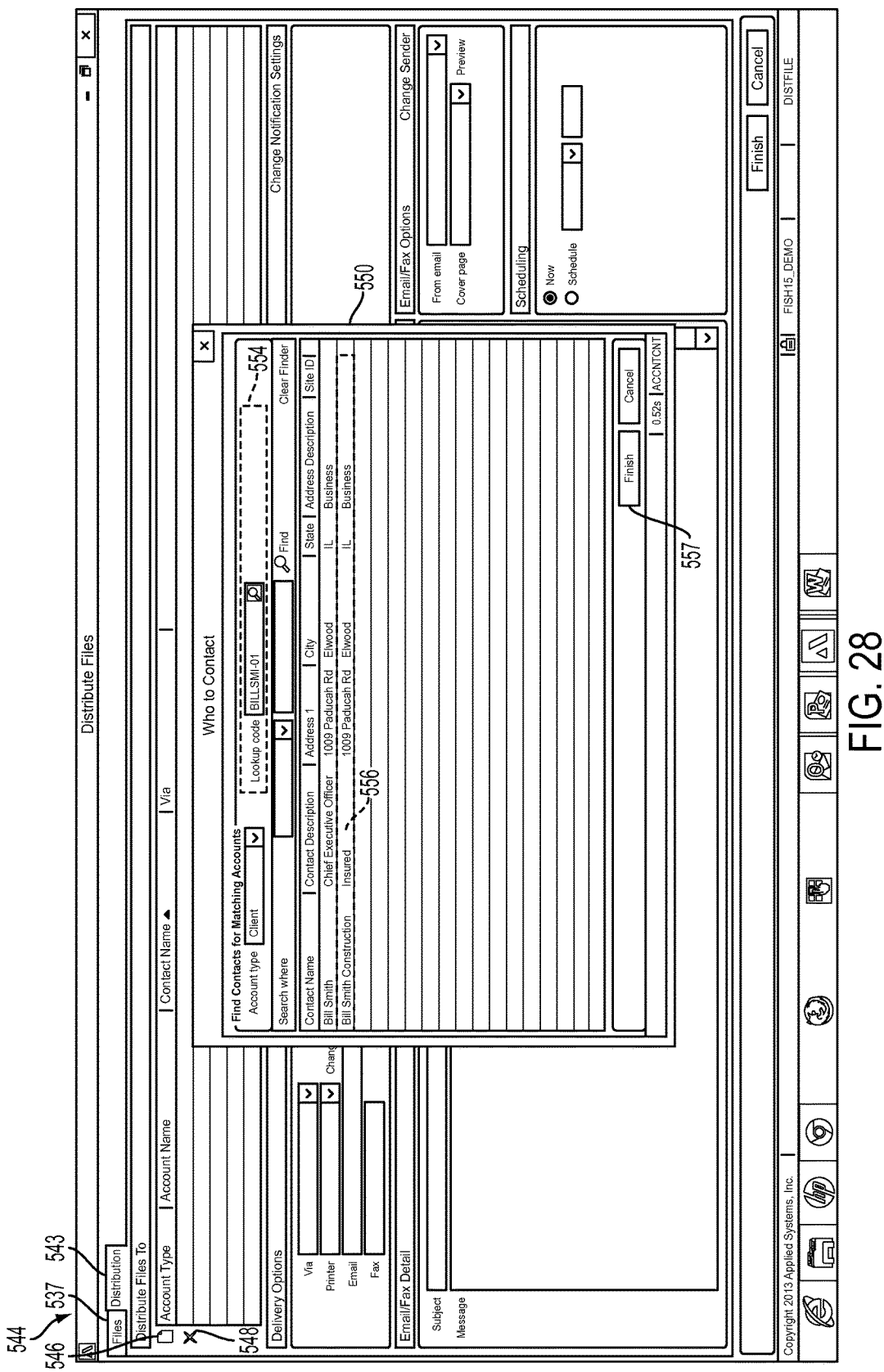
FIG. 28 is a view of another example of one embodiment of the distribution interface of the system, illustrating an example account name in the account selection interface.

After the link 546 is clicked, the system 400 displays an account selection interface 550 as illustrated in FIG. 27. The account selection interface 550 displays a pull down menu 552, enabling the user to select the type of account from a group including broker or agent, client, company, employee, finance company, other interest, and vendor. The account selection interface 550 displays account search and lookup fields 554 as illustrated in FIG. 28. In this example, the user selects the client account type, and the user enters a description or code of Bill Smith Construction in one of the lookup fields 554. In response, the system 400 displays the account name 556 which, in this example, is Bill Smith Construction. The complete the account selection process, the user clicks the finish button 557.

Figure 29:
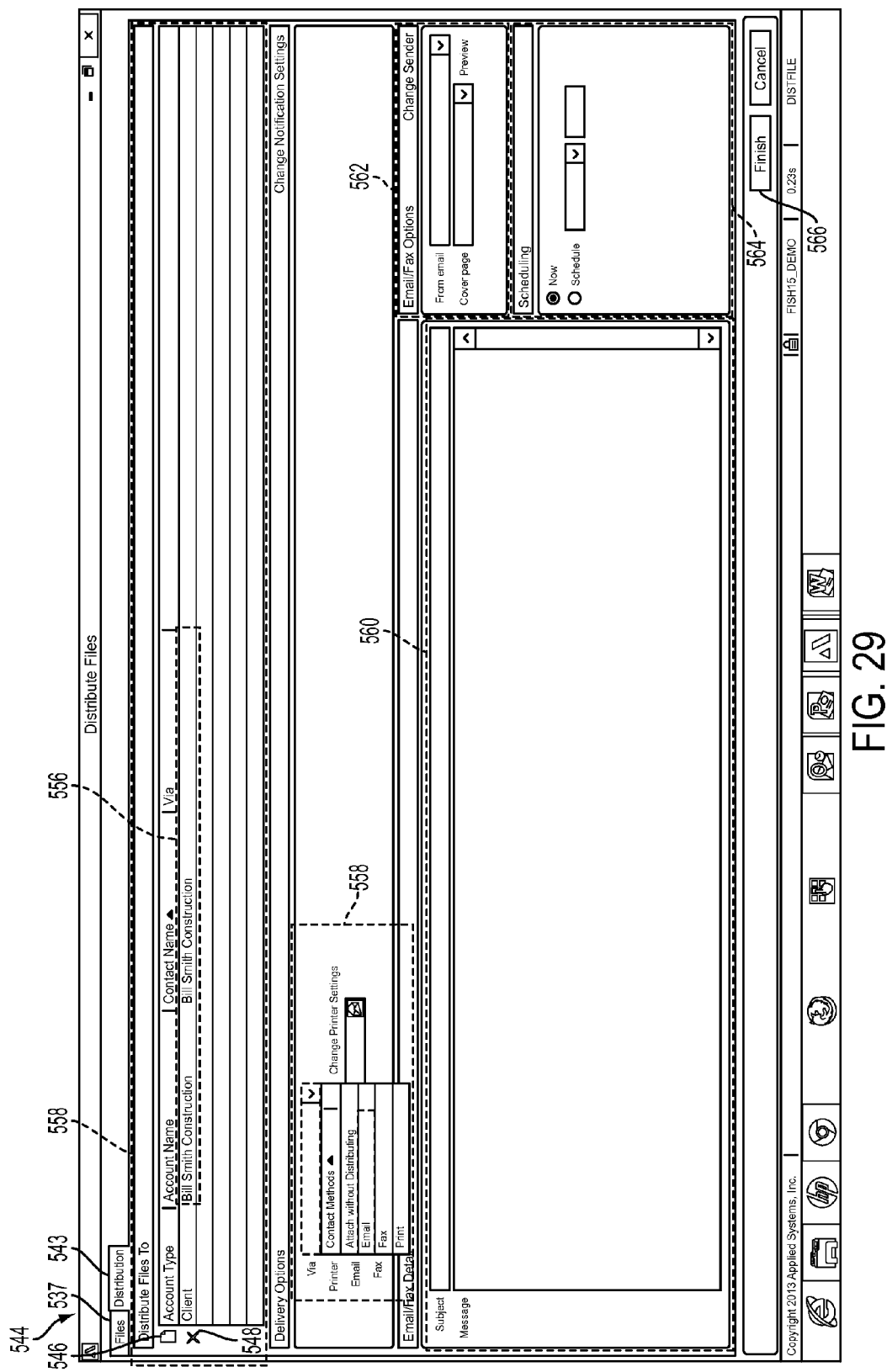
FIG. 29 is a view of another example of one embodiment of the distribution interface of the system, illustrating the populated distribution list section.

Next, referring to FIG. 29, the system 400 displays the client identity or client name 556 in the distribution list section 558. Once an account is added, the user may remove the account by clicking the delete or remove link 548. For the listed account 556, the distribution interface 544 displays a handling or distribution method menu 558. The distribution method menu 558 displays a plurality of selectable handling methods, including: (a) attachment without distribution; (b) email; (c) fax; and (d) print. Also, the distribution interface 544 includes subject and message sections 560. The subject and message sections 560 are fillable with the following: (i) a topic summary or communication description written by the user to identify the fax or email; and (ii) a note or text written by the user. In one embodiment, the system 400 incorporates the entered text into the email or facsimile sent with the attached file 534. The email/fax options section 562 of the distribution interface 544 includes a plurality of fields fillable with the email sender's name and a selectable fax cover page. The scheduling section 564 includes a "now" selection for specifying immediate email or fax distribution of the file 534. The scheduling section 564 also includes a "schedule" selection fillable with a desired date entered by the user. The system 400 will send the email or fax on the entered date.

It should be appreciated that the system 400 enables the user to associate multiple accounts with a distribution of a file. To do so, the user clicks the account addition link 546 again and then repeats the same process described above for associating the first account. Accordingly, the system 400 is operable to attach and distribute the data file to multiple parties upon completion of the integration process.

To complete the file attachment process, the user clicks the finish button 566. At this point, the system processor 408 receives a copy of the converted data file from the device processor of the network access device 410. In one embodiment, the original converted data file remains stored on the network access device 410 until the user deletes it. In another embodiment, the system 400 causes the original converted data file on the device 410 to be deleted after a designated event occurs, such as the expiration of a period of time and a future log-in to the system 400.

Figure 30:
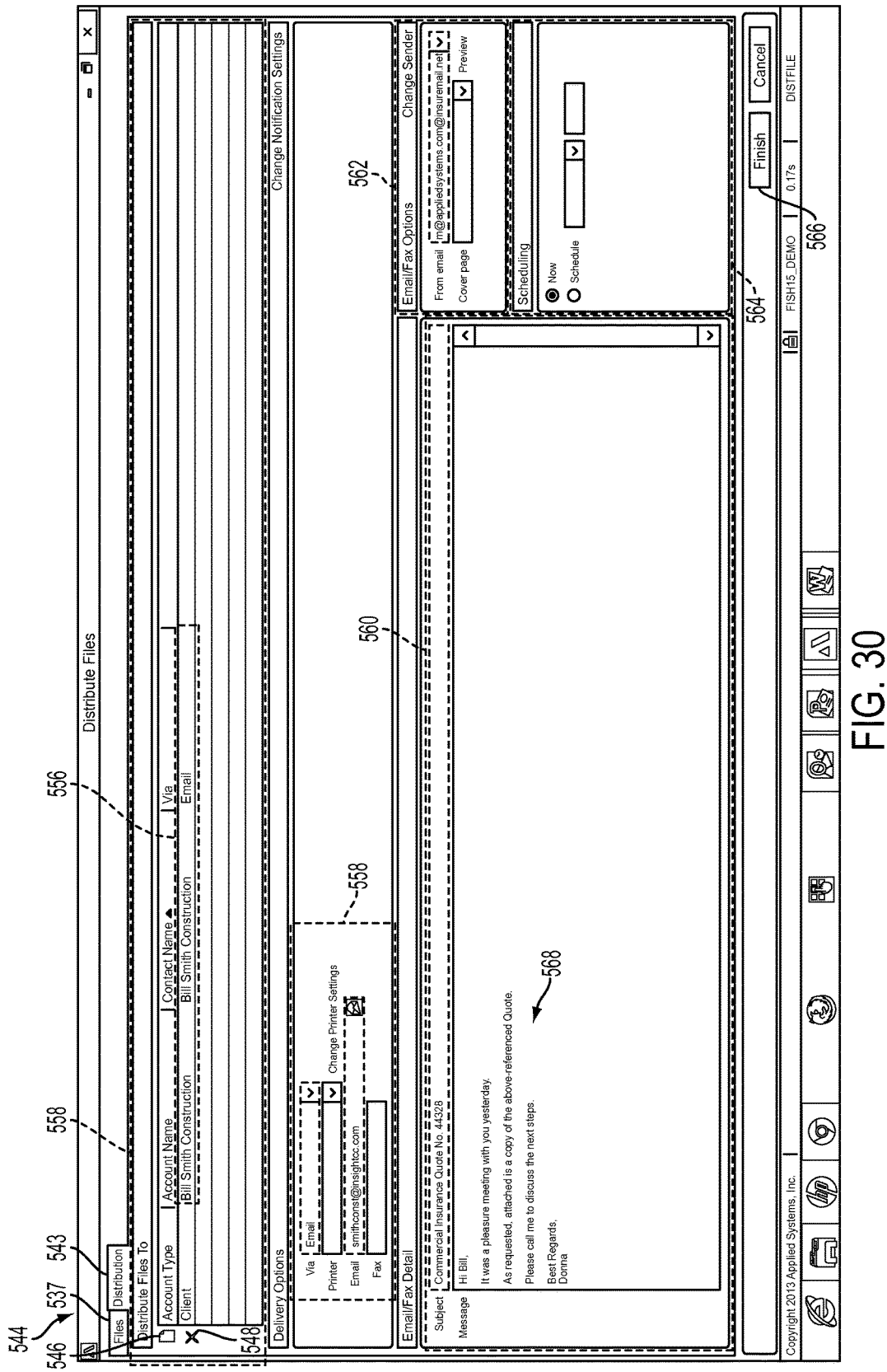
FIG. 30 is a view of another example of one embodiment of the distribution interface of the system, illustrating a message or note typed by the user.

In the example illustrated in FIG. 30, the user selects the email distribution method, enters a note or message 568, selects a "from email" address and sets a "now" schedule for immediate delivery of the email.

Figure 31:
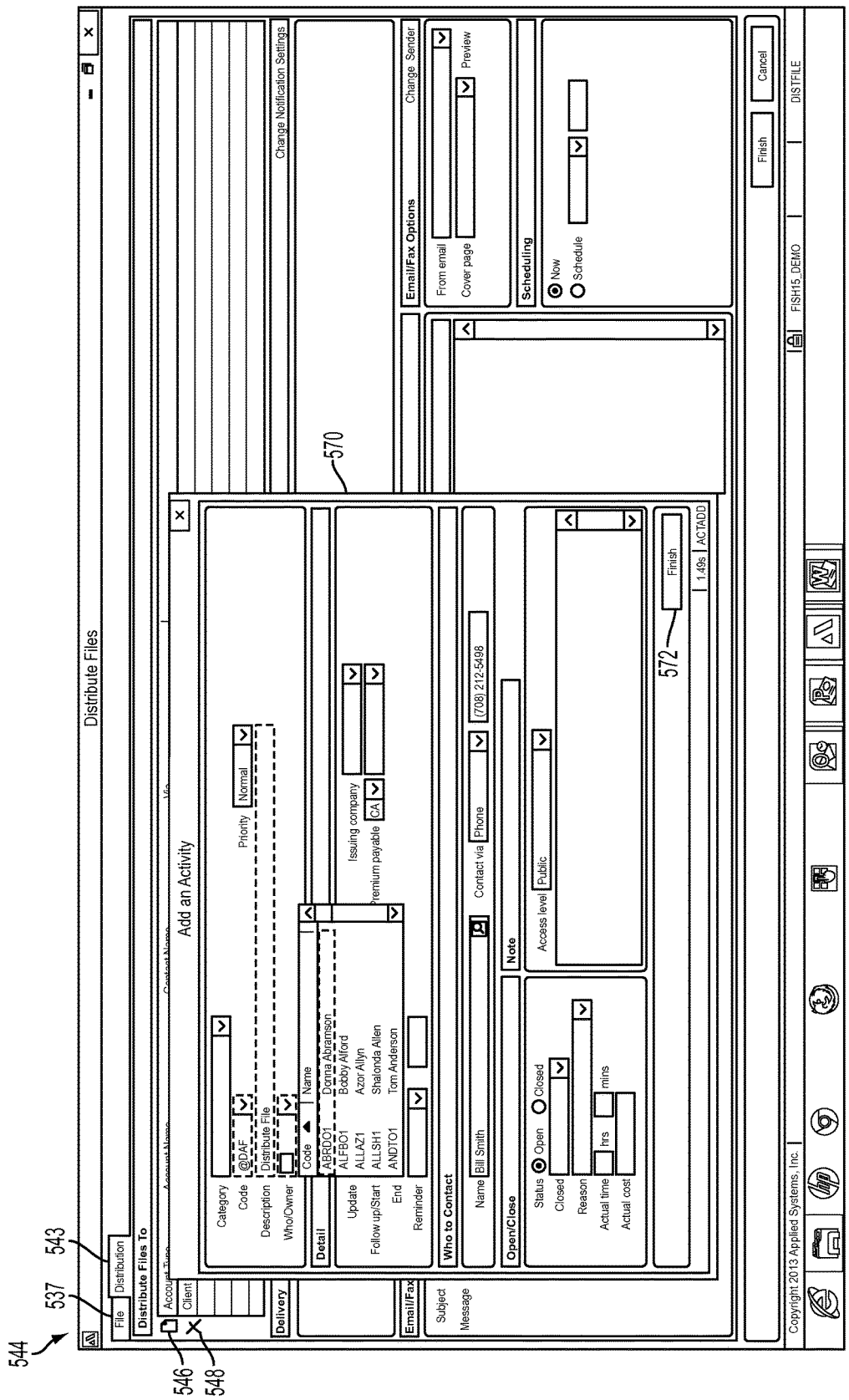
FIG. 31 is a view of one example of one embodiment of the distribution interface of the system, illustrating the popup of the activity addition interface.

Next, the system 400 displays the activity interface 570 as illustrated in FIG. 31. The activity interface 570 displays a plurality of data fields fillable with data related to different categories of activity management data related to the handling or distribution of the file 534. The task management information or activity management data includes a distribution or handling code, a description related to the file handling or distribution, the selectable name or identifier of the person or agent responsible for the file handling or distribution, the priority level, update status, follow-up/start date, end date, reminder setting, policy issuing company, premium payable location, selectable name of the contact person linked to the selected party account, the person's phone number, open/closed status, open/closed reason, actual time, actual cost, and public or private access level. After the user has enters the desired activity management data, the user may click the finish button 572.

At this point, the system processor 408, directed by the document integrator 428, integrates the data file 534 into the system 400.

In one embodiment, if the distribution method is fax, the system processor 408 generates a fax cover sheet TIF file containing the fax cover sheet contents input by the user. In this embodiment, the system processor 408 integrates the data file 534 and the fax cover sheet file into the system 400. In another embodiment, if the distribution method is email, the system processor 408 generates an email message file containing the email subject description and message input by the user. In this embodiment, the system processor 408 integrates the data file 534 and the email file into the system 400.

Figure 32:
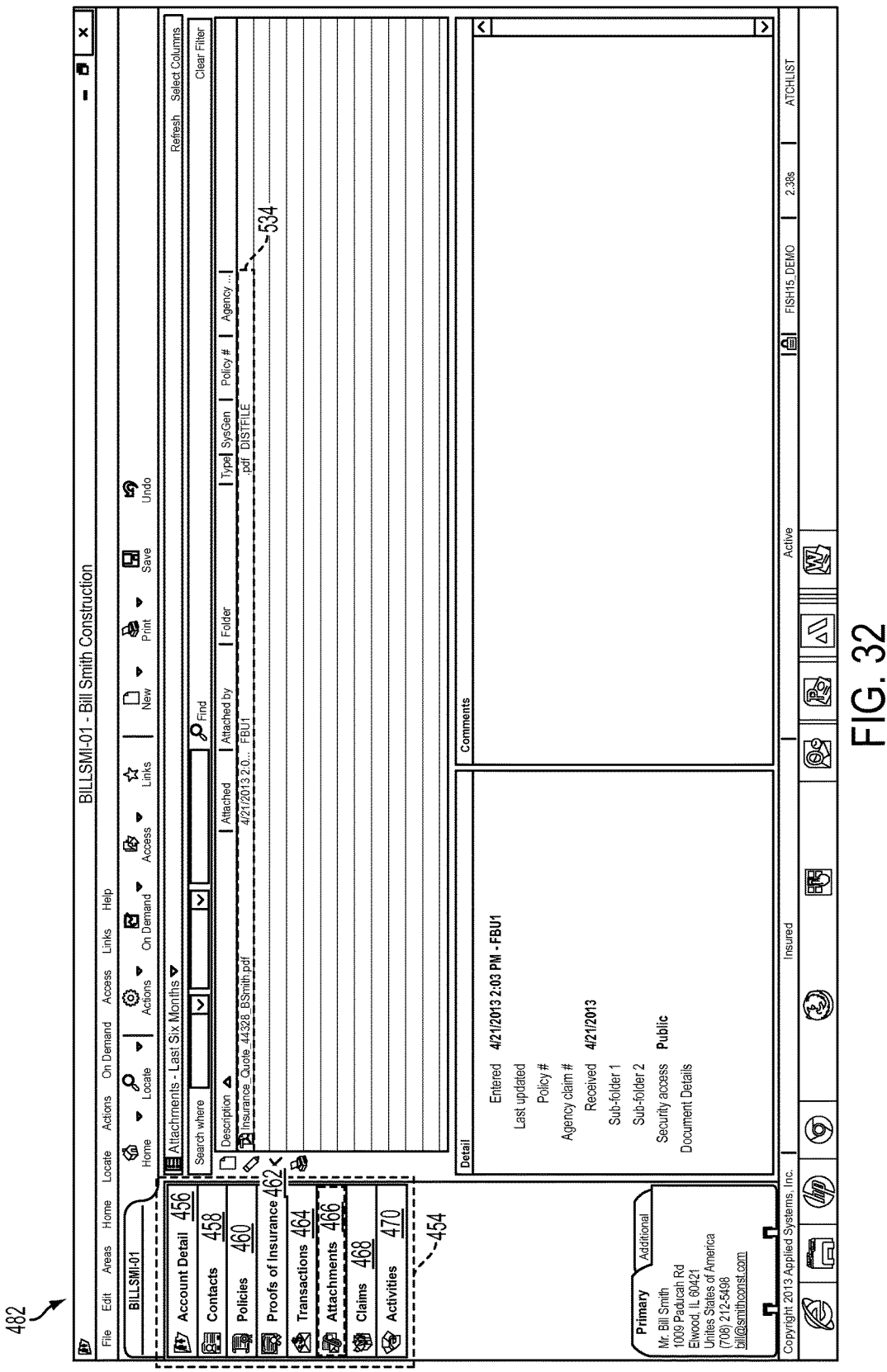
FIG. 32 is a view of one example of one embodiment of the attachments interface of the system populated with an attached data file.

As a result of the integration, the system processor 408 associates a plurality of items with the account of the party, Bill Smith Construction. These items include the information and activity management data input by the user through the one or more interfaces of the file integration interface 544. The user may view this associated information and data within the accounts module 438 illustrated in FIG. 9. Referring to FIG. 32, when the user clicks the attachments link 466 within the account interface of Bill Smith Construction, the attachments interface 482 displays the name or descriptor of the integrated data file 534. Based on the data that the user input when attaching the file, the attachments interface 482 displays additional data, such as the attachment date and time, the name or code of the user who attached the file, the folder location of the data file, the format type of the data file, the associated insurance policy number, the associated insurance agency, details and comments.

Figure 33:
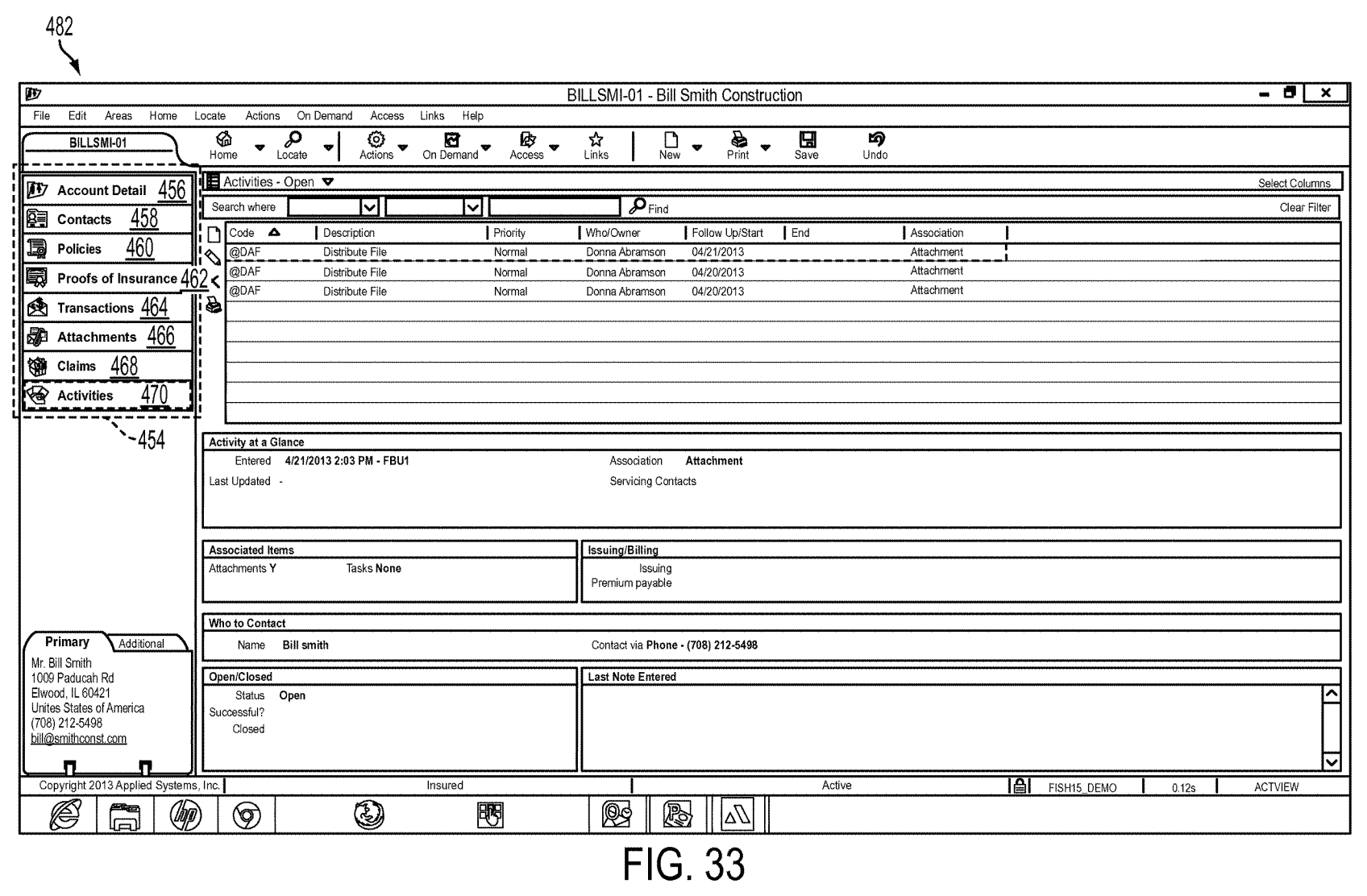

Referring to FIG. 33, when the user clicks the activities link 470 within the account interface of Bill Smith Construction, the activities interface 486 displays the activity management data input by the user when attaching the file, including the list of distribution activity items, the activity code, file or distribution description, the priority level, the name of the responsible user or agent which, in this example, is Donna Abramson, the follow/start date, the end date, the association, the date and time entered, the name of the person to contact which, in this example, is Bill Smith, and other task-related or activity-related data.

Figure 34:
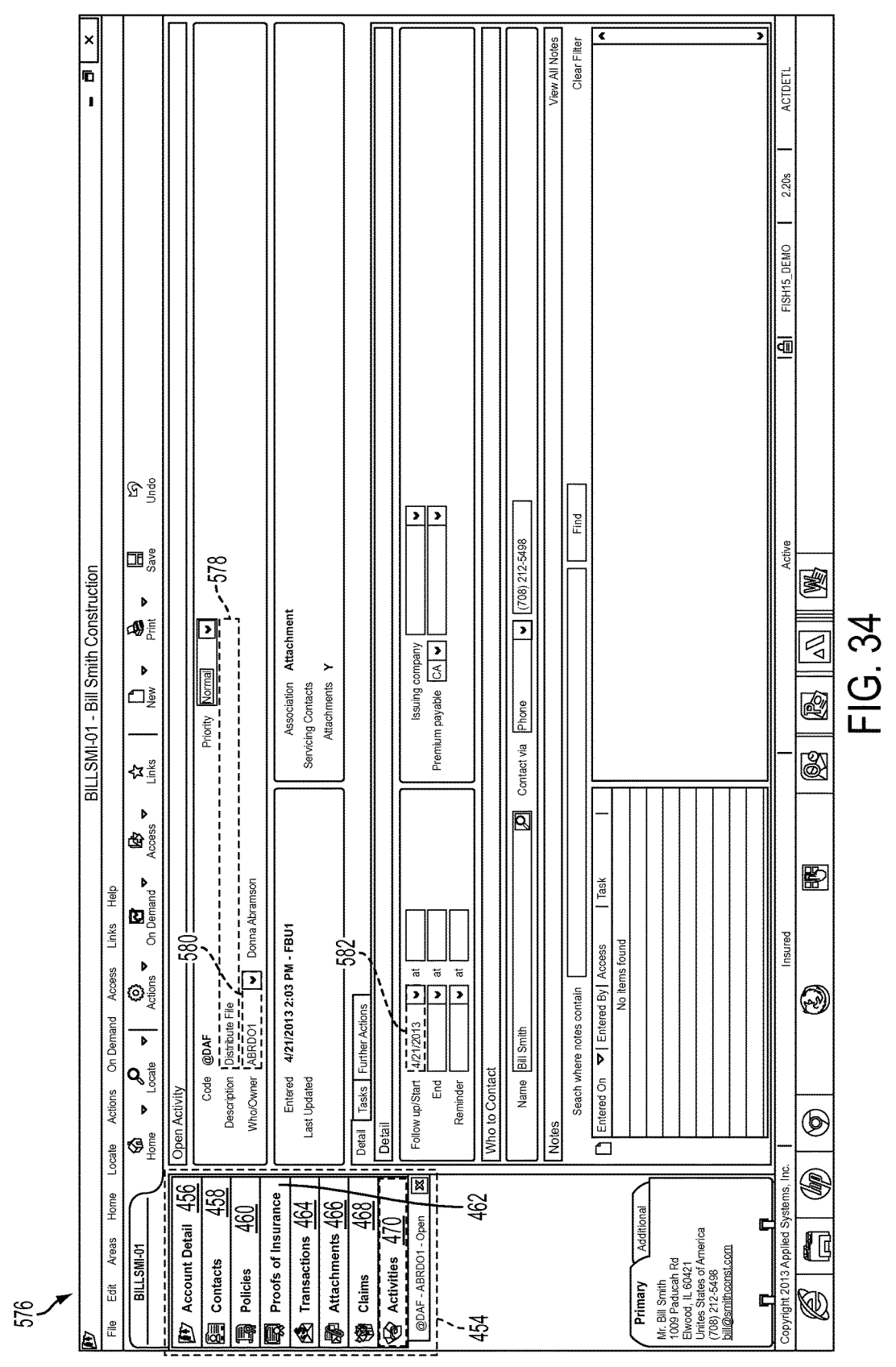

When the user clicks one of the activity items, such as activity item 574, the system 400 displays the editable activity interface 576 as illustrated in FIG. 34. The editable activity interface 576 displays activity data fields which are updatable by the user. For example, the user can change or update the description 578 of the file distribution, the name 580 of the owner, the follow-up/start date 582 and other activity information.

Figure 35:
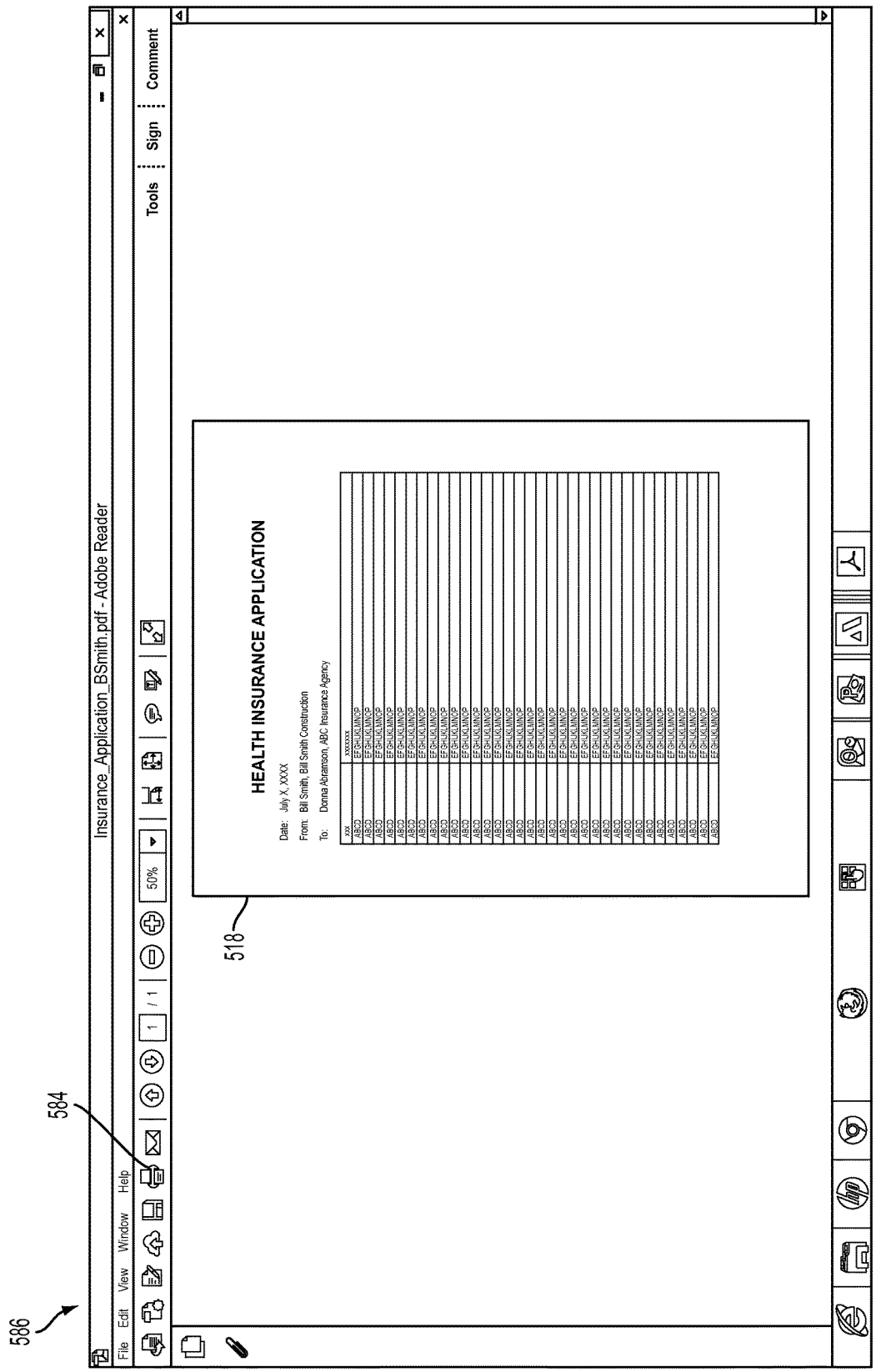
FIG. 35 is a view of one example of one embodiment of the file viewer interface of the network access device or electronic device.
Figure 36:
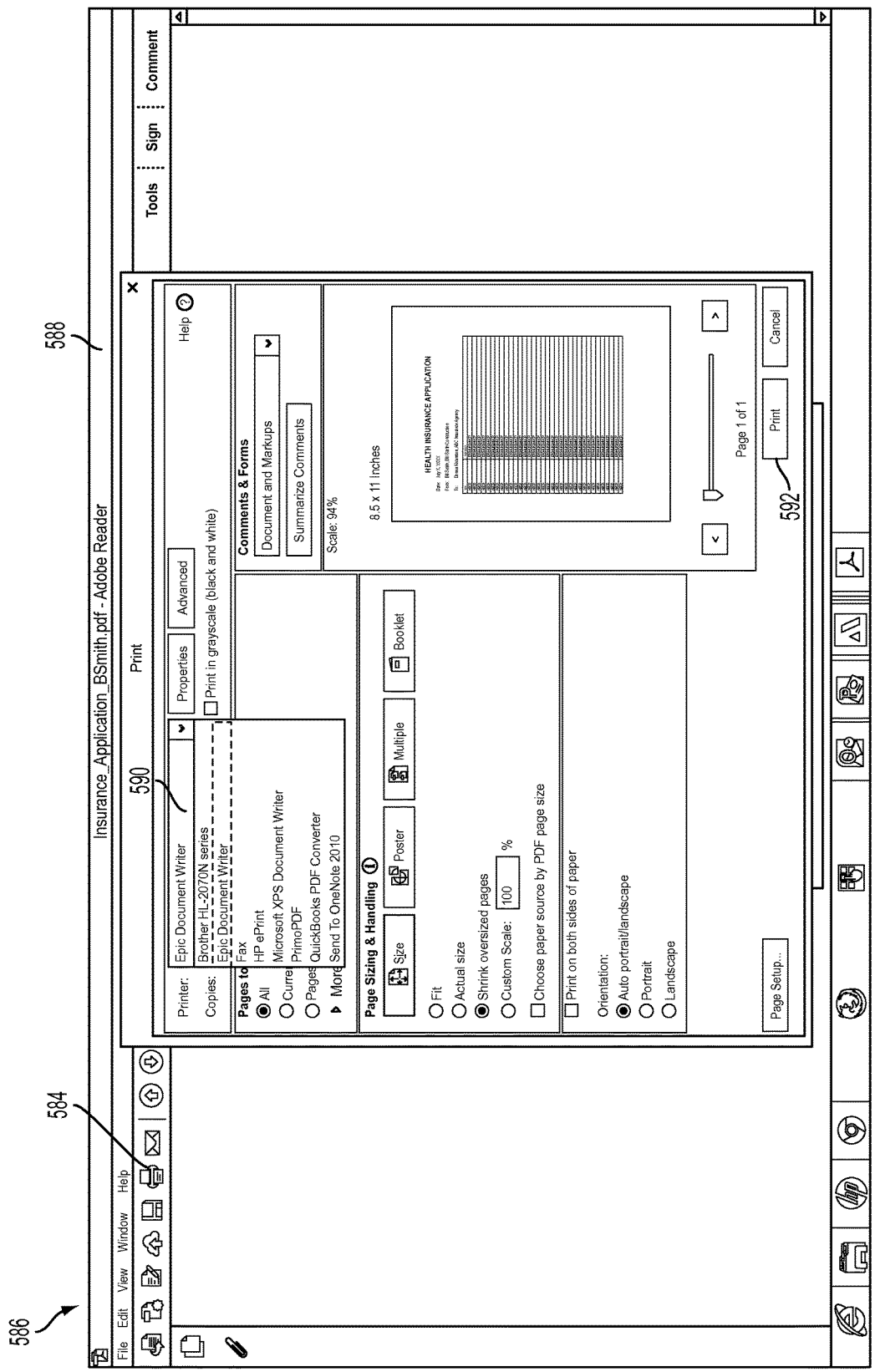
FIG. 36 is a view of another example of the file viewer interface of FIG. 35, illustrating the print control interface of the network access device or electronic device.

Referring back to FIG. 21, in another example, the user desires to fax several data files to an insurance underwriter, including: (a) the health insurance application file 518 received, via email, from the party, Bill Smith; and (b) the related medical records file 522 received, via fax, from XYZ Health Center. To start the integration process, the user opens the insurance application file 518 as illustrated in FIG. 35. The user then clicks the print button 584 within the viewer interface 586. The print control interface 588 displays the selectable virtual printer 590. When the user clicks the print button 592, the computer processor generates the health insurance application file 596 based on the health insurance application file 518. The user carries out the same process to generate the medical records file 598 based on the medical records file 522.

Figure 37:
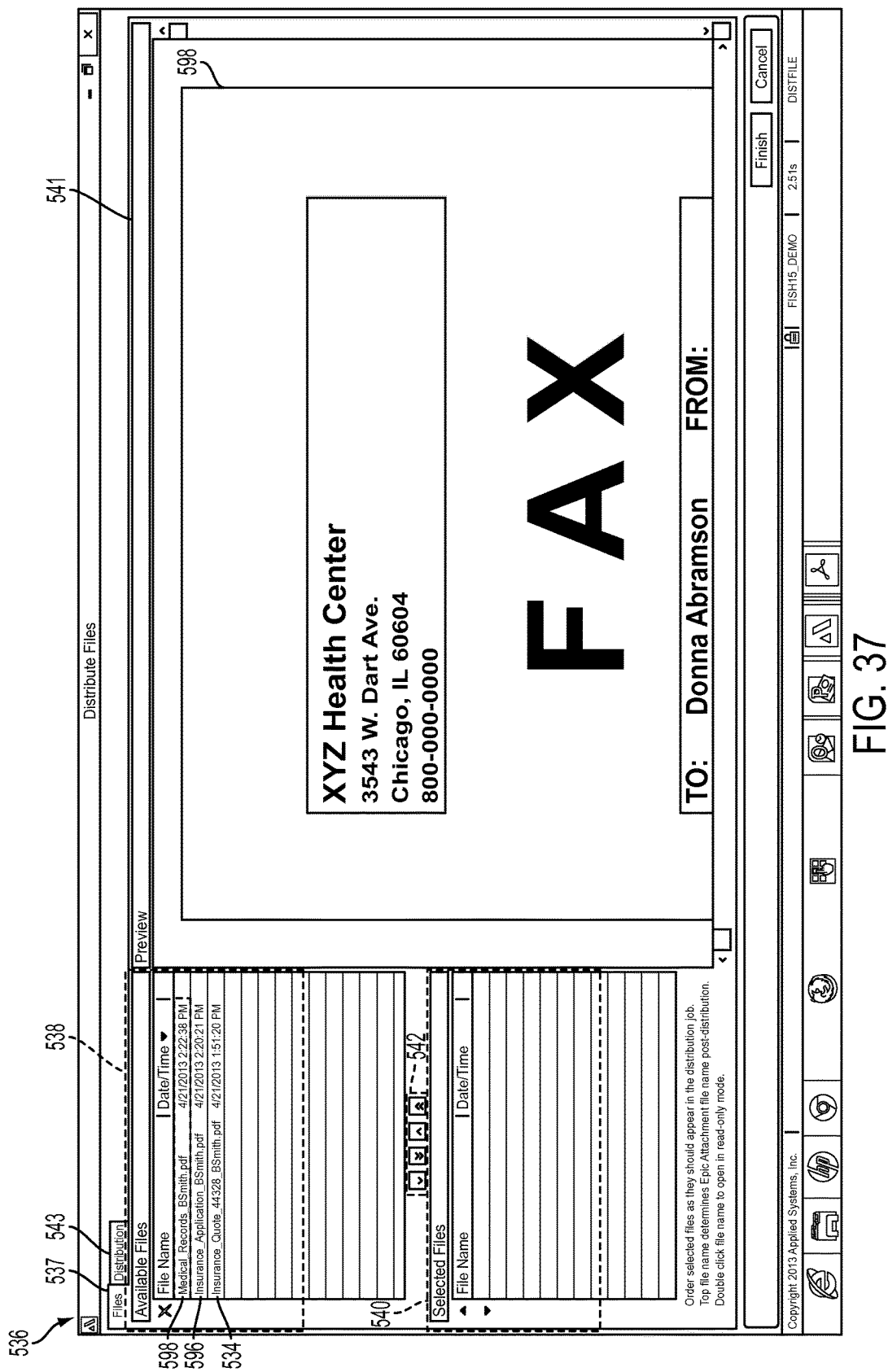
FIG. 37 is a view of one example of one embodiment of the file integration interface of the system, illustrating multiple data files in the attached file listing section.

After each of the data files 596 and 598 is generated, the system 400 launches the file integration interface 536 as illustrated in FIG. 37. The attached file listing section 538 maintains a historical list of the files 534, 596 and 598 which have been virtually printed. In one embodiment, the data files remain on this list even after they have been distributed or otherwise attached to an account. This is because these listed data files are still stored on the network access device 410.

Figure 38:
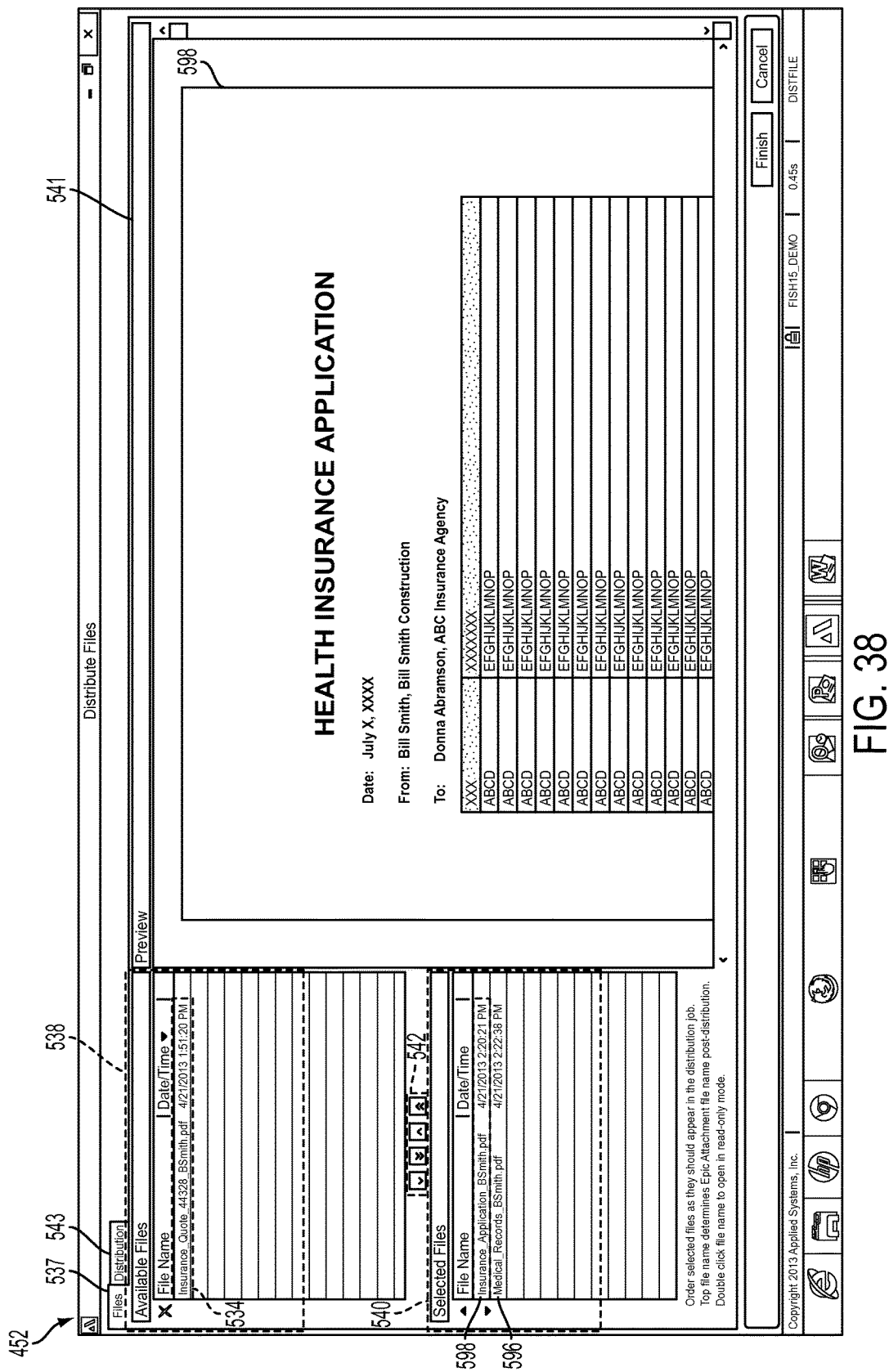
FIG. 38 is a view of another example of the file integration interface of FIG. 37, illustrating the movement of multiple, combinable data files from the attached file listing section to the file building section.

In this example, the user desires to combine the files 596 and 598 into a single combination data file. To do so, the users clicks the move buttons 542 to move the files 596 and 598 to the file builder section 540 as illustrated in FIG. 38. Also, the user uses the buttons 542 to place the health insurance application file 598 above the medical records data file 596. Accordingly, the system processor 408 generates the binder or combination data file with the health insurance application file 598 at the front of the file and the medical records data file 596 at the end of the combination data file.

Figure 39:
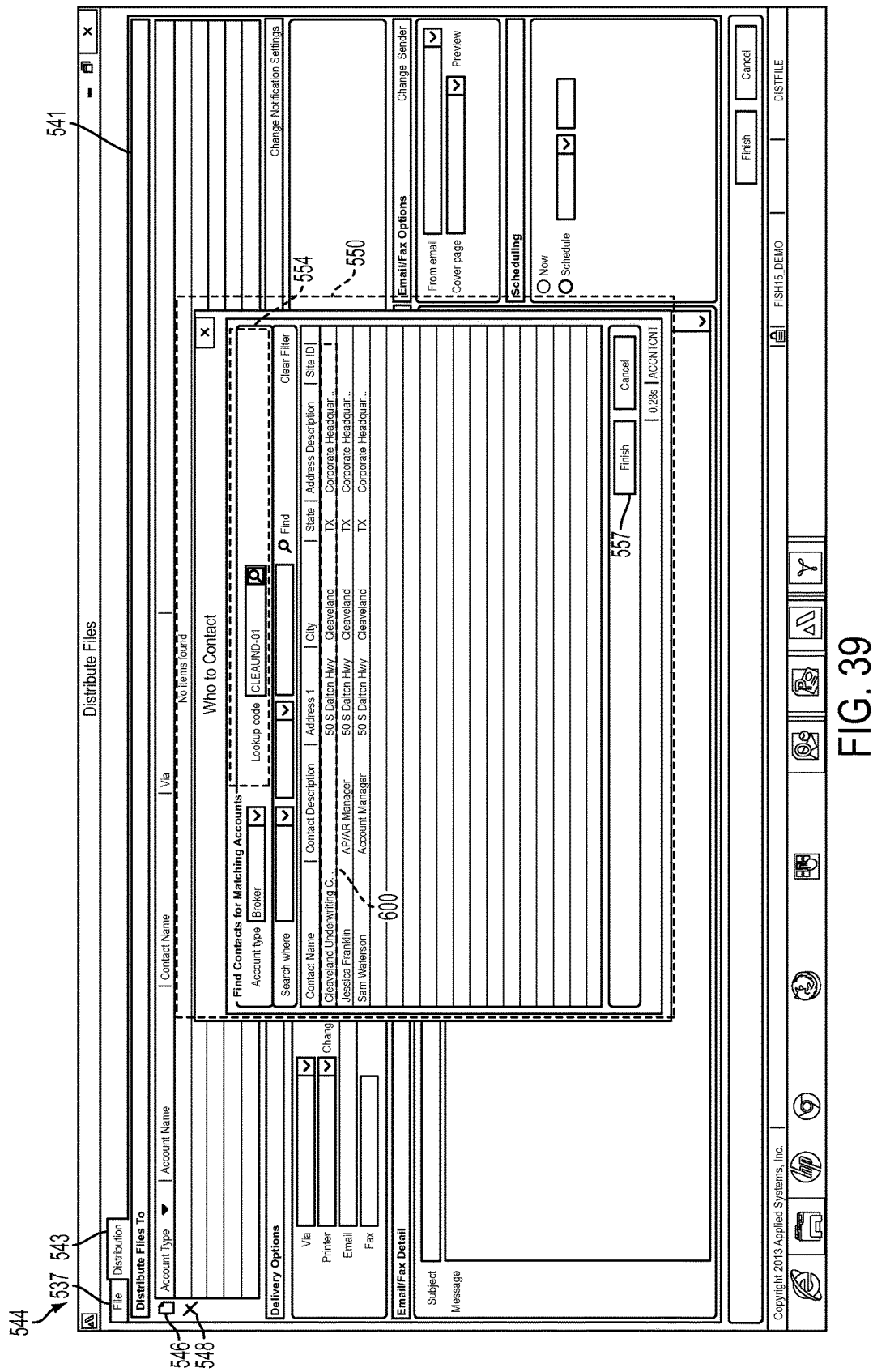
FIG. 39 is a view of another example of one embodiment of the distribution interface of the system, illustrating the account selection interface populated with the name of an insurance underwriter.

As illustrated in FIG. 39, the account selection interface 550 enables the user to select the type of account as described above. The selection interface 550 displays account search and lookup fields 554. In this example, the user selects the "other interest" account type, and the user enters a description or code of Cleveland Underwriting Company in one of the lookup fields 554. In response, the system 400 displays the Cleveland Underwriting Company account name 600. To complete the account selection process, the user clicks the finish button 557.

Figure 40:
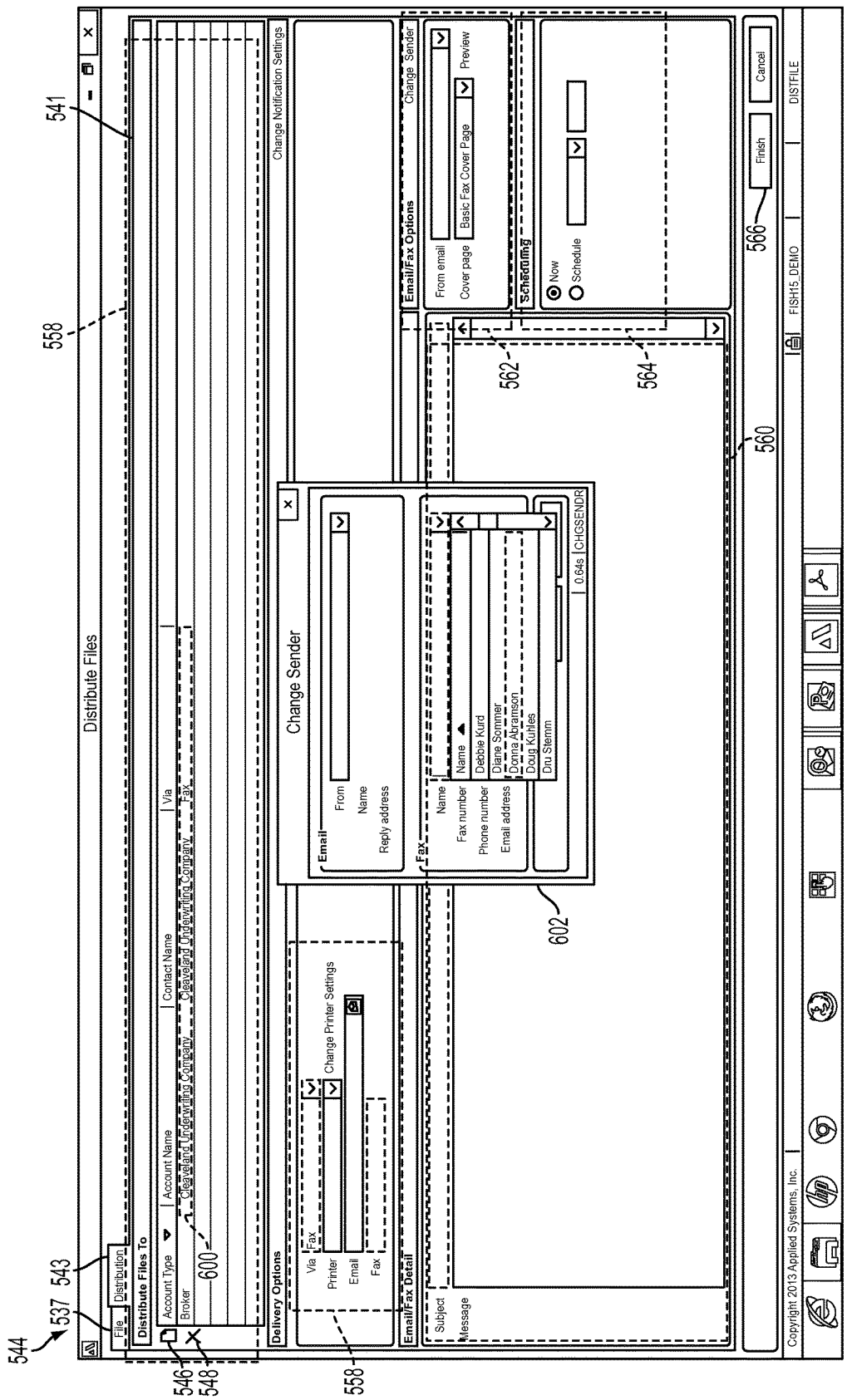
FIG. 40 is a view of one example of one embodiment of the distribution interface of the system, illustrating the selection of a sender's name.

Next, referring to FIG. 40, the system 400 displays the account name 600, Cleveland Underwriting Company, in the distribution list section 558. In this example, the user selects the fax distribution method. The sender change interface 602 displays fillable sender data fields for the email method and fax method. In this example, the user selects the sender's name, Donna Abramson, from a pull down menu. The user them proceeds to enter the sender's fax number, phone number and email address. Through the distribution interface 544, the user also enters activity management data related to the fax distribution in the same manner as described above with respect to FIG. 31. To complete the distribution and integration process, the user clicks the finish button 566.

Figure 41:
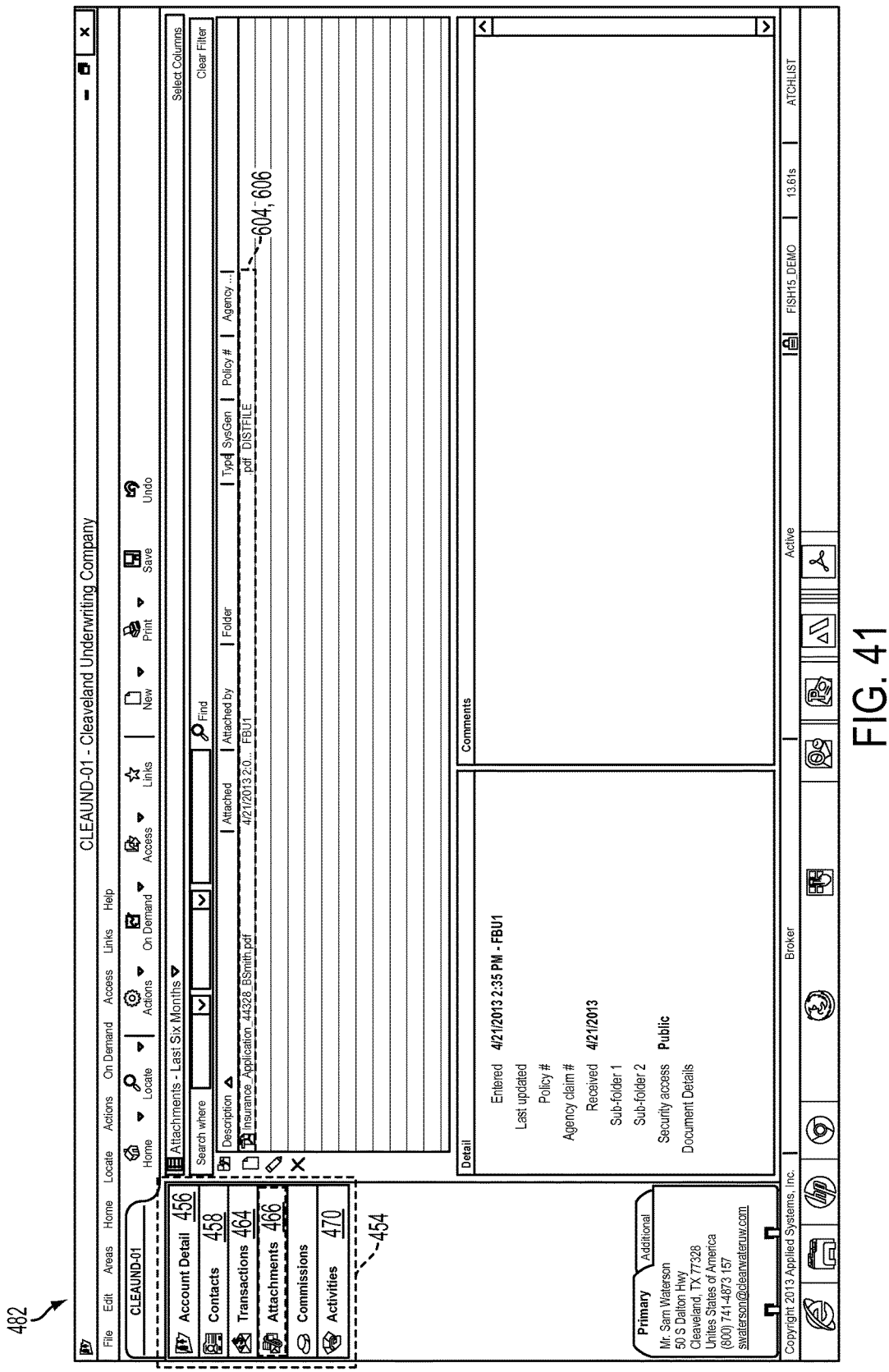
FIG. 41 is a view of one example of one embodiment of the attachments interface of the system, illustrating a combination data file.

As a result of the integration, the system processor 408 generates the fax cover sheet data file, and the processor 408 associates the attached data file, the fax cover sheet data file, and related information with the account of the party, Cleveland Underwriting Company. The user may access this information through the accounts module 438 illustrated in FIG. 9. Referring to FIG. 41, when the user clicks the attachments link 466 within the account interface of Cleveland Underwriting Company, the attachments interface 482 displays the name or descriptor of the integrated combination data file 604.

Figure 42:
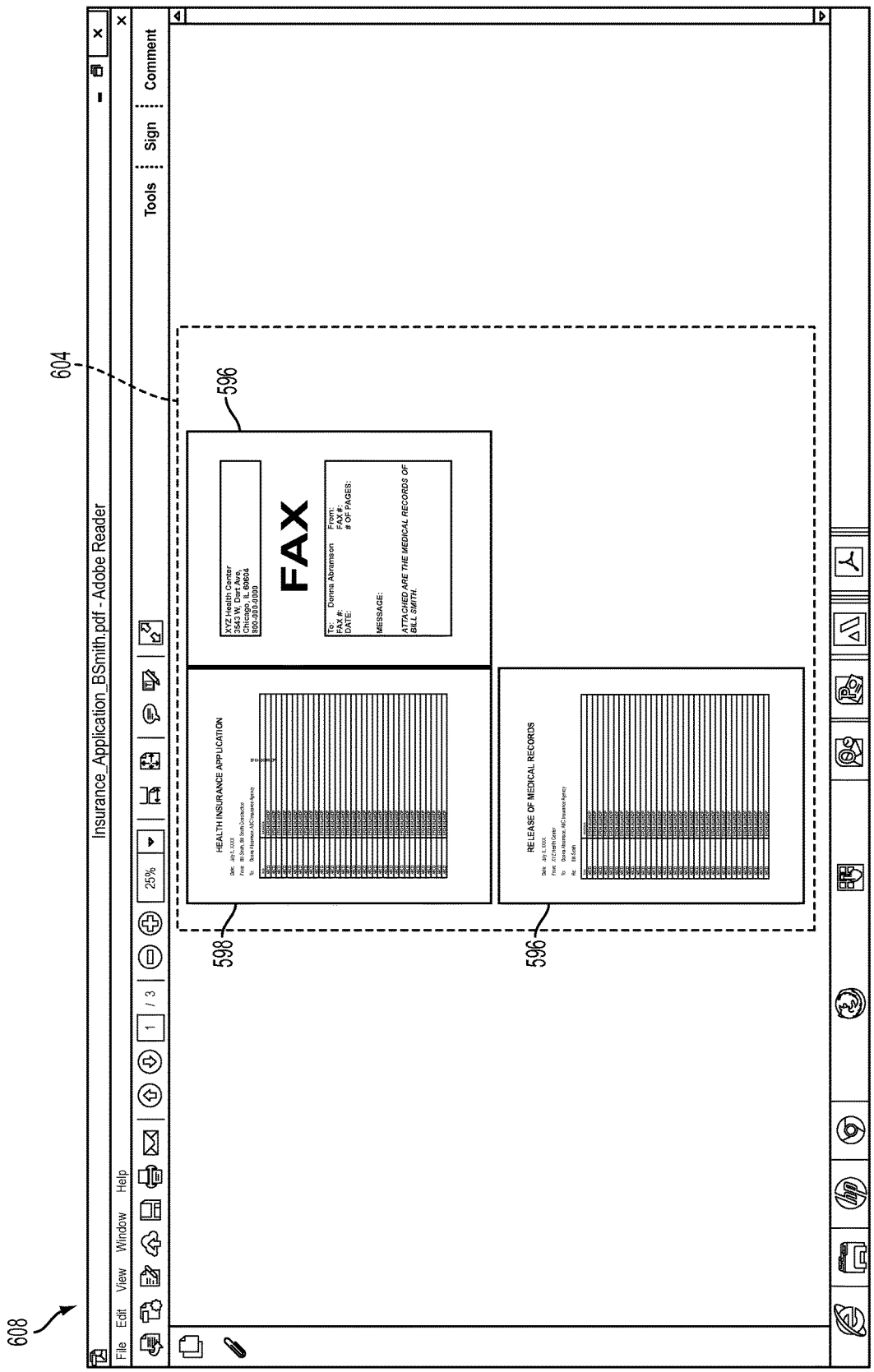
FIG. 42 is a view of one example of one embodiment of the file viewer interface of the network access device or electronic device, illustrating the page order of the combination data file of FIG. 41.

The data file combination 604 is a single data file which contains the data of data files 596 and 598. When the user clicks on the data file link 606, the system processor 408 opens the combination data file 604 within a viewer interface 608 as illustrated in FIG. 42. As illustrated, the first page of the data file 604 includes the health insurance application document 598, and the second and third pages of the data file 604 include the medical records document 596. In this format, the system processor 608 faxes the file 604 to Cleveland Underwriting Company. The system processor 608 then stores the file 604 in association with the Cleveland Underwriting Company account for future reference, record keeping and follow-up by the agent.

Figure 43:
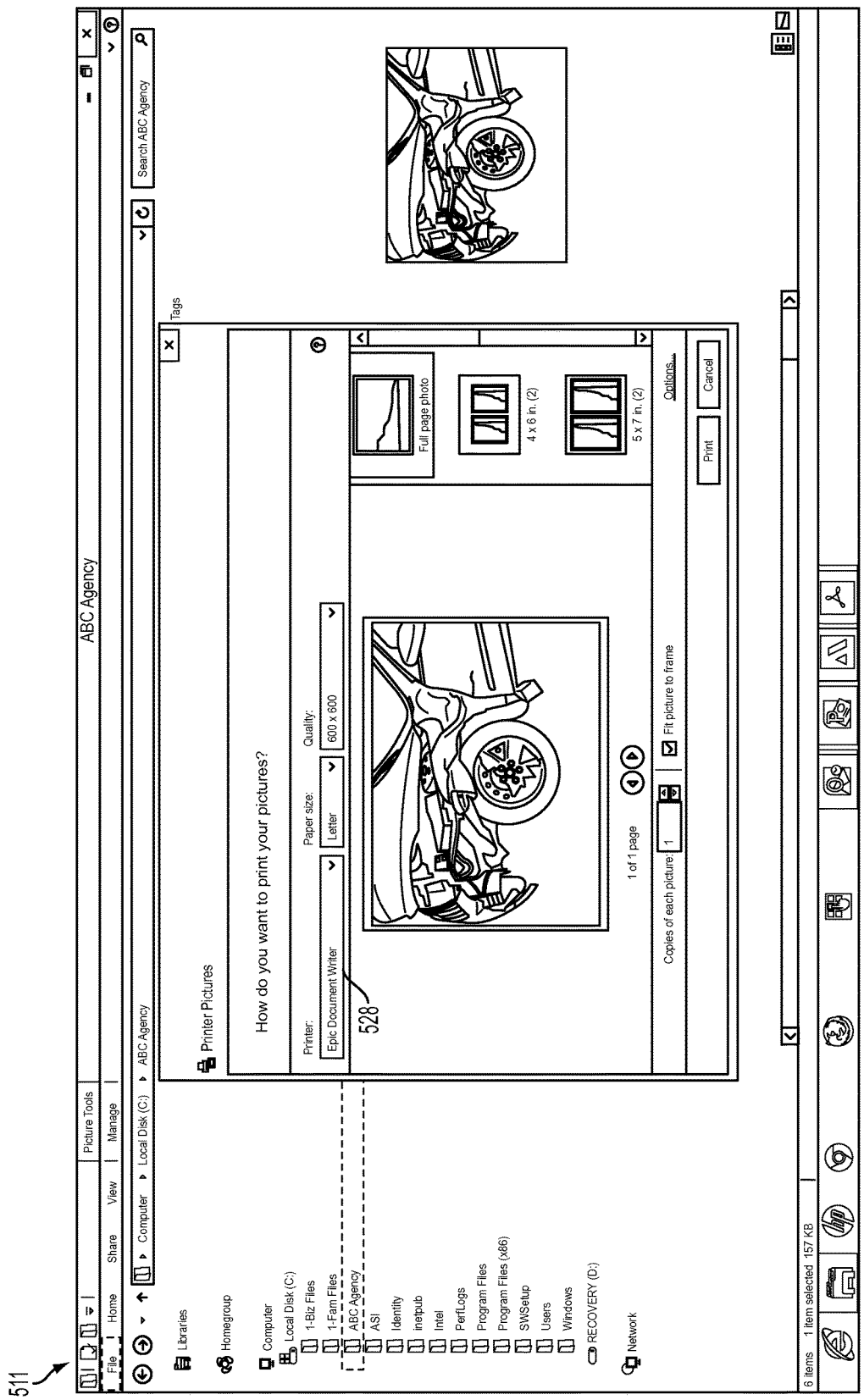
FIG. 43 is a view of another example of one embodiment of the file directory interface of the network access device or electronic device, illustrating the virtual printer driver available for generating a data file based on a claim evidence JPG file.

Referring back to FIG. 21, in another example, the user desires to attach several data files to the account of Bill Smith Construction without sending or distributing the files. The data files, in this example, include the claim submission PDF file 514 and the claim evidence JPG file 512 received from the party, Bill Smith Construction. To start the integration process, the user opens the claim evidence JPG file 512 displayed within the file directory interface 511 of the user's computer as illustrated in FIG. 43. From there, the user virtually prints the file 512. The computer processor generates the claim evidence PDF file 610 based on the claim evidence JPG file 512. The user carries out the same process to generate the claim submission PDF file 612 based on the original claim submission PDF file 514.

Figure 44:
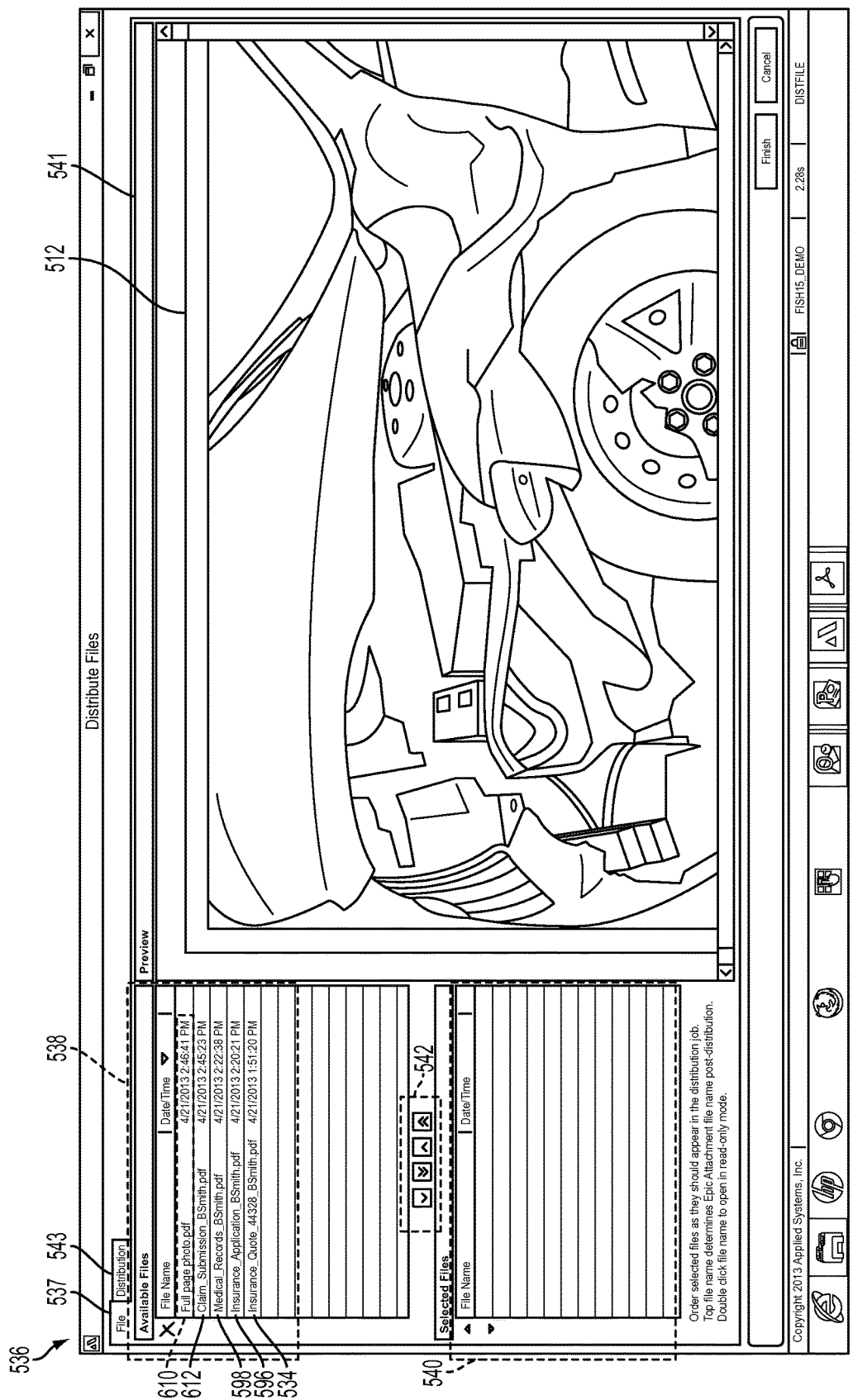
FIG. 44 is a view of one example of one embodiment of the file integration interface of the system, illustrating a historical list of previously attached data files.

After each of the data files 610 and 612 is generated, the system 400 launches the file integration interface 536 as illustrated in FIG. 44. The attached file listing section 538 displays the newly attachable files 610 and 612 together with the previously attached files 534, 596 and 598.

Figure 45:
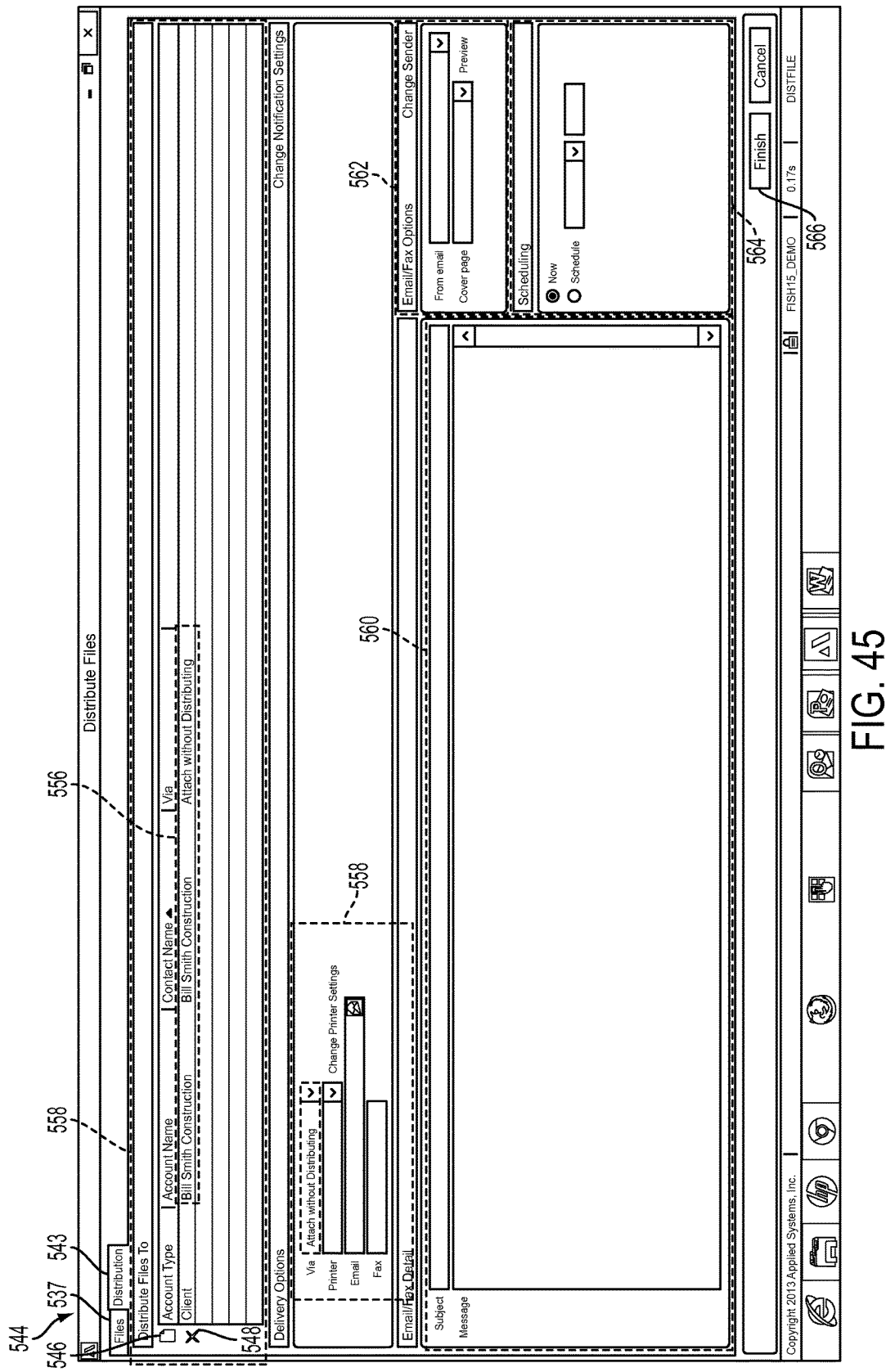
FIG. 45 is a view of one example of one embodiment of the distribution interface of the system, illustrating the user's selection of an attachment without distribution setting.

In this example, the user desires to separately incorporate the files 610 and 612 into the account of Bill Smith Construction. To do so, the users clicks the move buttons 542 to move the files 610 and 612 to the file builder section 540. Next, the user selects the Bill Smith Construction account as described above. Referring to FIG. 45, the system 400 displays the account name 556, Bill Smith Construction, in the distribution list section 558. In this example, the user selects the "attach without distributing" handling method. The user proceeds to complete the integration process, and then the user clicks the finish button 566.

Figure 46:
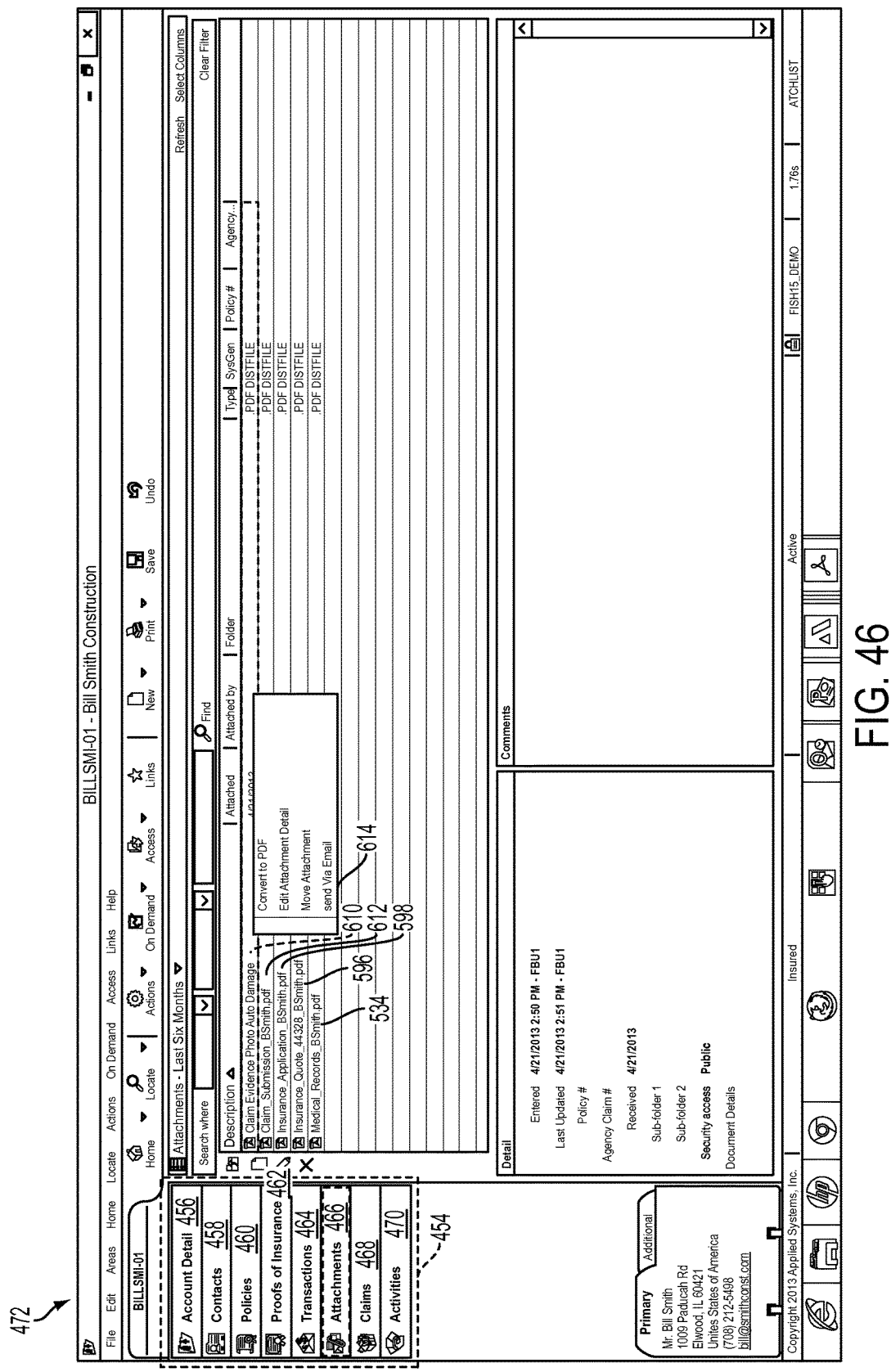
FIG. 46 is a view of one example of one embodiment of the account detail interface of the system, illustrating a historical list of data files which have been attached through the file integration interface of the system.

As a result of the integration, the system processor 408 associates the files 610 and 612 and related information with the account of the party, Bill Smith Construction. The user may access the files and information within the accounts module 438 illustrated in FIG. 9. Referring to FIG. 46, when the user clicks the attachments link 466 within the account interface of Cleveland Underwriting Company, the attachments interface 482 displays the name or descriptor of all of the data files integrated in the past, including the claim evidence data file 610, claim submission data file 612, insurance application data file 598, insurance quote data file 596 and medical records data file 534.

If the user right clicks on one of these files, the system 400 displays the options interface 614. The options interface 614 displays a plurality of selectable inputs which enable the user to edit the details or description associated with the data file and also move the data file to another location or folder within the system 400.

Methods

In one embodiment, the system 400 is implemented as a method. The method includes some or all of the functionality, steps and logic of the system 400. In one embodiment, the method includes the following steps:
  (a) electronically storing a plurality of computer-readable instructions and data related to a plurality of different parties; and
  (b) electronically executing the computer-readable instructions to:
    (i) receive a data file from an electronic device;
    (ii) receive a selection of one of the parties;
    (iii) receive activity management data related to the data file;
    (iv) send the data file to the selected party; and
    (v) store the data file and the activity management data within the data storage device, wherein the data file and the activity management data are associated with the selected party.

In one embodiment, the method includes receiving follow-up management data related to following-up with the selected party regarding the data file sent to the selected party. In one embodiment, the method includes electronically executing the computer-readable instructions to: (a) receive an input after the data file is sent; and (b) cause a display of an account interface. The account interface displays the following: (i) a data file list including a description of the sent data file; and (ii) at least part of the activity management data.

Network

Referring to FIGS. 4-6 and 8, the network 406 can be any suitable type of network. Depending upon the embodiment, the network 406 can include one or more of the following: a wired network, a wireless network, a local area network (LAN), an extranet, an intranet, a wide area network (WAN) (including, but not limited to, the Internet), a virtual private network (VPN), an interconnected data path across which multiple devices may communicate, a peer-to-peer network, a telephone network, portions of a telecommunications network for sending data through a variety of different communication protocols, a Bluetooth communication network, a radio frequency (RF) data communication network, an infrared (IR) data communication network, a satellite communication network or a cellular communication network for sending and receiving data through short messaging service (SMS), multimedia messaging service (MMS), hypertext transfer protocol (HTTP), direct data connection, Wireless Application Protocol (WAP), email or any other suitable message transfer service or format.

Hardware

Referring to FIGS. 4-8, in one embodiment, the system 400 includes a single server. In another embodiment, the system 400 includes multiple servers, each of which implements a different part of the system 400. In one embodiment, each of the one or more servers includes: (a) a processor (such as the processor 408) or a central processing unit (CPU); and (b) one or more data storage devices, including, but not limited to, a hard drive with a spinning magnetic disk, a Solid-State Drive (SSD), a floppy disk, an optical disk (including, but not limited to, a CD or DVD), a Random Access Memory (RAM) device, a Read-Only Memory (ROM) device (including, but not limited to, programmable read-only memory (PROM), electrically erasable programmable read-only memory (EPROM), electrically erasable programmable read-only memory (EEPROM)), a magnetic card, an optical card, a flash memory device (including, but not limited to, a USB key with non-volatile memory, any type of media suitable for storing electronic instructions or any other suitable type of computer-readable storage medium.

In one embodiment, each of the one or more servers is a general purpose computer. In one embodiment, the one or more servers function to deliver webpages at the request of clients, such as web browsers, using the Hyper-Text Transfer Protocol (HTTP). In performing this function, the one or more servers deliver Hyper-Text Markup Language (HTML) documents and any additional content which may be included, or coupled to, such documents, including, but not limited, to images, style sheets and scripts.

The network access devices 410 can include any device operable to access the network 406, including, but not limited to, a server, personal computer (PC) (including, but not limited to, a desktop PC, a laptop or a tablet), smart television, Internet-enabled TV, person digital assistant, smartphone, cellular phone or mobile communication device. In one embodiment, each network access device 410 has at least one input device (including, but not limited to, a touchscreen, a keyboard, a microphone, a sound sensor or a speech recognition device) and at least one output device (including, but not limited to, a speaker, a display screen, a monitor or an LCD).

Software

In one embodiment, the servers and network access devices each include a suitable operating system. Depending upon the embodiment, the operating system can include Windows, Mac, OS X, Linux, Unix, Solaris or another suitable computer hardware and software management system. In another embodiment, one or more of the network access devices includes a mobile operating system, including, but not limited to, Android, BlackBerry, iOS, Windows Phone and Windows RT.

In one embodiment, each of the network access devices has a browser operable by their processors to retrieve, present and traverse the following: (a) information resources on the one or more servers of the system 400; and (b) information resources on the World Wide Web portion of the Internet.

In one embodiment, the computer-readable instructions, algorithms and logic of the system 400 (including the computer-readable instructions and logic) are implemented with any suitable programming or scripting language, including, but not limited to, C, C++, Java, COBOL, assembler, PERL, Visual Basic, SQL Stored Procedures or Extensible Markup Language (XML). The document integrator 428 of the system 400 can be implemented with any suitable combination of data structures, objects, processes, routines or other programming elements.

In one embodiment, the data storage device of the system 400 holds or stores web-related data and files, including, but not limited, to HTML documents, image files, Java applets, JavaScript, Active Server Pages (ASP), Common Gateway Interface scripts (CGI), XML, dynamic HTML, Cascading Style Sheets (CSS), helper applications and plug-ins.

In one embodiment, the graphical interfaces of the system 400 are Graphical User Interfaces (GUIs) structured based on a suitable programming language. The GUIs include, in one embodiment, windows, pull-down menus, buttons, scroll bars, iconic images, wizards, the mouse symbol or pointer, and other suitable graphical elements. In one embodiment, the GUIs incorporate multimedia, including, but not limited to, sound, voice, motion video and virtual reality interfaces.

In an alternative embodiment, the system processor 408 is programmed to extract data files from an interface of the network access devices 410. In one embodiment, the system 400 includes an extract Application Programming Interface (API) which is executable by the system processor 408 or device processors. The API facilitates data communication between the network access devices 410 and the system processor 408, enabling the system processor 408 to automatically extract data files from the network access devices 410.

Additional embodiments include any one of the embodiments described above, where one or more of its components, functionalities or structures is interchanged with, replaced by or augmented by one or more of the components, functionalities or structures of a different embodiment described above.

It should be understood that various changes and modifications to the embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A system comprising:
   a processor; and
   a data storage device configured to store a plurality of data files related to a plurality of different parties and a plurality of instructions, the data storage device being accessible, over a network, by the processor and at least one electronic device;
   wherein the instructions are executed by the processor to:
   (a) receive a data file from the plurality of data files stored on the electronic device;
   (b) convert the data file from an initial format to a portable format;
   (c) receive the converted data file;
   (d) combine the converted data file with another one of the plurality of data files to result in a combination data file;
   (e) receive a selection of one of the parties to receive the combination data file;
   (f) receive activity management data which is generated at the electronic device and which is related to the combination data file;
   (g) send the combination data file to the selected party; and
   (h) store the combination data file and the activity management data within the data storage device, the combination data file and the activity management data being associated with the selected party.

2. The system of claim 1, wherein the data file includes account data related to a plurality of accounts of the parties, the account data including at least an identifier of each one of the parties.

3. The system of claim 1, wherein the activity management data includes follow-up management data related to following-up with the selected party regarding the data file sent to the selected party.

4. The system of claim 1, wherein a plurality of the instructions are executed by the processor to:
   (a) receive an input after the combination data file is sent; and
   (b) cause a display of an account interface, the account interface displaying:
      (i) a data file list section including a description of the sent combination data file; and
      (ii) at least part of the activity management data.

5. The system of claim 1, wherein a plurality of the instructions are executed by the processor to receive a selection of one of a plurality of different distribution methods, the combination data file being sent according to the selected distribution method.

6. The system of claim 1, wherein the distribution methods include email, fax and mail earner.

7. The system of claim 1, wherein the data storage device is configured to store at least one other data file in association with the selected party, a plurality of the instructions are executed by the processor to:
   (a) receive a selection of the other combination data file; and
   (b) send to the selected party, the other data file along with the data file.

8. The system of claim 1, wherein the data storage device is configured to store an instruction set, wherein the plurality of the instructions are executed by the processor to:
   (a) enable the electronic device to install a copy of the instruction set onto the electronic device, the electronic device being operable to generate the data file;
   (b) receive a message from the electronic device after the electronic device has generated the data file; and
   (c) cause a display of a file integration interface in response to the message, the file integration interface having:
      (i) a data file list section which displays a description of the data file;
      (ii) a party selection section;
      (iii) a distribution method selection section; and
      (iv) an activity management data input section.

9. The system of claim 1, wherein the data storage device stores a plurality of data fields, the data fields including an insurance policy data field, an insured party data field and an insurance provider data field.

10. A system comprising:
   a data storage device configured to store a plurality of accounts related to a plurality of different parties, each of the accounts being related to a plurality of data files, the data storage device being accessible, over a network, by a processor and at least one electronic device;
   a file conversion instruction set stored within the data storage device;
   a plurality of instructions stored within the data storage device, the instructions are executed by the processor to:
   (a) enable the electronic device to install a copy of the file conversion instruction set onto the electronic device, the electronic device being operable to execute the file conversion instruction set to convert a data file from an initial format to a portable format;
   (c) combine the converted data file with another one of the data files in response to a combine request, the combining resulting in a combination data file;
   (d) receive a selection of one of the accounts which identifies an electronic location for sending the combination data file;
   (e) receive activity management data which is generated at the electronic device and which is related to the combination data file and the selected account;
   (f) store the combination data file and the activity management data within the data storage device, the combination data file and the activity management data being associated with the selected account; and
   (g) send the combination data file to an electronic destination associated with the selected account.

11. The system of claim 10, wherein the file conversion instruction set includes a virtual printer driver.

12. The system of claim 10, wherein the activity management data includes follow-up management data related to following-up with the selected account regarding the combination data file sent to the electronic destination.

13. The system of claim 10, wherein a plurality of the instructions are executed by the processor to:
   (a) receive an input after the combination data file is sent; and
   (b) cause a display of an account interface, the account interface displaying:
      (i) a data file list including a description of the sent combination data file; and
      (ii) at least part of the activity management data.

14. The system of claim 10, wherein the data storage device stores a plurality of data fields, the data fields including an insurance policy data field, an insured party data field and an insurance provider data field.

15. A method comprising:
   electronically storing a plurality of computer-readable instructions and a plurality of data files related to a plurality of different parties in an electronic device; and
   electronically executing the computer-readable instructions to:
   (a) receive a data file from the plurality of data files stored on the electronic device;
   (b) convert the data file from an initial format to a portable format;
   (c) receive the converted data file;
   (d) combine the converted data file with another one of the plurality of data files to result in a combination data file;
   (e) receive a selection of one of the parties to receive the combination data file;
   (f) receive activity management data which is generated at the electronic device and which is related to the combination data file;
   (g) send the combination data file to the selected party; and
   (h) store the combination data file and the activity management data within the data storage device, the combination data file and the activity management data being associated with the selected party.

16. The method of claim 15, wherein receiving the activity management data includes receiving follow-up management data related to following-up with the selected party regarding the combination data file sent to the selected party.

17. The method of claim 15, which includes electronically executing the computer readable instructions to:
   (a) receive an input after the combination data file is sent; and
   (b) cause a display of an account interface, the account interface displaying:
      (i) a data file list including a description of the sent combination data file; and
      (ii) at least part of the activity management data.

18. The method of claim 15, which includes electronically executing the computer readable instructions to receive a selection of one of a plurality of different distribution methods, the combination data file being sent according to the selected distribution method.

19. The method of claim 15, which includes electronically executing the computer readable instructions to:
   (a) store at least one other data file in association with the selected party;
   (b) receive a selection of the other data file; and
   (c) send to the selected party, the other data file along with the data file.

20. The method of claim 15, which includes electronically executing the computer readable instructions to:
   (a) store an instruction set;
   (b) enable the electronic device to install a copy of the instruction set onto the electronic device, the electronic device being operable to generate the data file;
   (c) receive a message from the electronic device after the electronic device has generated the data file; and
   (d) cause a display of a file integration interface in response to the message, the file integration interface having:
      (i) a data file list section which displays a description of the data file;
      (ii) a party selection section;
      (iii) a distribution method selection section; and
      (iv) an activity management data input section.

* * * * *